US010144474B2

(12) United States Patent
Rajamani et al.

(10) Patent No.: US 10,144,474 B2
(45) Date of Patent: Dec. 4, 2018

(54) COLLISION DETECTION

(71) Applicant: REGENTS OF THE UNIVERSITY OF MINNESOTA, Minneapolis, MN (US)

(72) Inventors: Rajesh Rajamani, Minneapolis, MN (US); Woongsun Jeon, Minneapolis, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 0 days.

(21) Appl. No.: 15/640,066

(22) Filed: Jun. 30, 2017

(65) Prior Publication Data

US 2018/0001952 A1    Jan. 4, 2018

Related U.S. Application Data

(60) Provisional application No. 62/357,883, filed on Jul. 1, 2016.

(51) Int. Cl.
| | |
|---|---|
| G08B 21/00 | (2006.01) |
| B62J 27/00 | (2006.01) |
| G08G 1/16 | (2006.01) |
| B62J 3/00 | (2006.01) |
| B62J 99/00 | (2009.01) |

(52) U.S. Cl.
CPC .......... *B62J 27/00* (2013.01); *B62J 3/00* (2013.01); *G08G 1/166* (2013.01); *B62J 2099/002* (2013.01); *B62J 2099/0013* (2013.01)

(58) Field of Classification Search
CPC ........ G08G 1/166; G08B 21/00; B60R 21/00; G01S 13/931
USPC .......................... 340/431, 435, 436, 438, 903
See application file for complete search history.

(56) References Cited

U.S. PATENT DOCUMENTS

| | | | | |
|---|---|---|---|---|
| 5,314,037 A | * | 5/1994 | Shaw | B60K 23/08 180/169 |
| 5,754,099 A | * | 5/1998 | Nishimura | B60T 7/22 340/435 |
| 6,085,151 A | | 7/2000 | Farmer | |
| 2007/0255498 A1 | * | 11/2007 | McDaniel | G01S 13/931 701/301 |
| 2010/0315216 A1 | * | 12/2010 | Hada | B60Q 1/525 340/436 |
| 2013/0297172 A1 | * | 11/2013 | Ariga | G08G 1/166 701/70 |

OTHER PUBLICATIONS

Balsamo, "Effectiveness of exercise on cognitive impairment and Alzheimer's disease," 2013 *International journal of general medicine*, 6:387-91. PMID: 23737675, 2013.

(Continued)

*Primary Examiner* — Tai T Nguyen
(74) *Attorney, Agent, or Firm* — Mueting, Raasch & Gebhardt, PA

(57) ABSTRACT

Bicycle collision systems, apparatus, and methods may include, or use, one or more various sensing apparatus to detect vehicles or other objects that may collide, or potentially collide, with a bicycle. The sensing apparatus may include at least one of side sensing apparatus, rear sensing apparatus, and front sensing apparatus. Further, alert apparatus may be used to alert not only the cyclist but also the driver of a vehicle of an imminent collision.

32 Claims, 44 Drawing Sheets

(56) References Cited

OTHER PUBLICATIONS

Bar-Shalom, *Estimation with applications to tracking and navigation: theory algorithms and software*, John Wiley & Sons: Hoboken, NJ; 2004. Cover page, title page and table of contents.

Boston Business Journal, "Northeastern Students Develop 'Smart Bike' Tech to Curb Cycling Deaths," Online: http://www.bizjournals.com/boston/blog/startups/2014/01/northeastern-students-develop-smart.html?page=all.

Byxee, https://www.indiegogo.com/projects/byxee-the-smart-active-safety-device-for-bicycle#/story.

Caveney, "Comprehensive Framework for Multisensor Multi-target Tracking in the Adaptive Cruise Control Environment," *Proc. of the 6th International Symposium on Advanced Vehicle Control (AVEC)*, Hiroshima, Japan, Sep. 2002, 697-702.

City of Minneapolis, "Understanding Bicyclist-Motorist Crashes in Minneapolis, Minnesota," Report. Jan. 15, 2013. Online: https://www.google.com/url?sa=t&rct=j&q=&esrc=s&source=web&cd=1&ved=0ahUKEwi0uvzazs_VAhWh6YMKHRjhDj0QFggmMAA&url=http%3A%2F%2Fwww.minneapolismn.gov%2Fwww%2Fgroups%2Fpublic%2F%40publicworks%2Fdocuments%2Fimages%2Fwcms1p-102346.pdf&usg=AFQjCNFdETXA3WyXHPZ9bhoVmY9ydAI5gw.

Duane, "Is it O.K. to Kill Cyclists?" *New York Times*, Nov. 10, 2013: http://www.nytimes.com/2013/11/10/opinion/sunday/is-it-ok-to-kill-cyclists.html.

Ester, "A density-based algorithm for discovering clusters in large spatial databases with noise" 1996 KDD, 96(34):226-231.

Ganguli, "Fault Diagnostics for GPS-Based Lateral Vehicle Control," 2003 *Vehicle System Dynamics*, 39(2):99-120.

Ganguli, "Radar Health Monitoring and Target Tracking for Highway Vehicle Applications" May 2002 *Proceedings of the American Control Conference*.

Ganguli, "Tractable Model Development and System Identification for Longitudinal Vehicle Dynamics," Oct. 2004 *Journal of Automobile Engineering, Proceedings of the Institution of Mechanical Engineers*, Part D, 218(10):1077-1084.

Garmin Varia Rearview Radar, online: https://buy.garmin.com/en-US/US/p/518151.

Graham, "Use of auditory icons as emergency warnings: evaluation within a vehicle collision avoidance application" 1999 *Ergonomics*, 42(9):1233-1248.

Hisaka, "On-Board Wireless Sensor for Collision Avoidance: Vehicle and Pedestrian Detection at Intersection," IEEE Conference on Int. Transp. Systems, Washington DC, Oct. 2011.

Holmberg, "Battery-Less Wireless Instrumented Knee Implant," 2013 *ASME Transactions on Medical Devices*, Article 011001, 11 pages.

Kelly, "Essential kinematics for autonomous vehicles. No. CMU-RI-TR-94-14" Carnegie-Mellon Univ Pittsburgh PA Robotics Inst, 1994.

Kim, "A Novel Real-Time Capacitance Estimation Methodology for Battery-Less Wireless Systems," Oct. 2010 *IEEE Sensors*, 10(10):1647-1657.

Li, "Survey of maneuvering target tracking. Part I. Dynamic models" 2003 *Aerospace and Electronic Systems, IEEE Transactions on 39.4* (2003): 1333-1364.

Marx, "Preventing Alzheimers: A Lifelong Commitment?" Aug. 2005 *Science*, 309(5736):864-866.

Matzka, "A Comparison of Track-to-Track Fusion Algorithms for Automotive Sensor Fusion," Proceedings of IEEE International Conference on Multisensor Fusion and Integration for Intelligent Systems, Seoul, Korea, Aug. 20-22, 2008.

Mobus, "Multi-target multi-object tracking, sensor fusion of radar and infrared," Jun. 2004 *Proceedings of the IEEE Intelligent Vehicles Symposium*, 14-17:732-737.

Moon, "A multi-target tracking algorithm for application to adaptive cruise control," 2005 Journal of mechanical science and technology, 19(9):1742-1752.

Mukhtar, "Vehicle Detection Techniques for Collision Avoidance Systems: A Review" Oct. 2015 *IEEE Transactions on Intelligent Transportation Systems*, 16(5):2318-2338.

Nanda, "The Acute Effects of a Single Bout of Moderate-Intensity Aerobic Exercise on Cognitive Functions in Heathy Adult Males," Nov. 2013 *Journal of Clinical Diagnostic Research*, 7(9).

National Highway Traffic Safety Administration, online: www.nhtsa.gov/Bicycles.

NCSL, "Safely Passing Bicyclists Chart" Online: http://www.ncsl.org/research/transportation/safely-passing-bicyclists.aspx.

Norman, "Cognitive Engineering" 1986 *User Centered System Design: New Perspectives on Human-Computer Interaction*, 31-61.

Pulsedlight, Online: http://pulsedlight3d.com.

Rabinowitz, "Noise-induced hearing loss" 2003 American family physician, 61(9), 2759-2760.

Rajamani, "Sensor Fault Diagnostics for a Class of Nonlinear Systems Using Linear Matrix Inequalities," Jul. 2004 *International Journal of Control*, 77(10):920-930.

Rajamani, "Radar Health Monitoring for Highway Vehicle Applications" Jul. 2002 *Vehicle System Dynamics*, 38(1):23-54.

Räsänen, "Attention and expectation problems in bicycle-car collisions: an in-depth study" Sep. 1998 *Accident Analysis & Prevention*, 30(5):657-666.

Roadway Safety Institute (RSI), "Human-centered solutions to advance roadway safety" TRB Conference, Jan. 7, 2016.

Shrivastava, "Fault Diagnostics for GPS-Based Lateral Vehicle Control," Jun. 2001 *Proceedings of the American Control Conference*, Arlington, VA, 1:31-36.

Singal, "Handheld Magnetic Sensor for Measurement of Tension," 2012 *Applied Physics Letters*, 100(Article 154105).

Singal, "Measurement of Tension in a String Using an Array of Capacitive Sensors," Feb. 2013 *IEEE Sensors*, 13(2):792-800.

Singal, "Magnetic Sensor for Configurable Measurement of Tension or Elasticity with Validation in Animal Tissues," Feb. 2015 *IEEE Transactions on Biomedical Engineering*, 62(2):426-437.

Taghvaeeyan, "Two-Dimensional Sensor System for Automotive Crash Prediction," Feb. 2014 *IEEE Transactions on Intelligent Transportation Systems*, 15(1):178-190.

University of Minnesota Center for Transportation Studies, "Helping bicycle riders avoid crashes with collision-prediction warning systems" Jun. 2015 *CTS Catalyst*. Online: http://www.cts.umn.edu/publications/catalyst/2015/june/warningsystems.

Van Der Peijl, "Design for Risk Control: The Role of Usability Engineering in the Management of Use-Related Risks" Aug. 2012 *Journal of Biomedical Informatics*. 45(4):795-812.

Vanhawks. Valour. Online: https://vanhawks.com.

Vijayaraghavan, "Quantitative Fault Estimation for a Class of Nonlinear Systems, with Applications to Lateral Vehicle Control," Jan. 2007 *International Journal of Control*, 80(1):64-74.

Vijayaraghavan, "Quantitative Fault Estimation for a Class of Nonlinear Systems," Jun. 2006 *Proceedings of the American Control Conference*, Minneapolis, USA, 5147-5152.

Wannamethee, "Physical Activity and Risk of Cancer in Middle-Aged Men," 2001 *British Journal of Cancer*, 85(9): 1311-1316.

Widmann, "Comparison of Lidar-Based and Radar-Based Adaptive Cruise Control Systems," Delphi Automotive Systems, 2000-01-0345.

Wilund, "Is the Anti-In flammatory Effect of Regular Exercise Responsible for Reduced Cardiovascular Disease?" 2007 *Clinical Science*, 112(11):543-555.

Woodruff, "Thirteen Reasons You Should Start Biking to Work," Oct. 2012 *Business Insider*, 2 pages. Online: http://www.businessinsider.com/13-reasons-you-should-bike-to-work-2012-10.

Young, "Defining the relationship between behavioural adaptation and driver distraction" In *Behavioural Adaptation and Road Safety. Theory, Evidence and Action* CRC Press, Taylor and Francis Group, Boca Raton FL; 2013. Cover page, title page, table of contents, pp. 227-243.

\* cited by examiner

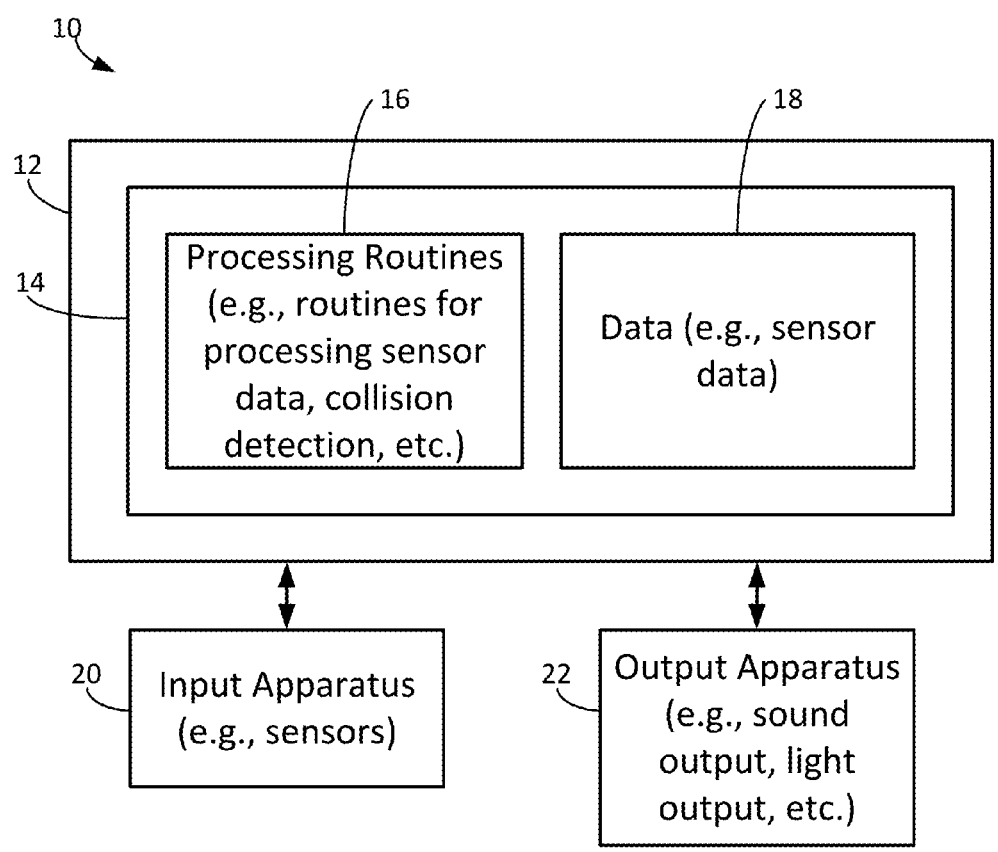

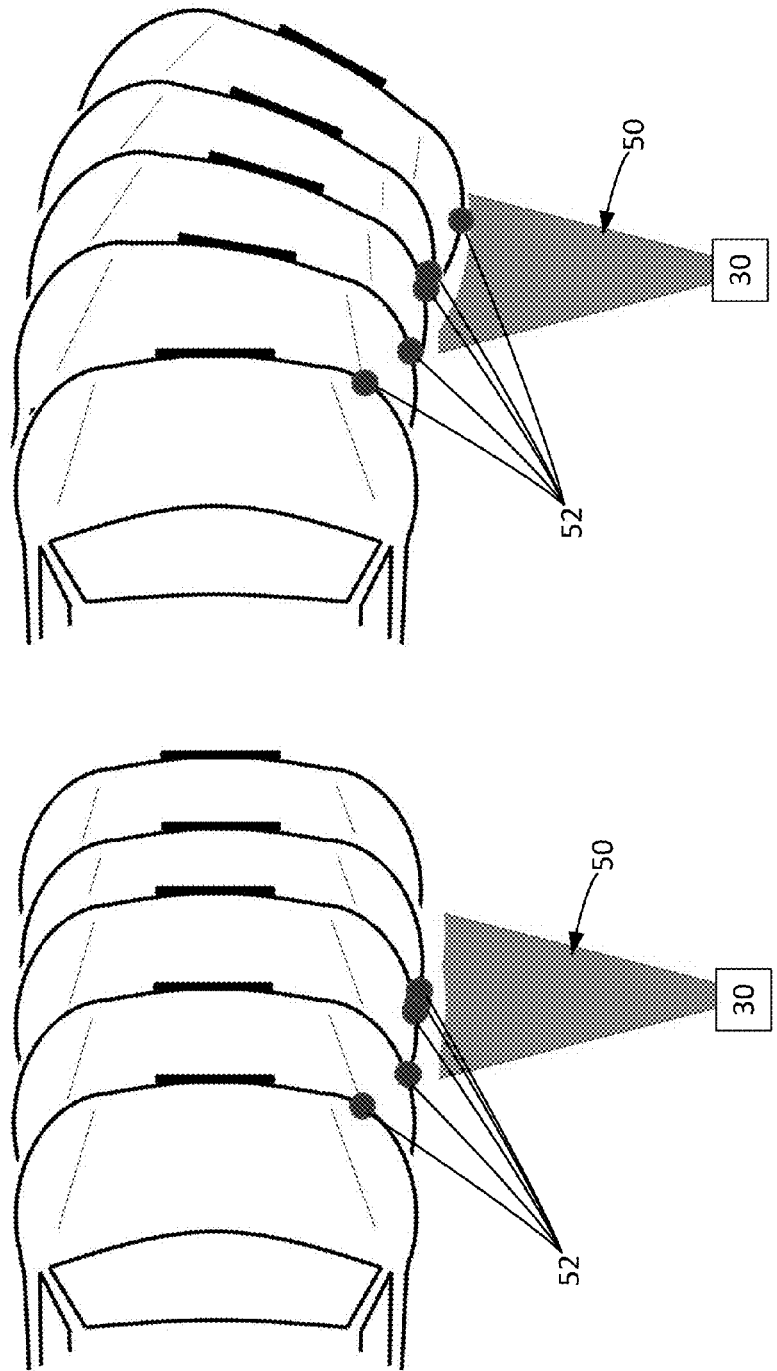

FIG. 35
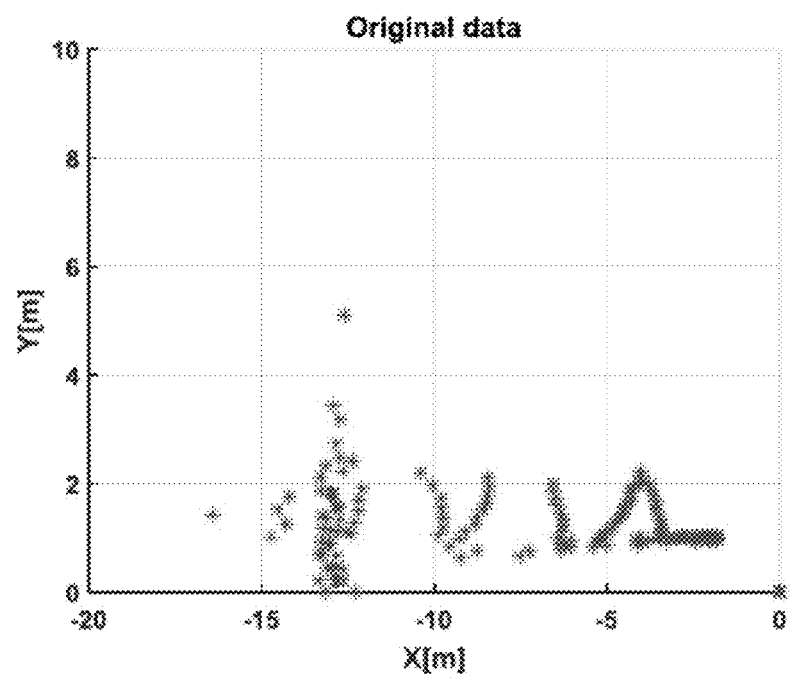
(a)
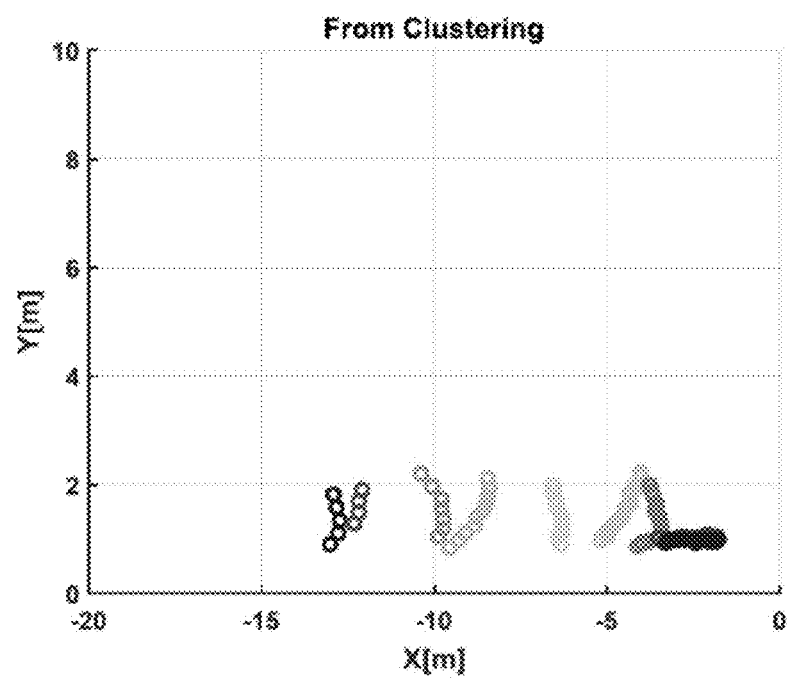
(b)

FIG. 36
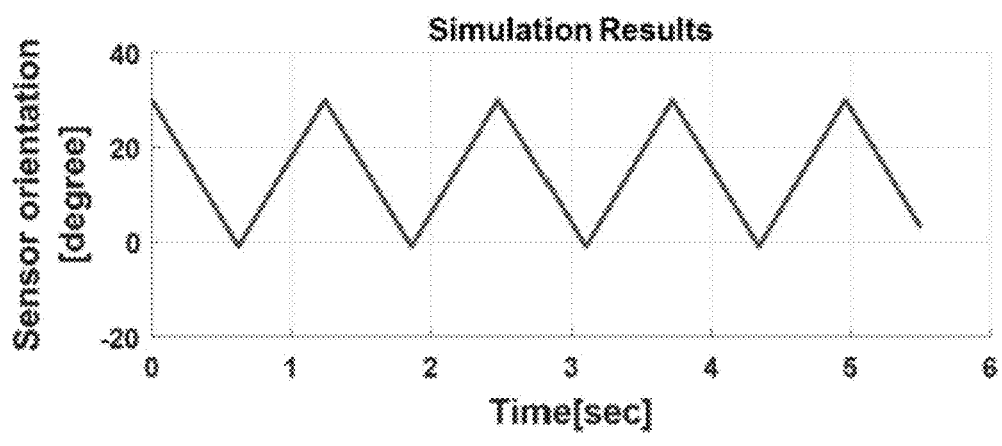
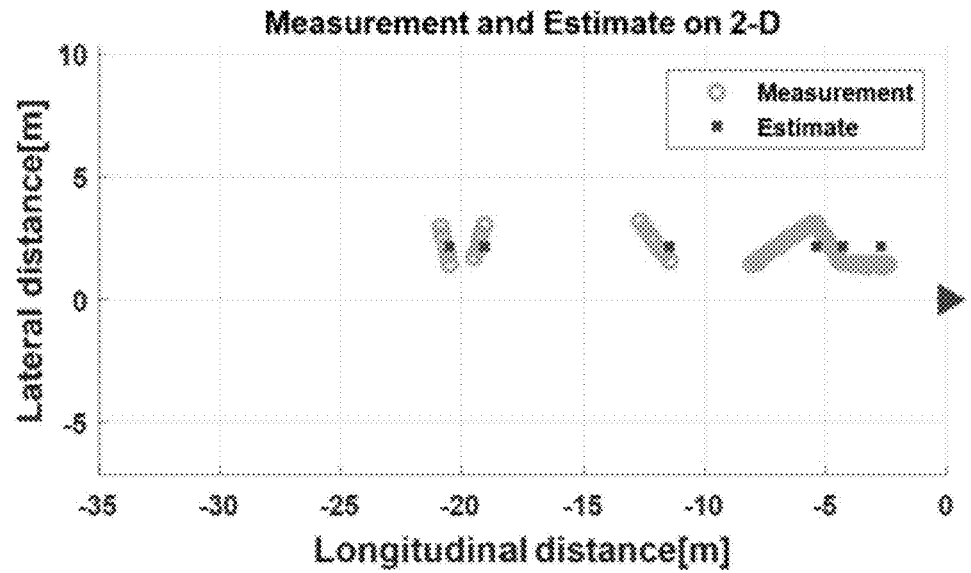

FIG. 37
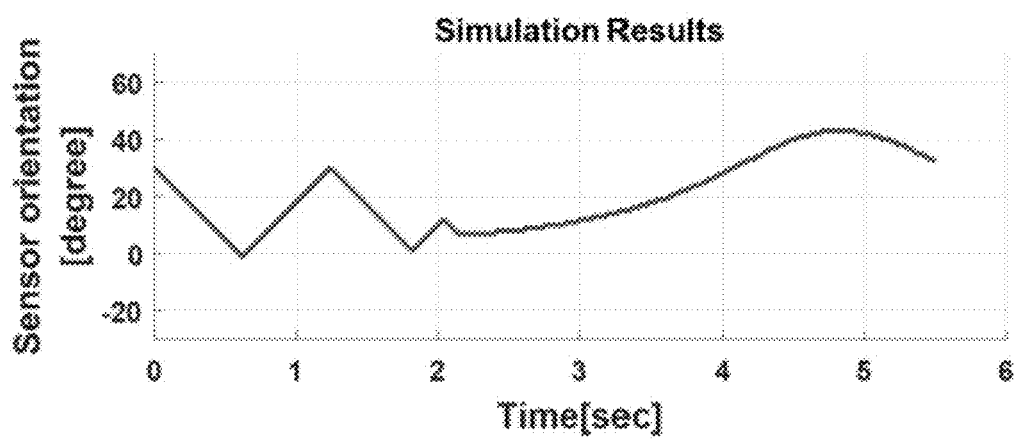
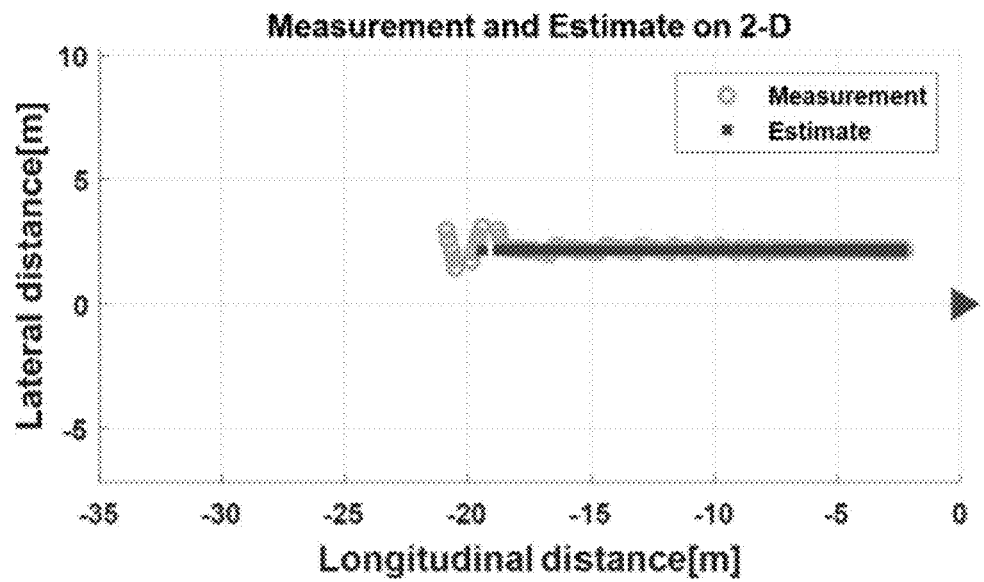

FIG. 40
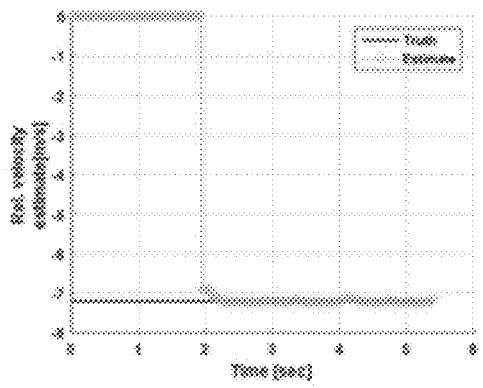
(a)
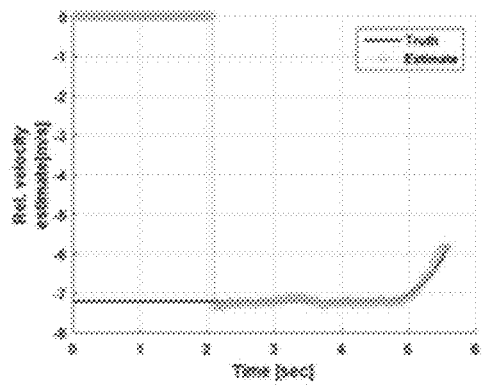
(b)
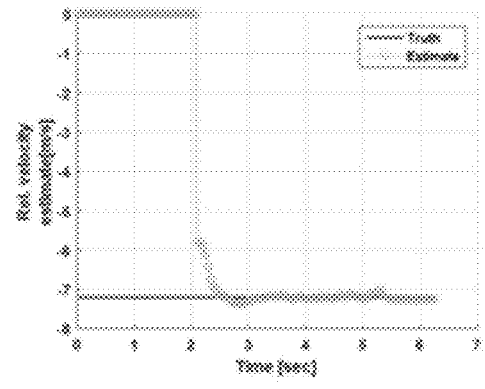
(c)
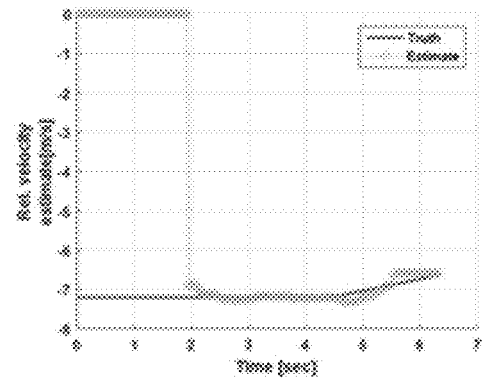
(d)

COLLISION DETECTION

This application claims the benefit of U.S. Provisional Patent Application Ser. No. 62/357,883 filed 1 Jul. 2016, entitled "COLLISION DETECTION," which is incorporated herein by reference in its entirety.

The Government has an interest in the patent as a result of funding derived from U.S. DOT/RITA Grant# DTRT13-G-UTC35.

The present disclosure pertains to collision detection and alert systems, apparatus, and methods for use with bicycles.

Over 49,000 bicyclist-motorist crashes were reported to police and resulted in 726 bicyclist fatalities in the United States in 2012. Likewise, a recent report from the Insurance Institute for Highway Safety (IIHS) finds that more than 3,300 bicyclist fatalities occurred in a five-year period from 2008 to 2012. In the IIHS study, 45% of the fatalities involved a vehicle traveling in the same direction as a bicyclist. This implies that the most common fatal bicyclist-motorist crash is likely by a vehicle approaching from behind the bicycle. Another report from the League of American Bicyclists also finds that the most common bicyclist-motorist collision type is a rear end collision (40%) which is "a hit from behind." Additionally, there is a sideswipe collision (4%) which is also caused by a vehicle initially approaching from the rear.

Automotive companies have developed a number of forward collision avoidance systems. Many of these systems utilize LIDAR or radar sensors or a combination thereof. However, these sensors are too big and too expensive (typically, costing thousands of dollars) for a bicycle.

Aftermarket camera based collision avoidance systems have also been commercially developed for cars. However, a continuous camera based system is difficult to power using batteries on a bicycle. Further, such camera-based systems are costly and additionally often require professional installation.

Another avenue of research has been use of aftermarket camera systems on cars and buses to detect bicycles and pedestrians. Bicyclists cannot depend on all the cars on the road being instrumented with such bicycle detection systems for their safety. It is likely to take decades before such systems can achieve adequate penetration among all vehicles on the road to make bicycling safer.

SUMMARY

The exemplary collision detection and alert systems, apparatus, and methods may include instrumentation for automatically monitoring distances to nearby vehicles on the road and alerting nearby motorists to the presence of the bicycle, in the event of danger of a collision. Unlike collision warning systems for cars, the exemplary systems may be lightweight, compact, and less expensive. Further, the exemplary systems, apparatus, and methods may be configured to handle complex collision scenarios and may effectively transmit warnings to drivers of other vehicles on the road, in addition to warning the bicyclist. Additionally, in one or more embodiments, the exemplary collision detection (e.g., avoidance) systems and apparatus may include custom-developed sensor systems and a black box video recording system The exemplary collision detection (e.g., avoidance) systems, apparatus, and methods for use with bicycles described herein may be described as focusing on rear, side, and front collision, and on crashes at intersections, alerting motorists to prevent the collision (e.g., not just warning the bicyclist), and including a black box video recorder that may store video images and other sensor data on the bicycle whenever a potential collision is predicted. Further, the exemplary systems, apparatus, and methods may be described as providing a human-centered warning system in which sensors, intelligent algorithms, and human-computer interfaces may provide timely and effective alerts to the human users driving the cars and the bicycle involved in an impending collision.

The exemplary collision detection systems may include instrumentation located on the bicycle and sold to the bicyclist, may not require the cars on the road to be equipped with any special instrumentation, may incorporate compact and lightweight sensors and electronics appropriately sized for a bicycle, may use equipment that has a reasonable total retail cost, and may incorporate algorithms or processes implemented on one or more microprocessors. The exemplary algorithms or processes may utilize sensor signals gathered, or acquired, from sensors on the bicycle to handle the complex collision scenarios involved in a bicycle-car interaction. Further, the exemplary collision detection systems and methods may be configured to address rear, side, and front collisions, and collisions from cross-traffic at a traffic intersection, may be based on human factors studies that ensure effectiveness at providing the right real-time alerts to the involved motorists and bicyclist, and make use of audio and visual signals originating from the bicycle and aimed at conveying real-time alerts to the human drivers of the involved motor cars and the bicycle.

It may be described that the exemplary systems, apparatus, and methods may provide vehicle detection and tracking for rear approaching vehicles, which may be used to predict impending collisions and provide warnings to both the bicyclist and the motorist behind the bicycle. Further, the collision warning systems, apparatus, and methods may be described as focusing on warning the motorist. If a danger of collision is detected, the bicycle provides a visual alert consisting of a red light, followed by a more intrusive increasingly intensive audio signal if the visual alert is inadequate. Having a sensor system entirely on a bicycle provides safety enhancement without a requirement for all the vehicles on the road to be instrumented with bicycle detection sensors. Furthermore, measuring the relative position and velocity of the vehicle and predicting a potential collision are more reliably done from the bicycle, rather than vice-versa.

One exemplary system for use with a bicycle may include rear sensing apparatus couplable to a bicycle, a side sensing apparatus couplable to the bicycle, an alert apparatus, and a computing apparatus including one or more processors operably coupled to the rear sensing apparatus, the side sensing apparatus, and the alert apparatus. The rear sensing apparatus may include one or more rear sensors to detect the distance from the bicycle to vehicles located behind the bicycle and the angle of the direction of motion of the vehicles located behind the bicycle relative to the direction of motion of the bicycle to provide rear vehicular data. The side sensing apparatus may include one or more side sensors to detect the distance from the bicycle to vehicles located beside the bicycle and the angle of the direction of motion of the vehicles located beside the bicycle relative to the direction of motion of the bicycle to provide side vehicular data. The alert apparatus may include a speaker to output sound to alert at least drivers of vehicles of potential collision situations. The computing apparatus may be configured to determine position data and velocity data of vehicles located behind the bicycle based on the rear vehicular data from the rear sensing apparatus, determine position data and velocity data of vehicles located beside the bicycle based on the side vehicular data from the side sensing apparatus, determine a potential collision situation based on at least one of the position data and the velocity data of a vehicle located behind or beside the bicycle, and issue an alert using the alert apparatus in response to determining a potential collision situation. Further, the alert may not be issued when the position data and velocity data of the vehicle indicate that the vehicle will safely pass by the bicycle without collision. The alert may include one or more sounds outputted by the speaker to alert at least the driver of the vehicle. Additionally, orientation data of the vehicles may also be determined by the computing apparatus using the rear sensing apparatus and used to detect a potential collision.

One exemplary method for use with a bicycle may include determining position data and velocity data of vehicles located behind a bicycle based on rear vehicular data from rear sensing apparatus. The rear sensing apparatus may include one or more rear sensors to detect the distance from the bicycle to vehicles located behind the bicycle and the angle of the direction of motion of the vehicles located behind the bicycle relative to the direction of motion of the bicycle to provide rear vehicular data. The exemplary method may further include determining position data and velocity data of vehicles located beside the bicycle based on side vehicular data from side sensing apparatus. The side sensing apparatus may include one or more side sensors to detect the distance from the bicycle to vehicles located beside the bicycle and the angle of the direction of motion of the vehicles located beside the bicycle relative to the direction of motion of the bicycle to provide side vehicular data. The exemplary method may further include determining a potential collision situation based on at least one of the position data and the velocity data of a vehicle located behind or beside the bicycle and issuing an alert using the alert apparatus in response to determining a potential collision situation. The alert may include one or more sounds outputted by a speaker to alert at least the driver of the vehicle.

In one or more embodiments, the velocity data of vehicles located beside the bicycle may include one or more of the relative lateral velocity of the vehicles, the relative longitudinal velocity of the vehicles, and the relative angular velocity of the vehicles. Determining a potential collision situation based on at least one of the position data and the velocity data of a vehicle located beside the bicycle may include comparing the relative lateral velocity of the vehicle to a first threshold, comparing the relative angular velocity of the vehicle to a second threshold, determining a potential collision situation if the relative lateral velocity of the vehicle meets or exceeds the first threshold and the relative angular velocity of the vehicle meets or exceeds the second threshold, comparing the distance from the bicycle to vehicles located beside the bicycle to a third threshold, and determining a potential collision situation if the distance is less than or equal to the third threshold.

In one or more embodiments, the distance from the bicycle to vehicles located behind the bicycle may include a longitudinal distance from the bicycle to the vehicles parallel to the direction of motion of the bicycle and a lateral distance from the bicycle to the vehicles projected direction of travel perpendicular to the direction of motion of the bicycle. Determining a potential collision situation based on at least one of the position data and the velocity data of a vehicle located behind the bicycle may include comparing the longitudinal distance to a first threshold, comparing the lateral distance to a second threshold, and determining a potential collision situation if the longitudinal distance is less than or equal to the first threshold or the lateral distance is less than or equal to the second threshold. The velocity data of vehicles located behind the bicycle may include one or more of the relative lateral velocity of the vehicles, the relative longitudinal velocity of the vehicles, and the relative angular velocity of the vehicles. Determining a potential collision situation based on at least one of the position data and the velocity data of a vehicle located behind the bicycle may include comparing one or more of the relative longitudinal velocity and the relative angular velocity of the vehicle to a third threshold and determining a potential collision situation if one or more of the relative longitudinal velocity and the relative angular velocity of the vehicle meets or exceeds the third threshold.

In one or more embodiments, the one or more rear sensors may include a laser sensor to provide rear vehicular data. Further, in at least one embodiment, the rear sensing apparatus may include a rotating member coupled to the one or more rear sensors (e.g., the laser sensor) to rotate the one or more rear sensors (e.g., the laser) about an axis and the computing apparatus may further be configured execute or the method may further include controlling the rotating member to rotate about the axis to continuously track a moving vehicle using the one or more rear sensors (e.g., the laser sensor). Still further, in at least one embodiment, the computing apparatus may be further configured to execute or the method may further include detecting one of the front corners of the vehicle located behind the bicycle using the one or more rear sensors (e.g., the laser sensor) so as to compute both the lateral and longitudinal distance of the vehicle. Yet still further, in at least one embodiment, the computing apparatus may be further configured to execute or the method may further include determining whether reflections (e.g., laser reflections) sensed by the one or more rear sensors (e.g., the laser sensor) are from a front surface or a side surface of the vehicle so as to compute the lateral or longitudinal distance of the vehicle.

In one or more embodiments, the side sensing apparatus may include a sonar system, and the one or more side sensors may include a sonar transmitter to transmit acoustic and/or electromagnetic energy in the sonar frequency range and two or more sonar receivers to receive reflected acoustic and/or electromagnetic energy in the sonar frequency range to provide side vehicular data, In one or more embodiments, the alert apparatus further may include visual output apparatus to emit light or transmit visual messages to alert at least drivers of vehicles of potential collision situations, and the alert may include light or visual messages outputted by the visual output apparatus.

In one or more embodiments, the system further may include front sensing apparatus couplable to the bicycle and including one or more front sensors to detect the distance from the bicycle to a vehicle located in front of the bicycle and the angle of the direction of motion of the vehicle located in front of the bicycle relative to the direction of motion of the bicycle to provide front vehicular data. The computing apparatus may be further configured to execute or the methods may further include determining position data and velocity data of vehicles located in front of the bicycle based on front vehicular data from the front sensing apparatus and determining a potential collision situation based on at least one of the position data and the velocity data of a vehicle located in front of the bicycle. Further, in at least one embodiment, the one or more front sensors may include a laser sensor to provide front vehicular data and the front sensing apparatus may include a rotating member coupled to the one or more front sensors (e.g., the laser sensor) to rotate the one or more front sensors (e.g., the laser sensor) about an axis. The computing apparatus may be further configured execute or the method may further include rotating the one or more front sensors (e.g., the laser sensor) about the axis to scan an area in front of the bicycle to actively detect one of the corners of the vehicle located in front of the bicycle. Still further, in at least one embodiment, the computing apparatus may be further configured to execute or the methods may further include determining an upcoming intersection based on data from the front sensing apparatus, predicting trajectories of vehicles in the upcoming intersection using at least the road geometry of the intersection, and determining a collision potential situation based at least on the predicted trajectories of vehicles in the upcoming intersection. Yet still further, in at least one embodiment, the computing apparatus may be further configured to execute or the methods may further include determining whether an upcoming intersection is free of a potential collision based on data from the front sensing apparatus and issuing an intersection clear alert using the alert apparatus in response to determining that an intersection is upcoming. Also, the intersection clear alert may include one or more sounds outputted by the speaker.

In at least one embodiment, the system may be configured to monitor vehicles turning left at an intersection that could result in the left-turning vehicle colliding with the bicycle. Further, it may be described that the system may be further configured to analyze the traffic at an intersection to at least detect one or more of a left turning vehicle, a vehicle stopped and waiting to turn left to determine a collision potential situation. In at least one embodiment, the system may be configured to monitor vehicles standing at a traffic light, waiting to turn left at the intersection that could result in the left-turning vehicle colliding within the bicycle. In at least one embodiment, the system may be configured to monitor vehicles traveling in a direction perpendicular to the bicycles direction of travel to prevent side collisions with the bicycle at a traffic intersection. In other words, the system may be configured to analyze the traffic at a traffic intersection travelling in a direction approximately perpendicular to the bicycle's direction of motion to determine a collision potential situation.

Further, intersection data may be acquired by the system from a plurality of different sources such as map databases, positioning systems (e.g. global positioning systems, assisted global positioning systems, wireless network positioning systems, etc.), and the front sensing apparatus including laser sensors, sonar sensors, multibeam sensor systems, optical sensors systems, etc. In other words, intersections may be detected for use with the exemplary systems, apparatus, and methods described herein in a plurality of different ways using a plurality of different systems and devices.

In one or more embodiments, issuing an alert using the alert apparatus in response to determining a potential collision situation may include issuing a preliminary collision alert using the alert apparatus in response to determining a potential collision situation and issuing an imminent collision alert using the alert apparatus in response to determining that the potential collision situation has not ceased. The imminent collision alert may be issued closer to the potential collision situation than the preliminary collision alert, and the imminent collision alert may be configured to be more intrusive/noticeable to the driver of the vehicle of the potential collision situation than the preliminary collision alert. In at least one embodiment, the preliminary collision alert may include a visual alert and the imminent collision alert may include an auditory alert.

In one or more embodiments, the computing apparatus may be further configured to execute or the methods may further include determining that the potential collision situation has ceased based on at least one of the position data and the velocity data of the vehicle located behind or beside the bicycle after determining the potential collision situation and issuing a clear alert using the alert apparatus in response to determining that the potential collision situation has ceased. The clear alert may include one or more sounds outputted by the speaker.

In one or more embodiments, the exemplary system may further include a video recording apparatus to record video in at least one direction from the bicycle.

One exemplary system for use with a bicycle may include a side sensing apparatus couplable to the bicycle. The side sensing apparatus may include one or more side sensors to detect the distance from the bicycle to vehicles located beside the bicycle and the angle of the direction of motion of the vehicles located beside the bicycle relative to the direction of motion of the bicycle to provide side vehicular data. The system may further include a computing apparatus comprising one or more processors operably coupled to the side sensing apparatus. The computing apparatus may be configured to determine position data and velocity data of vehicles located beside the bicycle based on the side vehicular data from the side sensing apparatus and a potential collision situation based on at least one of the position data and the velocity data of a vehicle located beside the bicycle.

One exemplary system for use with a bicycle may include a front sensing apparatus couplable to a bicycle. The front sensing apparatus may include one or more front sensors to detect the distance from the bicycle to vehicles located in front the bicycle and the angle of the direction of motion of the vehicles located in front the bicycle relative to the direction of motion of the bicycle to provide front vehicular data. The system may further include an alert apparatus comprising a speaker to output sound to alert at least drivers of vehicles of potential collision situations and a computing apparatus comprising one or more processors operably coupled to the front sensing apparatus and the alert apparatus. The computing apparatus may be configured to: determine position data and velocity data of vehicles located in front of the bicycle based on the front vehicular data from the front sensing apparatus, determine a potential collision situation based on at least one of the position data and the velocity data of a vehicle located in front of the bicycle, and issue an alert using the alert apparatus in response to determining a potential collision situation, wherein the alert comprises one or more sounds outputted by the speaker to alert at least the driver of the vehicle.

The exemplary systems, apparatus, and methods described herein may be described, in one or more aspects, as focusing collision avoidance for bicycles for prediction and prevention of rear and side crashes at intersections using, e.g., one or more of sonar and laser sensors and associated position estimation algorithms for tracking. In one embodiment, a custom sonar sensor with one sonar transmitter and two receivers may be used to estimate both the distance and angular orientation of vehicles on the sides of the bicycle. A custom single-target laser sensor on a rotating platform maybe used to track longer distance vehicles. Further, a model predictive control formulation may be used to determine the real-time orientation of the rotating laser platform.

The exemplary systems, apparatus, and methods may be described as being focused a collision avoidance system for prediction and prevention of rear and side crashes between motorists and bicyclists at traffic intersections. One exemplary system may include a custom sonar and a custom laser sensor and associated estimation algorithms. A custom sonar sensor with one sonar transmitter and two receivers may be used to estimate both the distance and angular orientation of vehicles on the sides of the bicycle. A custom single-target laser sensor on a rotating platform may be used to track longer distance vehicles. Further, a model predictive control formulation may be used to determine the real-time orientation of the rotating laser platform, in order to track moving vehicles of interest.

The exemplary systems, apparatus, and methods may be further described as providing active sensing for a bicycle to accurately track at least rear vehicles. In one or more embodiments, a single beam laser sensor may be mounted on a rotationally controlled platform for this sensing mission. The rotational orientation of the laser sensor may be controlled in real-time in order to focus on a target point on the vehicle, as the vehicle's lateral and longitudinal distances change. This exemplary tracking processes may involve two or more aspects such as, e.g., first, controlling the real-time angular position of the laser sensor based on limited information, and second, tracking the vehicle's position for different types of maneuvers. In at least one embodiment, the first aspect may be addressed by an exemplary algorithm to detect whether a reflection is from the front or side of the target vehicle, and then controlling sensor orientation to alternately obtain both lateral and longitudinal distance measurements. In at least one embodiment, the second aspect may be addressed by using an interacting multiple model observer that incorporates straight and turning vehicle motion models. In other words, the exemplary systems, apparatus, and methods may be generally described as a target tracking system that can track a rear vehicle that might be right behind the bicycle, or in an adjacent lane next to a bicycle lane, and might be traveling straight or turning in either direction.

The exemplary systems, apparatus, and methods may use one or more sensors that can be used on a bicycle for tracking distances to other vehicles on the road. At least one the sensors may be a single beam laser sensor mounted on a rotationally controlled platform for tracking rear vehicles, in order to provide collision warnings to both the motorist and bicyclist. Since the laser sensor could only measure one reflection at a time, the rotational orientation of the laser sensor may be controlled in real-time in order to focus on a target point on the vehicle, as the vehicle's lateral and longitudinal distances keep changing. This tracking may involve two challenges such as controlling the real-time angular position of the laser sensor based on very limited information obtained from reflection, which may be addressed by developing an algorithm to detect whether a reflection is from the front or side of the target vehicle and then controlling sensor orientation appropriately to track the right corner point of the vehicle, and tracking the vehicle's position for different types of maneuvers, which may be addressed by using a interacting multiple model observer that incorporated both straight and turning vehicle motion models. As further described herein, simulation results may show that the exemplary systems, apparatus, and methods may perform significantly better than simple systems based on assumptions that all reflections occurred from the front surface of the vehicle.

The exemplary systems, apparatus, and methods may include, or utilize, a single beam laser sensor mounted on a rotationally controlled platform for detection and tracking of rear vehicles, in order to provide collision warnings to both the motorist and bicyclist. Since the laser sensor may only measure one reflection at a time, the rotational orientation of the laser sensor may be controlled in real-time in order to detect and continue to focus on the tracked vehicle, as the vehicle's lateral and longitudinal distances keep changing. This exemplary tracking may include controlling the real-time angular position of the laser sensor to stay focused on the vehicle, even without knowledge of the vehicle's future trajectory, which may be addressed by an active sensing algorithm that uses a receding horizon framework for active orientation control and an interacting multiple model framework for vehicle state estimation. The receding horizon controller may determine the optimal control input to the sensor based on predicted future vehicle motion under control input constraints. The vehicle motion may be predicted in the interacting multiple model (IMM) framework. The interacting multiple model (IMM) may provide accurate vehicle motion estimates for different types of maneuvers.

The above summary is not intended to describe each embodiment or every implementation of the present disclosure. A more complete understanding will become apparent and appreciated by referring to the following detailed description and claims taken in conjunction with the accompanying drawings.

The disclosure may be more completely understood in consideration of the following detailed description of various embodiments of the disclosure in connection with the accompanying drawings.

BRIEF DESCRIPTION OF THE DRAWINGS

FIG. 2 is a block diagram of an exemplary system.

FIG. 4 is an overhead diagram depicted a measurement pattern in a sensing region.

FIG. 35 includes two graphs displaying experimental results of real laser scans using a 30-degree fixed range where (a) is raw data and (b) is results using a clustering method (with different shades representing different scans).

FIG. 36 includes two graphs displaying orientation and lateral distance data from simulation results using fixed-range scans.

FIG. 37 includes two graphs displaying orientation and lateral distance data from simulation results using exemplary one-dimensional tracking including receding horizon optimization processes.

FIG. 40 includes four graphs displaying data from simulation results including relative velocity over time: (a) where a car is approaching right, or directly, behind the bicycle; (b) where a car is changing lanes to the right of the bicycle; (c) where a car is passing by; and (d) where a car is changing lanes to the left of the bicycle.

DETAILED DESCRIPTION

Exemplary systems, apparatus, and methods shall be described with reference to the Figures. It will be apparent to one skilled in the art that elements or processes from one embodiment may be used in combination with elements or processes of the other embodiments, and that the possible embodiments of such systems, apparatus, and methods using combinations of features set forth herein is not limited to the specific embodiments shown in the Figures and/or described herein. Further, it will be recognized that the embodiments described herein may include many elements that are not necessarily shown to scale. Still further, it will be recognized that timing of the processes and the size and shape of various elements herein may be modified but still fall within the scope of the present disclosure, although certain timings, one or more shapes and/or sizes, or types of elements, may be advantageous over others.

Figure 1:
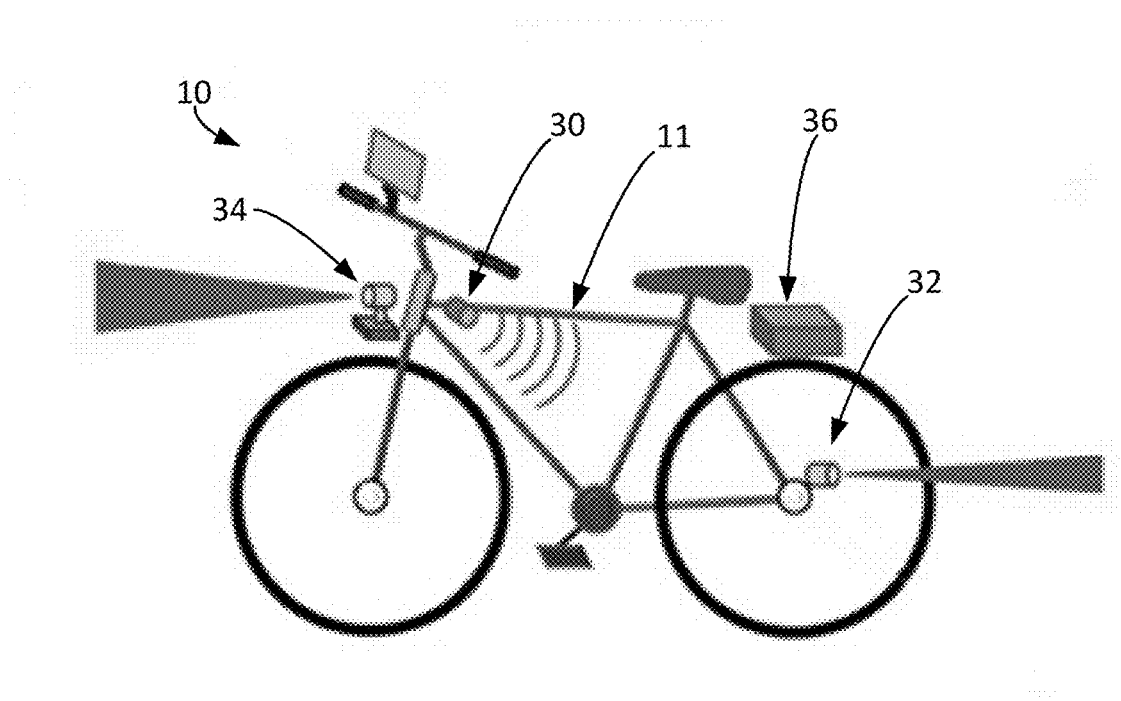
FIG. 1 depicts an exemplary system coupled to a bicycle.

A bicycle 11 is depicted in FIG. 1. The exemplary systems, apparatus, and methods may be used with the bicycle 11 to, e.g., detect collisions, provide alerts with respect to imminent collisions, etc. as will be further described herein. As shown, an exemplary collision detection system 10 is coupled to the bicycle 11. The system 10 may include one or more of side sensing apparatus 30, rear sensing apparatus 32, and front sensing apparatus 34, each of which are operably coupled to a computing apparatus or controller located in a housing 36 as further described herein with respect to FIG. 1. The housing 36 may further include a power source (e.g., battery), a speaker, lights, a video capturing system, etc.

The side sensing apparatus 30 may include one or more side sensors to detect vehicles or object that are at least partially located to the side of the bicycle 11. In other words, the bicycle 11 may be described as traveling in a forward direction along a traveling axis, and the side sensing apparatus 30 may be configured to detect vehicles or objects that are to the left or right of the traveling axis. Further, it may be described that the direction perpendicular to the traveling axis may be a lateral direction while a direction parallel to the traveling axis may be a longitude direction. In one or more embodiments, the side sensing apparatus 30 may be configured to direct vehicles or objects that are located laterally from the bicycle 11. Further, although the side sensing apparatus 30 of FIG. 1 appears to emit a signal (e.g., sonar signal) in a single lateral direction, it is to be understood that the side sensing apparatus 30 may be configured to detect laterally located objects or vehicles on both sides of the bicycle 11. In one or more embodiments, the side sensing apparatus 30 may be configured to detect, or measure, the distance from the bicycle 11 to vehicles located beside the bicycle 11 and the angle of the direction of motion of the vehicles located beside the bicycle 11 relative to the direction of motion (e.g., along the traveling axis) of the bicycle 11 to provide side vehicular data.

The side sensing apparatus 30 may be, or may include, a sonar system, and the one or more side sensors may include a sonar transmitter to transmit acoustical and/or electromagnetic energy in the sonar frequency range and two or more sonar receivers to receive reflected acoustical and/or electromagnetic energy in the sonar frequency range to provide side vehicular data.

The rear sensing apparatus 32 may include one or more rear sensors to detect the distance from the bicycle 11 to vehicles located behind the bicycle 11 and the angle of the direction of motion of the vehicles located behind the bicycle 11 relative to the direction of motion (e.g., along the traveling axis) of the bicycle 11 to provide rear vehicular data. In one or more embodiments, the rear sensing apparatus 32 may be configured to determine position data and velocity data of vehicles located behind the bicycle based on the rear vehicular data. Further, the rear sensing apparatus 32 may be a laser sensor. The laser sensor may be coupled to a controllable, rotatable platform that rotates along an axis perpendicular to the ground surface to, e.g., continuously track a moving vehicle using the laser sensor.

The rear sensing apparatus 32 may be configured to detect a front corner of the vehicle located behind the bicycle 11 using the laser sensor, which may be used to compute both the lateral and longitudinal distance of the vehicle. Further, laser reflections sensed by the laser sensor may be from a front surface or a side surface of the vehicle, and computing apparatus maybe used to determine whether the reflections come from the front or side surface so as to compute the lateral or longitudinal distance of the vehicle.

The front sensing apparatus 34 may include one or more front sensors to detect the distance from the bicycle to a vehicle located in front of the bicycle 11 and the angle of the direction of motion of the vehicle located in front of the bicycle 11 relative to the direction of motion of the bicycle 11 to provide front vehicular data. The front vehicular data may be used to determine position data and velocity data of vehicles located in front of the bicycle, and determine a potential collision situation. More specifically, the front vehicular data may be further used to determine collision situations in intersections such as, e.g., cars turning through intersections, cars traveling perpendicular to the bicycle through the intersections, stationary cars at intersection that could move through the intersection at a later time, etc. The front sensing apparatus 34 may be similar to the rear sensing apparatus 32 described herein, and may use similar tracking processes, algorithms, and techniques as further described herein.

The exemplary collision detection system 10 used to execute, or perform, the exemplary methods and/or processes described herein is further depicted diagrammatically in FIG. 2. As shown, the exemplary system 10 may include computing apparatus 12. The computing apparatus 12 may be configured to receive input from input apparatus 20 and transmit output to the output apparatus 22.

Further, the computing apparatus 12 may include data storage 14. Data storage 14 may allow for access to processing programs or routines 16 and one or more other types of data 18 (e.g., sensor data, camera data, video, sounds, parameters, metrics, variables, etc.) that may be employed to perform, or carry out, exemplary methods and/or processes (e.g., collision avoidance, collision detection, distance and velocity measurements, alert generation and issuance, etc.) for use in performing collision detection and/or avoidance. The computing apparatus 12 may be operatively coupled to the input apparatus 20 and the output apparatus 22 to, e.g., transmit data to and from each of the input apparatus 20 and the output apparatus 22. For example, the computing apparatus 12 may be electrically coupled to each of the input apparatus 20 and the output apparatus 22 using, e.g., analog electrical connections, digital electrical connections, wireless connections, bus-based connections, etc.

Further, various devices and apparatus may be operatively coupled to the computing apparatus 12 to be used with the computing apparatus 12 to perform one or more collision detection and/or avoidance processes as well as the other functionality, methods, and/or logic described herein. The input apparatus 20 may include any apparatus capable of providing input to the computing apparatus 12 to perform the functionality, methods, and/or logic described herein.

For example, the input apparatus 20 may include one or more sensors configured to provide vehicular distance data and vehicular angular data regarding one or more vehicles with respect to a bicycle. The input apparatus 20 may include sensors various sensing mechanisms, such as sonar, radar, LIDAR, and laser transducer systems. Further, such input apparatus 20 may be coupled to a bicycle and positioned to gather data from around the bicycle. For example, input apparatus 20 may be configured to sense vehicular data from the side, front, and/or rear of the bicycle. In at least one embodiment, the input apparatus 20 may include one sensor system using a first sensing modality for sensing vehicular data from the side of the bicycle and another sensor system using a second sensing modality for sensing vehicular data from the rear of the bicycle. Still further, the input apparatus 20 may include a plurality of transmitting elements (e.g., to emit acoustical and/or electromagnetic energy) and receiving elements (e.g., to receive reflected acoustical and/or electromagnetic energy).

The output apparatus 22 may include any apparatus capable of providing output to drivers of vehicles and/or cyclists riding bicycles, which may be in danger of collision. The output apparatus 22 may include auditory output apparatus, visual output apparatus, somatosensory (e.g., haptic) output apparatus. For example, the auditory output apparatus may include one or more horns, buzzers, speakers, etc. configured to be able to alert cyclists and drivers, including drivers in enclosed vehicles, to a potential collision. For example, the visual output apparatus may include one or more lights such as light emitting diodes (e.g., light emitting diode message signs), etc. configured to be able to alert cyclists and drivers, including drivers in enclosed vehicles, to a potential collision. For example, the somatosensory output apparatus may include one or more vibration elements (e.g., to deliver vibrations to a cyclist's body portions), etc. configured to be able to alert cyclists and drivers, including drivers in enclosed vehicles, to a potential collision.

The processing programs or routines 16 may include programs or routines for performing computational mathematics, collision detection algorithms, spatial algorithms, process automation algorithms, matrix mathematics, standardization algorithms, comparison algorithms, active sensing algorithms, active control algorithms for sensor orientation and/or position on a bicycle, or any other processing required to implement one or more exemplary methods and/or processes described herein. Data 18 may include, for example, sensor data, variables, results from one or more processing programs or routines employed according to the disclosure herein, or any other data that may be necessary for carrying out the one and/or more processes or methods described herein.

In one or more embodiments, the system 10 may be implemented using one or more computer programs executed on programmable computers, such as computers that include, for example, processing capabilities, data storage (e.g., volatile or non-volatile memory and/or storage elements), input devices, and output devices. Program code and/or logic described herein may be applied to input data to perform functionality described herein and generate desired output information. The output information may be applied as input to one or more other devices and/or methods as described herein or as would be applied in a known fashion.

The programs used to implement the methods and/or processes described herein may be provided using any programmable language, or code, e.g., a high-level procedural and/or object orientated programming language or code that is suitable for communicating with a computer system. Any such programs may, for example, be stored on any suitable device, e.g., a storage media, that is readable by a general or special purpose program running on a computer system (e.g., including processing apparatus) for configuring and operating the computer system when the suitable device is read for performing the procedures described herein. In other words, at least in one embodiment, the system 10 may be implemented using a computer readable storage medium, configured with a computer program, where the storage medium so configured causes the computer to operate in a specific and predefined manner to perform functions described herein. Further, in at least one embodiment, the system 10 may be described as being implemented by logic (e.g., object code) encoded in one or more non-transitory media that includes code for execution and, when executed by a processor, is operable to perform operations such as the methods, processes, and/or functionality described herein.

The computing apparatus 12 may be, for example, any fixed or mobile computer system (e.g., a controller, a microcontroller, a personal computer, minicomputer, etc.). The exact configuration of the computing apparatus 12 is not limiting, and essentially any device capable of providing suitable computing capabilities and control capabilities may be used as described herein, a digital file may be any medium (e.g., volatile or non-volatile memory, a CD-ROM, a punch card, magnetic recordable tape, etc.) containing digital bits (e.g., encoded in binary, trinary, etc.) that may be readable and/or writeable by computing apparatus 12 described herein. Also, as described herein, a file in user-readable format may be any representation of data (e.g., ASCII text, binary numbers, hexadecimal numbers, decimal numbers, graphically, etc.) presentable on any medium (e.g., paper, a display, etc.) readable and/or understandable by an operator.

In view of the above, it will be readily apparent that the functionality as described in one or more embodiments according to the present disclosure may be implemented in any manner as would be known to one skilled in the art. As such, the computer language, the computer system, or any other software/hardware which is to be used to implement the processes described herein shall not be limiting on the scope of the systems, processes or programs (e.g., the functionality provided by such systems, processes or programs) described herein.

The methods and/or logic described in this disclosure, including those attributed to the systems, or various constituent components, may be implemented, at least in part, in hardware, software, firmware, or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, or other devices. The term "processor" or "processing circuitry" may generally refer to any of the foregoing logic circuitry, alone or in combination with other logic circuitry, or any other equivalent circuitry.

Such hardware, software, and/or firmware may be implemented within the same device or within separate devices to support the various operations and functions described in this disclosure. In addition, any of the described components may be implemented together or separately as discrete but interoperable logic devices. Depiction of different features, e.g., using block diagrams, etc., is intended to highlight different functional aspects and does not necessarily imply that such features must be realized by separate hardware or software components. Rather, functionality may be performed by separate hardware or software components, or integrated within common or separate hardware or software components.

When implemented in software, the functionality ascribed to the systems, devices and methods described in this disclosure may be embodied as instructions and/or logic on a computer-readable medium such as RAM, ROM, NVRAM, EEPROM, FLASH memory, magnetic data storage media, optical data storage media, or the like. The instructions and/or logic may be executed by one or more processors to support one or more aspects of the functionality described in this disclosure.

Figure 3A:
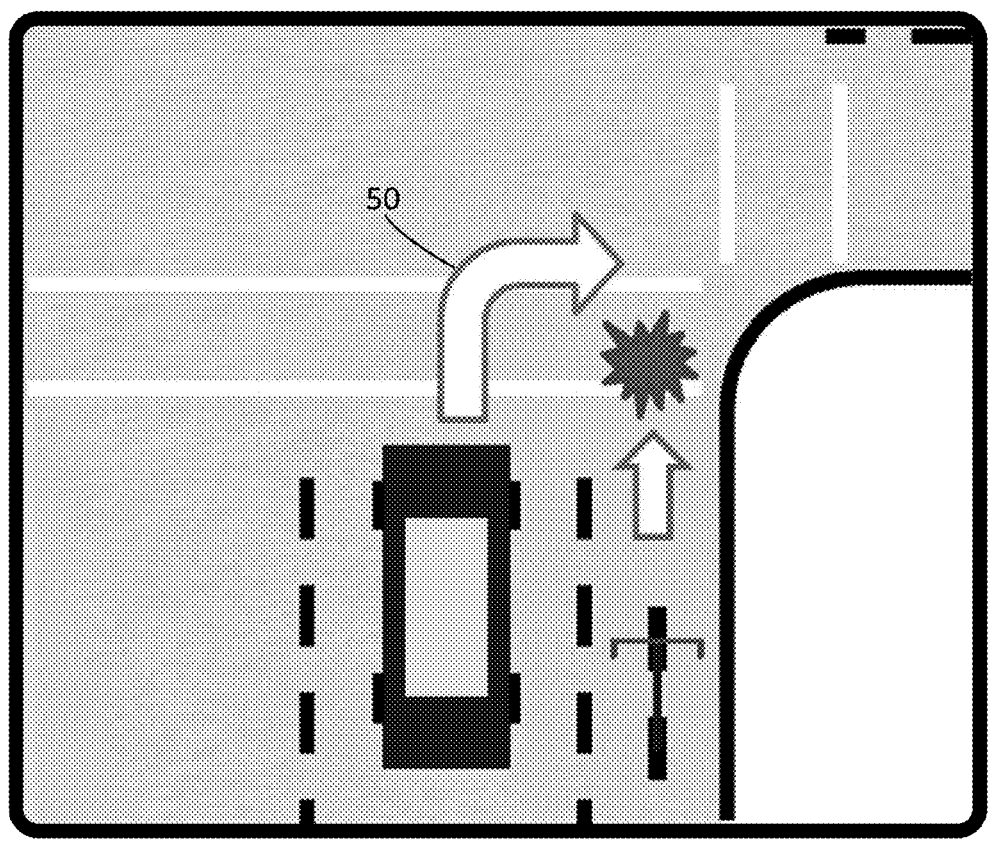
FIG. 3A is an overhead diagram of a potential side collision by a right turning vehicle.

When a bicycle is in the blind spot of a driver, the bicyclist could be in danger due to a right turning car 40, as shown in FIG. 3A. In order to prevent a collision, an exemplary sensor systems, apparatus, and methods may be used to detect and track the car during this maneuver. For example, a system may include side sensing apparatus 30 (e.g., sonar system) may be used on the left side of the bicycle to address this scenario.

Bicyclist-motorist crashes in which the bicycle is riding through the intersection while the motorist is making a right turn 50 have relatively small pre-collision space and occur very quickly. Thus, a rapid warning decision may be helpful. Also, the warning system may provide an alert to the motorist in order to make the motorist aware of the bicyclist's presence. Typically, the motorist fails to see the bicyclist in this type of collision although the motorist has more control to avoid or mitigate damage from the collision.

Figure 3B:
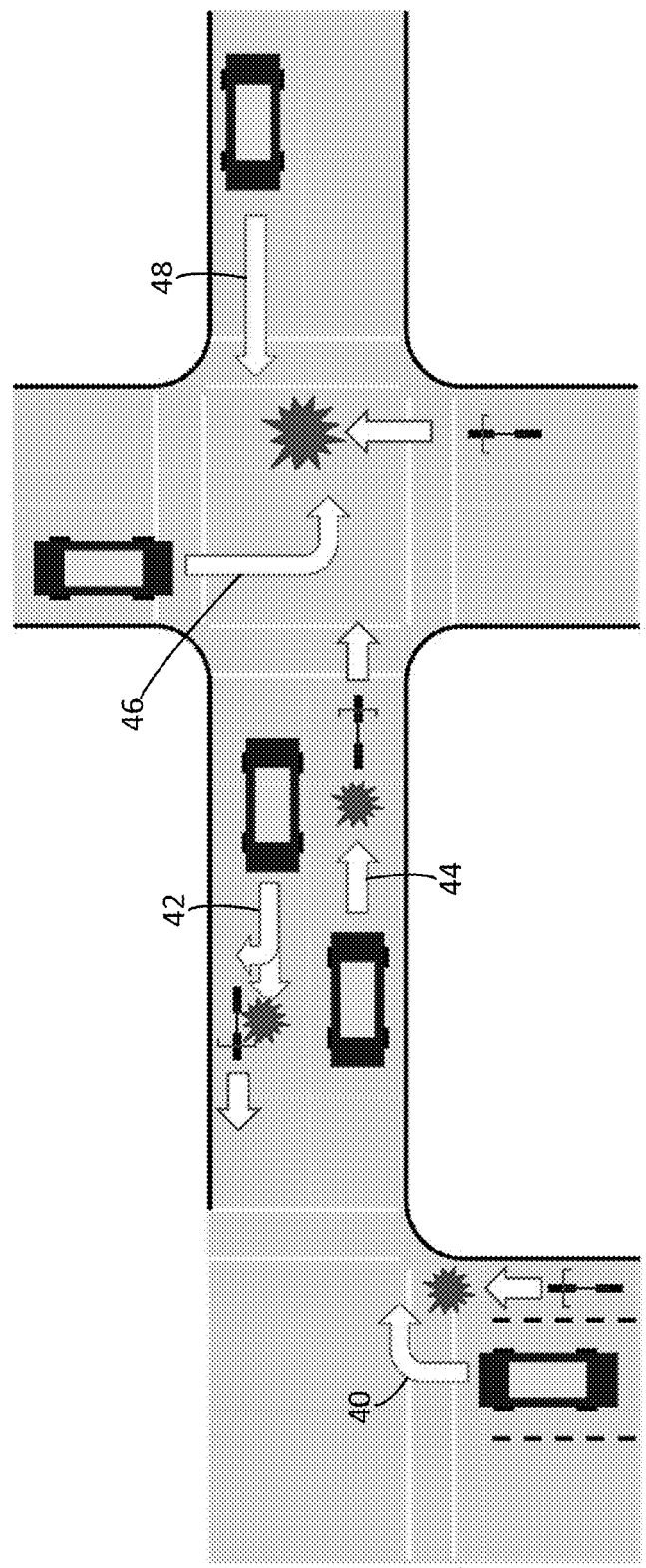
FIG. 3B is an overhead diagram of multiple potential side collisions by vehicles.

Further, vehicles approaching 44 from the rear of the cyclist and/or approaching from the rear and drifting right 42 toward the cyclist driver may also result in a collision or potential collision as shown in FIG. 3B. In order to prevent such collisions, an exemplary sensor systems, apparatus, and methods may be used to detect and track the car during these rear approaching maneuvers. For example, a system may include rear sensing apparatus 32 (e.g., a laser system) on the rear side of the bicycle to address these types of scenarios.

Still further, intersections may provide a plurality of different types of collision situations. For example, vehicles turning across 46 an intersection and pass through 48 an intersection may result in a collision or potential collision as shown in FIG. 3B. In order to prevent such collisions, an exemplary sensor systems, apparatus, and methods may be used to detect and track the car during these front approaching and crossing maneuvers. For example, a system may include front sensing apparatus 34 (e.g., a laser system) on the front side of the bicycle to address these types of scenarios.

Sonar sensors may be considered for these types of systems since they have suitable price, weight, and size for bicycle applications. However, early prediction of the side car's maneuvers and in differentiating between a straight driving and turning car may be challenging as shown in FIG. 4. As shown, side sensing apparatus 30 using sonar 50 to take a plurality of measurements 52 over time. The car is driving straight on the left side of the figure and is turning on the right side of the figure. As shown, the sonar measurements 52 appear somewhat similar in both cases depicted the car traveling straight in the first case and turning into, or towards, side sensing apparatus 30 in the second case.

Due to sensor characteristics and common car shapes, the range measurement from the sensor decreases when the side car is entering the sensing region of the sonar. After the car fully enters in the sensing region, the two maneuver cases then provide different trends of the range measurement. However, it may be challenging to predict the turning maneuver early using only range measurement information, and consequentially, more information may be used to measure both range and vehicle orientation as described further herein The exemplary side sensing apparatus 30 may include one transmitter and two receivers so that the system can measure not only the distance to the object (e.g., car) but also the angular orientation of the object's side surface. This exemplary side sensing apparatus 30 can be operated, for example, with a 50 Hz sampling rate and may provide up to 6 meters of range measurement.

Figure 5:
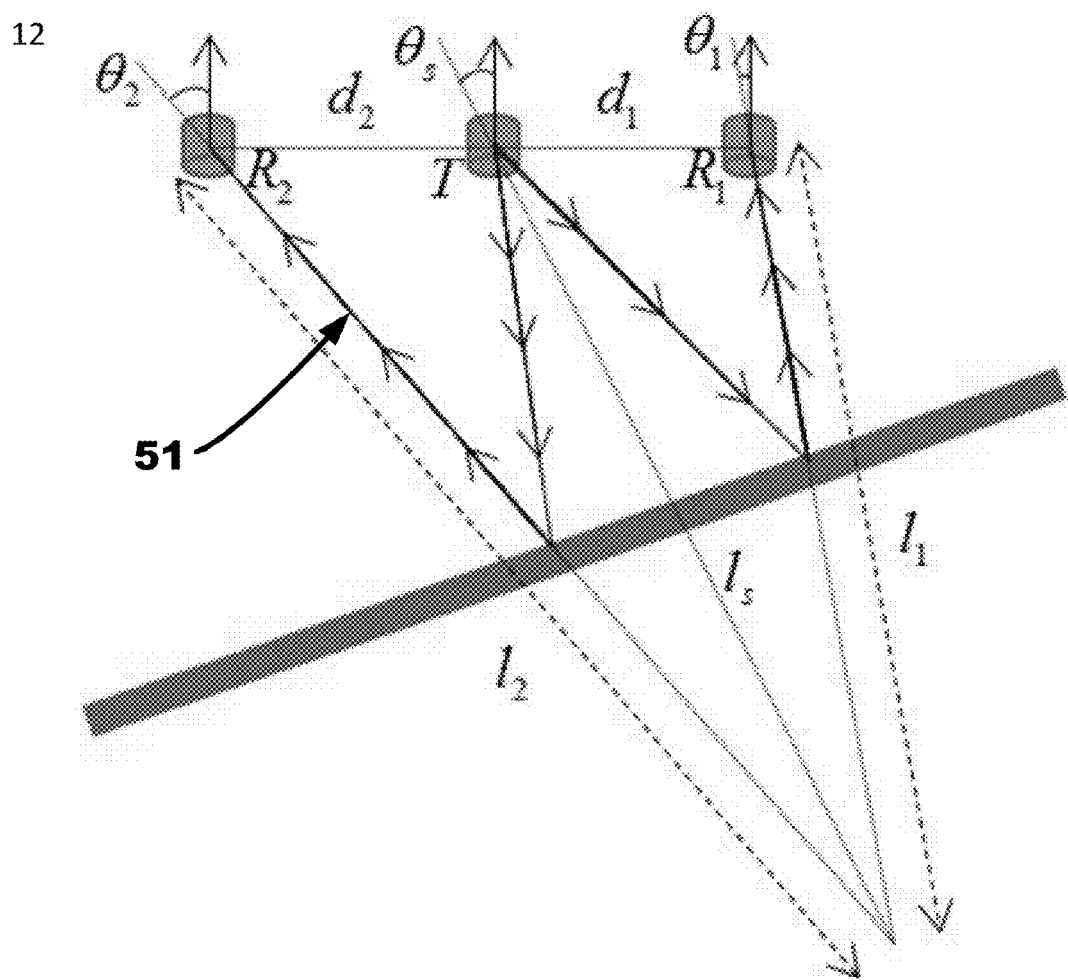
FIG. 5 is an overhead diagram depicting the functionality of an exemplary side sensing apparatus including a transmitter and two receivers.

The construction and operation of the exemplary side sensing apparatus 30 (e.g., sonar system) is depicted in FIG. 5. As shown, a sound wave 51 is initiated from the transmitter T and the echoes are detected by the two receivers $R_1$, $R_2$ located at longitudinal distances $d_1$ and $d_2$ from the transmitter T. Measuring the time that sound takes to travel from the transmitter T to the receivers $R_1$, $R_2$, the travel distance $l_1$ and $l_2$ can be calculated. From the two measurement $l_1$ and $l_2$, the angle $\theta_2$ can be calculated using the cosine rule as $$l_1^2 = d_s^2 + l_2^2 - 2d_s l_2 \cos(90° - \theta_2) \quad (1)$$

$$\theta_2 = \sin^{-1}\left(\frac{d_s^2 + l_2^2 - l_1^2}{2d_s l_2}\right) \quad (2)$$

where $d_s$ is $d_1+d_2$. Then, the distance $l_s$ can be calculated using the cosine rule and $x_s$ can be obtained from $l_s$ as $$l_s^2 = d_2^2 + l_2^2 - 2d_2 l_2 \cos(90° - \theta_2) \quad (3)$$

$$x_s = l_s/2 \quad (4)$$

Using the cosine rule one more time, the estimated angle of object's surface can be calculated as $$\theta_s = \sin^{-1}\left(\frac{l_2^2 - d_2^2 - l_s^2}{2d_2 l_s}\right) \quad (5)$$

It is worth mentioning that this exemplary side sensing apparatus 30 can provide not only angular information but also more robust performance. Further, since this exemplary side sensing apparatus 30 has two receivers, abnormal range measurement data can be detected by comparing the two measurements.

In addition to the relative lateral distance and relative angle, relative lateral velocity and relative angular velocity between the car and bicycle can be considered since the velocities involve not only present but also future information. A Kalman filter may be used to estimate the relative lateral and angular velocity. The state vector to be estimated is $$X_s = \{x_s, \dot{x}_s, \theta_s, \dot{\theta}_s\}^T \quad (6)$$

where $x_s$ is relative lateral distance, $\dot{x}_s$ relative lateral velocity, $\theta_s$ is relative angle and $\dot{\theta}_s$ is relative angular velocity. The discrete-time model can be modeled as $$X_s(k+1) = FX_s(k) + w_s(k), \quad (7)$$
$$Z(k) = HX_s(k) + n(k)$$

$$F = \begin{bmatrix} 1 & \Delta t & 0 & 0 \\ 0 & 1 & 0 & 0 \\ 0 & 0 & 1 & \Delta t \\ 0 & 0 & 0 & 1 \end{bmatrix}, H = \begin{bmatrix} 1 & 0 & 0 & 0 \\ 0 & 0 & 1 & 0 \end{bmatrix} \quad (8)$$

where $w_s(k)$ and $n(k)$ are process and measurement noises. While a Kalman filter is used as the estimator, the Mahalanobis distance may also be used to reject outliers.

Figure 6:
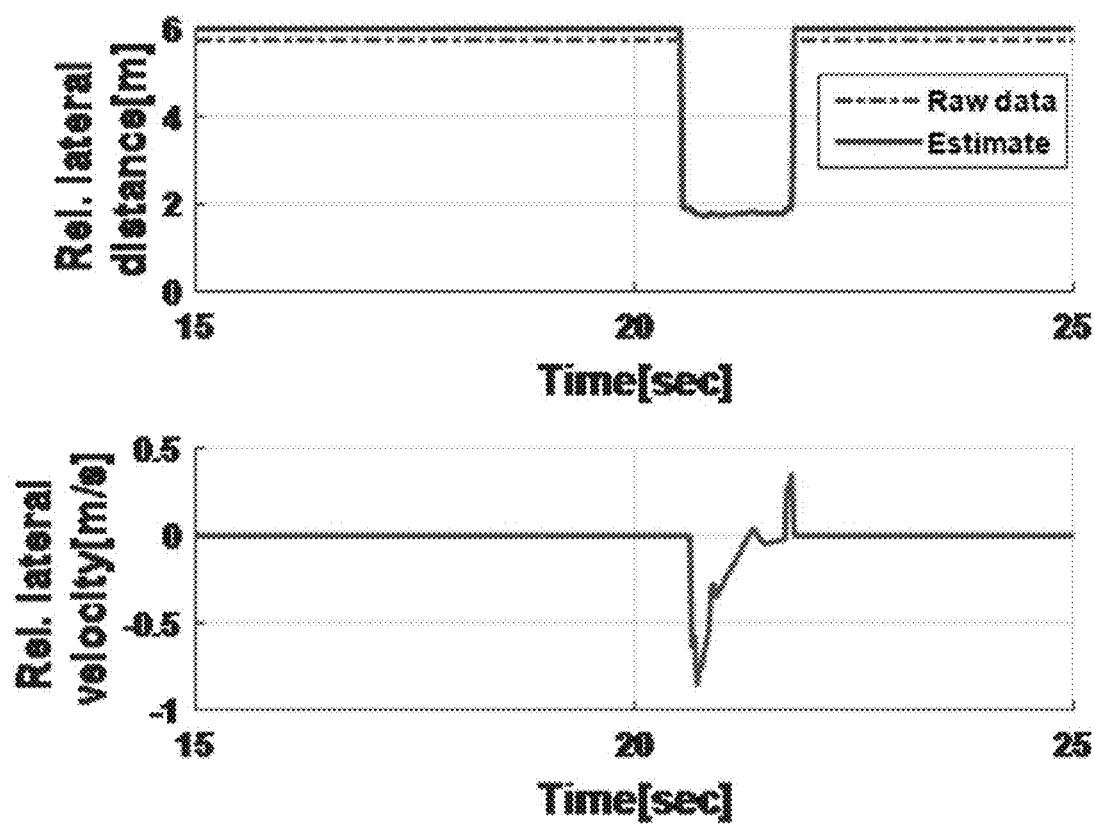
FIG. 6 includes two graphs displaying raw and estimated lateral distance and lateral velocity data using exemplary side sensing apparatus when being passed by a car.
Figure 7:
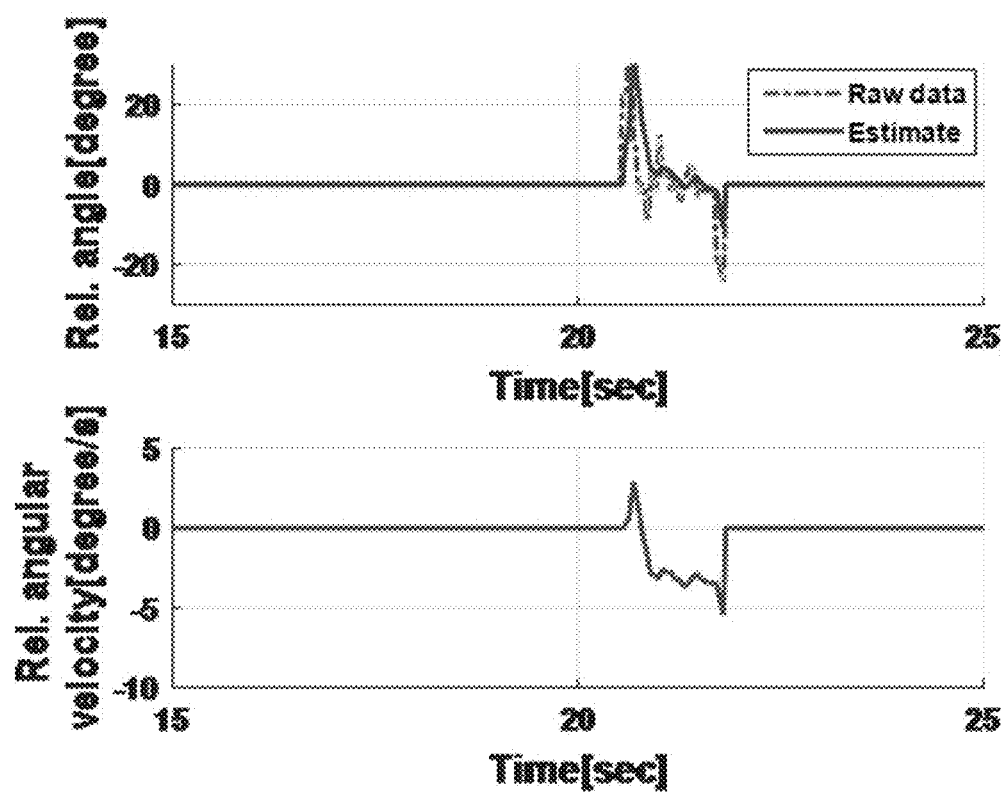
FIG. 7 includes two graphs displaying raw and estimated angular and angular velocity data using exemplary side sensing apparatus when being passed by a car.
Figure 8:
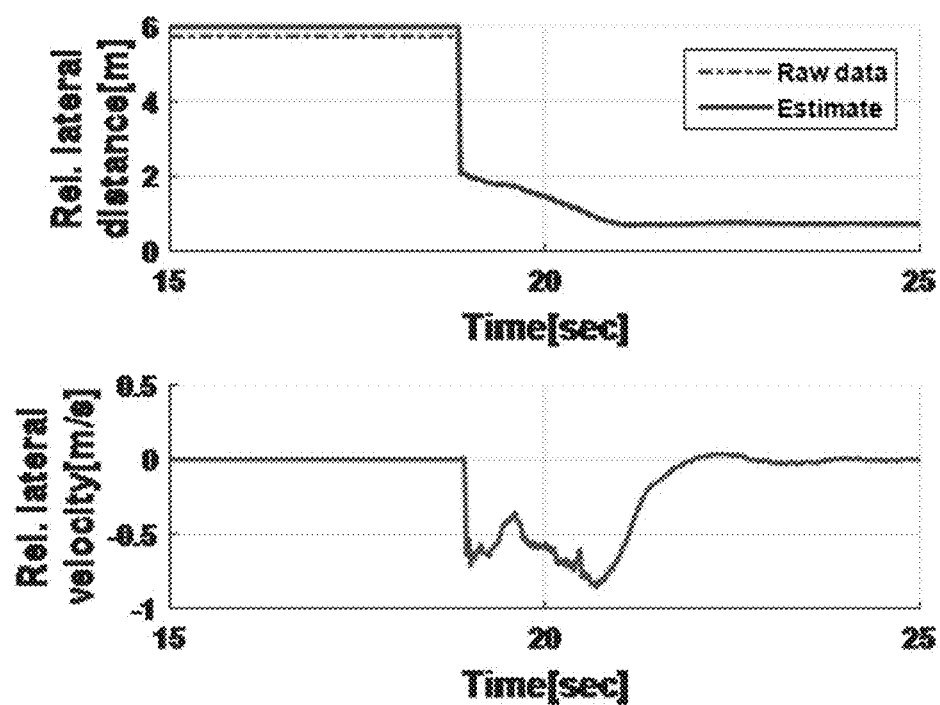
FIG. 8 includes two graphs displaying raw and estimated lateral distance and lateral velocity data using exemplary side sensing apparatus when a car is turning into the bicycle.
Figure 9:
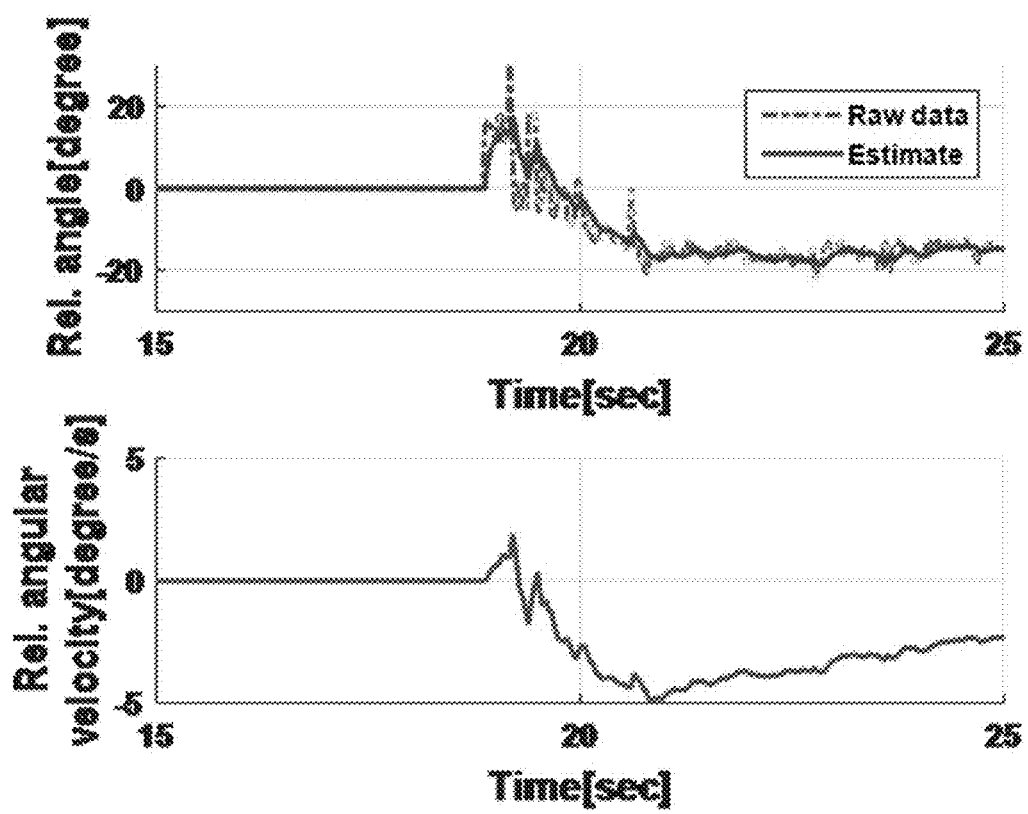
FIG. 9 includes two graphs displaying raw and estimated angular and angular velocity data using exemplary side sensing apparatus when a car is turning into the bicycle.

Experimental data for a case where a car is just passing by the bicycle is depicted in FIGS. 6-7 and another case where a car makes a right turn towards the bicycle is depicted in FIGS. 8-9. As discussed earlier, initial behavior of the lateral distance and velocity of the car may be similar in both cases, and further, the evolution of the relative angle and velocity for the passing car case can be seen in FIGS. 6-7. Even though there is ambiguity, the magnitude of velocities from the car passing by the bicycle will be smaller than the other case if the car is passing by the bicycle slowly. Most importantly, if the relative angular velocity compared to relative lateral velocity is checked, the different behavior of the velocities may be clearly seen. When the car is turning towards the bicycle, both the angular and lateral velocity change rapidly as the car gets closer. When the car is passing by the bicycle, the change of the angular velocity may initially be similar to when the car is turning. However, as the car becomes farther from the bicycle, the lateral velocity evolves in the opposite direction, in contrast to the velocity from the turning car. From this physical evidence, two thresholds can be used based on the velocities to distinguish a turning maneuver from a non-turning maneuver. For example, if the velocities satisfy both conditions, the turning maneuver can be confirmed properly within a short time.

Thus, the relative lateral velocity of the vehicles and the relative angular velocity of the vehicle may be used to determine whether a collision is imminent or probably. In one or more embodiments, determining a potential collision situation based on at least one of the position data and the velocity data of a vehicle located beside the bicycle may include comparing the relative lateral velocity of the vehicle to a first threshold, comparing the relative angular velocity of the vehicle to a second threshold, and then a potential collision situation may be determined if the relative lateral velocity of the vehicle meets or exceeds the first threshold and/or the relative angular velocity of the vehicle meets or exceeds the second threshold. Further, the distance from the bicycle to a vehicle located beside the bicycle may be compared to a third threshold, and a potential collision situation may be determined if the distance is less than or equal to the third threshold.

Figure 10A:
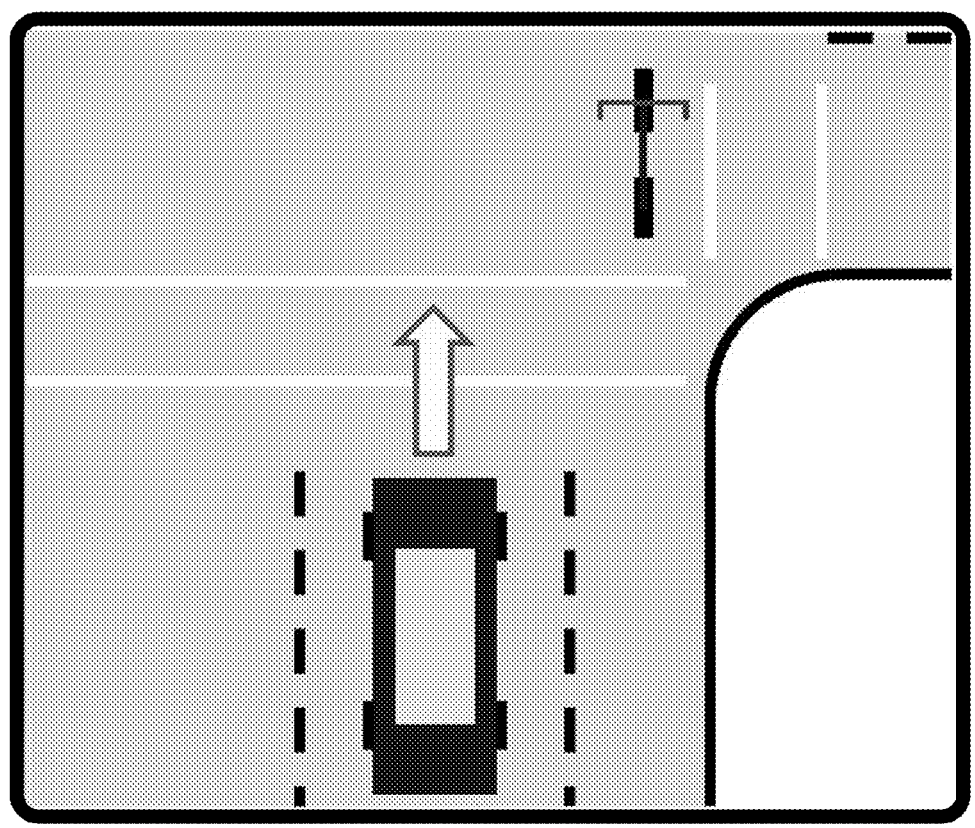
FIGS. 10A-10B are overhead diagrams of two different situations when a car is approaching from behind a bicycle.
Figure 10B:
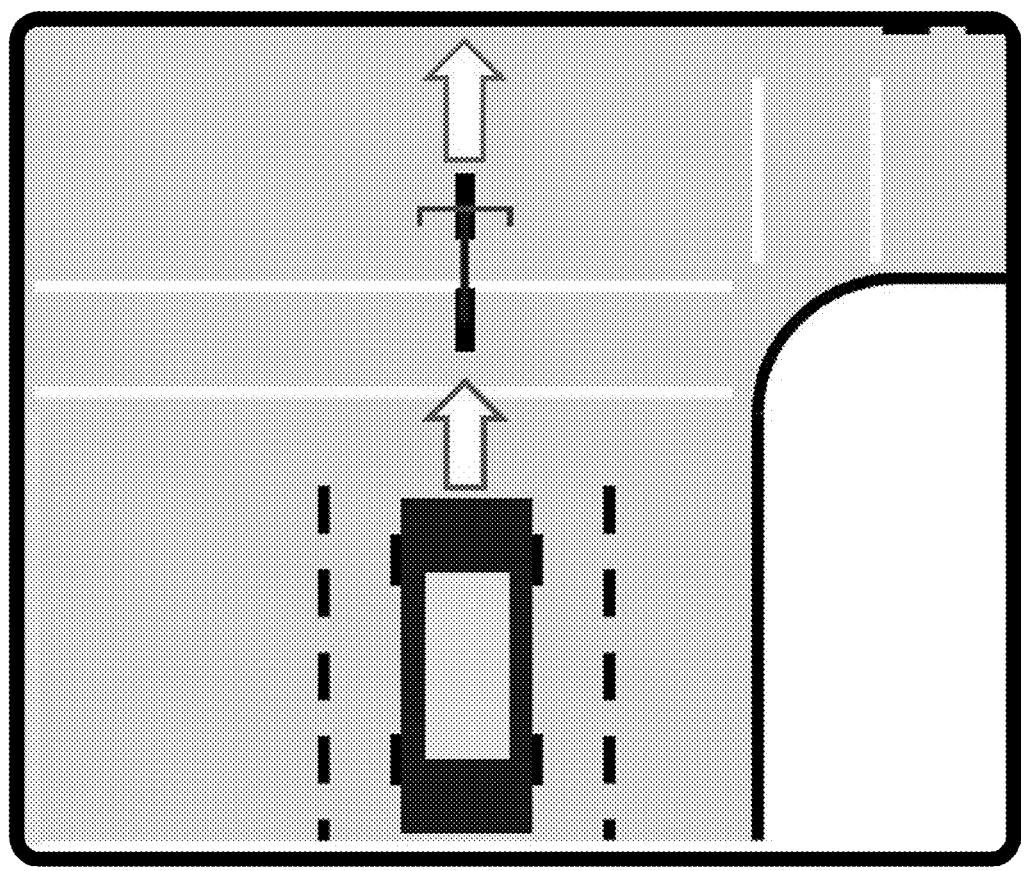

A car approaching the rear of the bicycle may also result in a collision situation. The car could be in the same lane as the bicycle, or in the adjacent lane to the left, if the bicycle is driving in a bicycle lane as shown in FIG. 10A or a shoulder as shown in FIG. 10B. Both the lateral and longitudinal positions of the rear-positioned car may be tracked by the exemplary systems, apparatus, and methods described herein. In other words, a rear or sideswipe collision could occur from a car right behind the bicycle or due to a car passing too close to a bicycle, and the exemplary systems, apparatus, and methods described herein may be used to at least sense and warn of an impending collision. In this particular example, the rear sensing apparatus 32 may include a custom laser sensor on a rotating platform to address rear collisions.

In order to prevent rear end collisions, rear sensing apparatus 32 include a sensor having a longer range than the side sensing apparatus that is used to sensor side collision cases may be utilized. The desired region behind the bicycle where vehicles may be tracked can be quite large. In some examples such as sensing systems used on cars, LIDAR may be used. However, LIDAR is often too costly, cumbersome, and larger to equip on a bicycle. Another option may be the use of a camera sensor, and while cost may be less of an issue, a camera system may require a high-performance CPU to deal with complex urban scenes in real-time, which may make the camera-based system difficult to be powered by a small battery.

In this example, the rear sensing apparatus 32 may include a low-cost, single-target laser sensor such as, e.g., a PULSEDLIGHT LIDAR-LITE sensor, that is coupled to, or installed on, a rotating platform. The rear sensing apparatus 32 may define, or have, a long range (e.g., greater than or equal to about 5 meters, greater than or equal to about 10 meters, greater than or equal to about 20 meters, greater than or equal to about 35 meters, etc.), a small, compact size, low weight, and low cost. In contrast to more-costly LIDAR systems, the exemplary rear sensing apparatus may only include a single laser beam and a low sampling frequency (e.g., less than or equal to about 1000 Hz, less than or equal to about 600 Hz, less than or equal to about 500 Hz, less than or equal to about 300 Hz, less than or equal to about 100 Hz, less than or equal to about 50 Hz, etc.).

Figure 11:
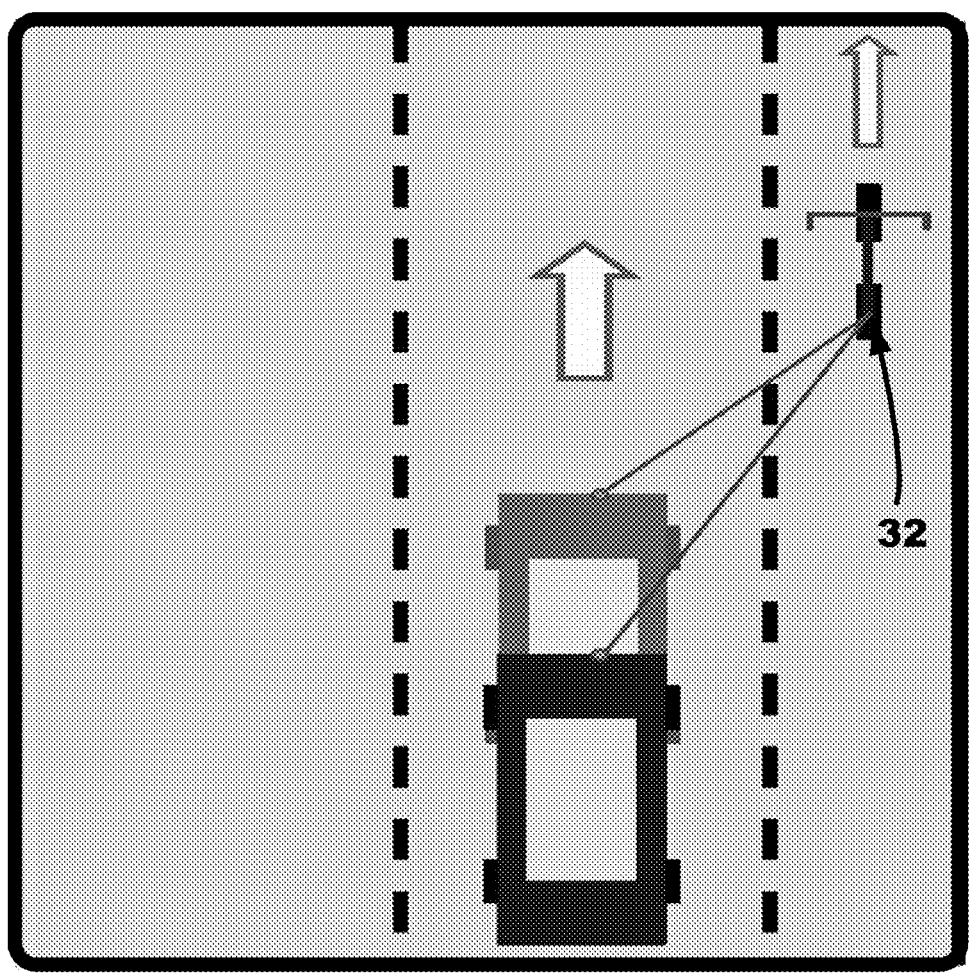
FIG. 11 is an overhead diagram depicting exemplary rear sensing apparatus changing sensor orientation with respect to a rear approaching car.
Figure 12:
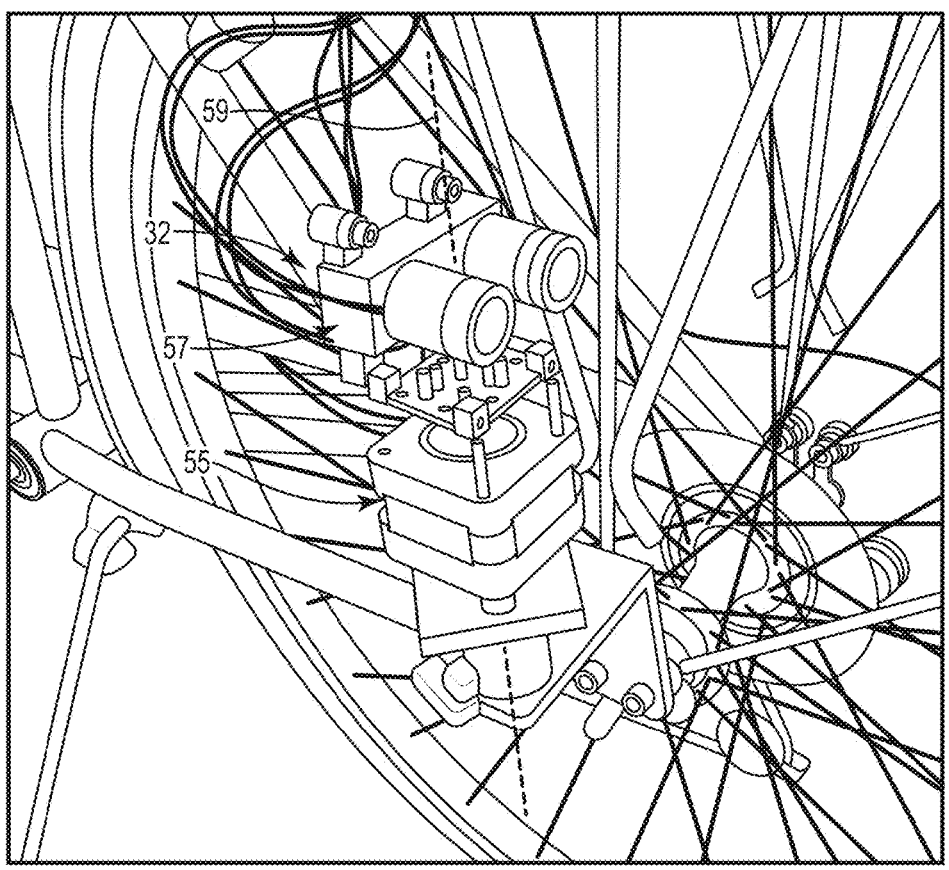
FIG. 12 is a photograph of an exemplary rear sensing apparatus.

Further, in one or more embodiments, since a single laser beam may be utilized and the spread of the laser beam may be very narrow (e.g., 8 milli-radians), tracking a moving target may be challenging without changing the sensor orientation, as shown in FIG. 11. In order to overcome this challenge, a rotating platform 55 may be used to rotate the laser apparatus 57 of the rear sensing apparatus 32 about an axis 59 to scan the area of interest and track the target as shown in FIG. 12. A complete scan over the full area of interest may take too much time (e.g., due to a low sampling frequency), and thus, the exemplary systems, apparatus, and methods may be described as utilizing an efficient control algorithm to determine the orientation of the laser sensor in real-time.

In one or more embodiments, a clustering method may be used for detecting a target (e.g., a vehicle, a portion of a vehicle, etc.) for tracking the target. In this example, the clustering method may be based on the Density Based Spatial Clustering of Application with Noise (DBSCAN). More specifically, the rear sensing apparatus 32 may initially scan over a pre-determined range. Once a measurement is obtained, the measurement and sensor orientation may be stored into a measurement array. The measurement array may be examined by DBSCAN, and DBSCAN can reject outliers by setting proper minimum number of points and radius required to constitute a group. Similarly, small objects can be rejected. DBSCAN returns a label that indicates the name of clusters as integers. If there is a cluster, the maximum and minimum lateral distance ($y_{min}$, $y_{max}$) and closest longitudinal distance $x_{min}$ of the cluster to the bicycle are updated. A target candidate is initialized if the lateral size ($y_{max}-y_{min}$) is less than a threshold and $y_{min}$ is considered as significant distance to the bicycle. This procedure may be repeated for every measurement data, and the target candidate may be maintained as long as the updated lateral size is less than the threshold and new $x_{min}$ is close enough to previous value. If the lateral size exceeds threshold, the candidate is deleted and another cluster becomes the subject to be examined for a target candidate. If a certain number of new measurement data contribute to the candidate in a row, the target is confirmed.

Then, the sensor orientation is set as minimum or maximum scan range based on its scan direction so that the sensor scans only near the target, and the exemplary clustering processes may lead to identification of the target to be tracked. Subsequently, a further real-time controller for the rotating platform may be used in order to keep tracking the identified target as it moves.

In an example where a car behind the bicycle is traveling straight without turns, once the car is detected, the exemplary systems, apparatus, and methods may focus on estimation of relative longitudinal distance between the car and the bicycle. The longitudinal car motion and its states can be defined as follows:

$$X(k+1)=F_a X(k)+w(k), X=\{x\ v\ a\}^T \quad (9)$$

where $F_a$ is constant acceleration model and w(k) is an unknown input (e.g., process noise). Further, the sensor system can be written as follows:

$$\Theta(k+1)=\Theta(k)+u(k) \quad (10)$$

where θ(k) is sensor orientation and u(k) is sensor orientation control input. The sensor orientation will be controlled by an electronic motor using a fixed angle increment or decrement. Therefore, control input u(k) is {−Δθ 0 Δθ}. In order to track the car, the sensor orientation may take into account the lateral distance between the target point and the sensor. Hence, the lateral distance can be formulated as follows:

$$y(k)=x(k)\tan(\Theta(k)) \quad (11)$$

In summary, the exemplary control system may steer, or rotate, the laser sensor 57 of the rear sensing apparatus 32 to "see" the reference point on the front of the target vehicle using limited rotational angle changes. Also, the controller may be able to track the moving target for not only the present time, but using a moving horizon, which may be addressed, in this example, using the Model Predictive Control (MPC) approach because, for example, MPC may be described as having good capability to deal with discrete control inputs, performance optimization, and actuator constraints. The control input for the sensor orientation can be obtained by solving the following optimization problem:

$$\min_{U_t} \sum_{k=0}^{N-1} \left( \|y_{ref} - y(k)\|_Q^2 + \|u(k)\|_R^2 \right) + \|y_{ref} - y(N)\|_P^2 \quad (12)$$

$$\text{Subject to } X(k+1) = F_a X(k)$$
$$U_t = \{u(0), u(1), \ldots, u(N-1)\}$$
$$u(k) = \{-\Delta\Theta, 0, \Delta\Theta\}$$

where $y_{ref}$ is $(y_{max}+y_{min})/2$ which is obtained from the detection stage. y(k) can be expressed as $$y(k) = \hat{x}(k)\tan\left(\Theta(0) + \sum_{j=0}^{k-1} u(j)\right) \quad (13)$$

Using Equation (13) with k>0, sensing capability can be predicted based on the target state evolution and control inputs. After solving the optimization problem, the first control input element of the obtained sequence of inputs may be applied to the system.

Figure 13:
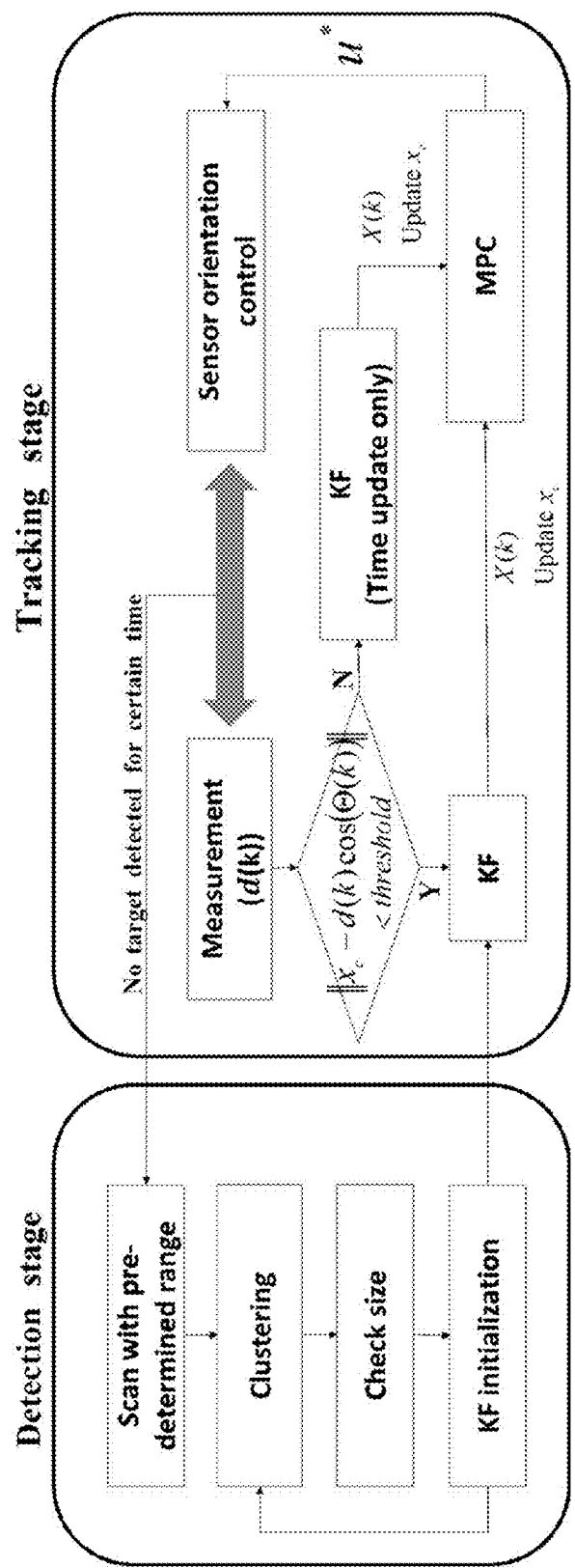
FIG. 13 is a block diagram of exemplary rear sensing apparatus motion control for tracking.

An overview of one exemplary detection and tracking process is depicted in FIG. 13. In the detection stage, target vehicle search, detection, and initialization of the Kalman filter are conducted using the clustering method. In the tracking stage, the sensor may be controlled to track the target vehicle using the information $(x_{min}, y_{ref})$ from the detection stage. The sensor measurement may then be examined by comparing recent longitudinal position $x_c$ of the vehicle. If the measurement is verified to come from the target vehicle, the target vehicle states may be estimated using the Kalman filter with the measurement.

Otherwise, the states may be estimated by only time updates. Finally, the optimal control input (e.g., angular position of laser sensor) can be obtained by solving the optimization problem with the estimated states. If the target is not detected for a certain amount of time, the exemplary systems, apparatus, and methods may search for targets with the pre-determined full scan angle range again.

The dimensions of a bicycle and a car for the following simulations are based on a 28-inch wheel bicycle and a midsize sedan, and further two assumptions are made in these simulations. One assumption is that there is no slip, and the other assumption is that the velocity between sampling instants is constant. Then, the motion of the bicycle and any car can be expressed by using a velocity motion model. The kinematic model, the rear traffic detection, and the tracking algorithm were implemented into MATLAB so that our algorithm can be verified under various vehicle velocities and accelerations. A typical situation is simulated in which the bicycle is riding straight and the vehicle is traveling on the adjacent lane next to the bicycle lane as shown in FIG. 14.

Figure 14:
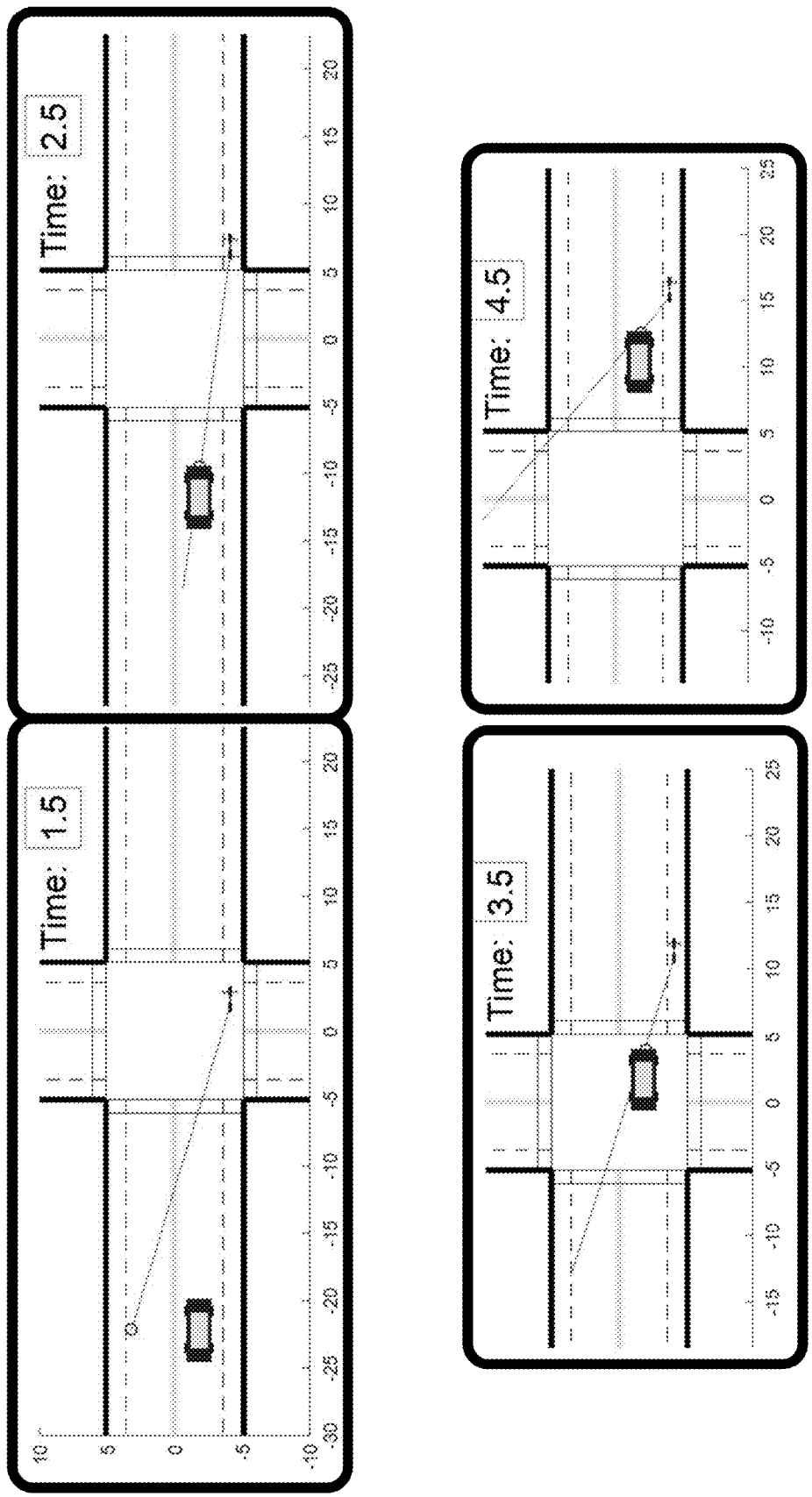
FIG. 14 are overhead diagrams depicting exemplary rear sensing apparatus changing sensor orientation with respect to a rear approaching car over time.

In this simulation depicted in FIG. 14, the bicycle is moving with a constant speed of 4.5 meters per second (m/s). Further, random measurement noise $\sim N(0,2^2[\text{cm}])$ was added to this simulation. One step prediction was used to calculate the optimal control input.

Figure 15:
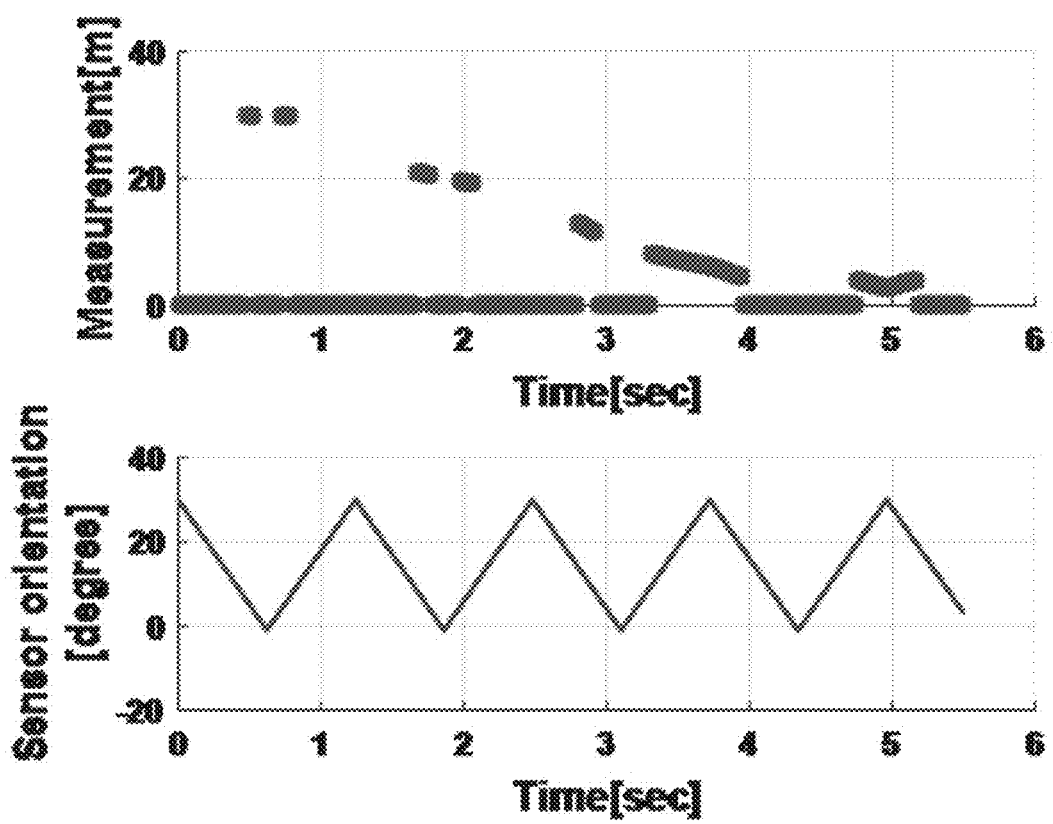
FIG. 15 includes two graphs displaying distance and sensor orientation simulation data using exemplary rear sensing apparatus tracking a rear-approaching car over time.
Figure 16:
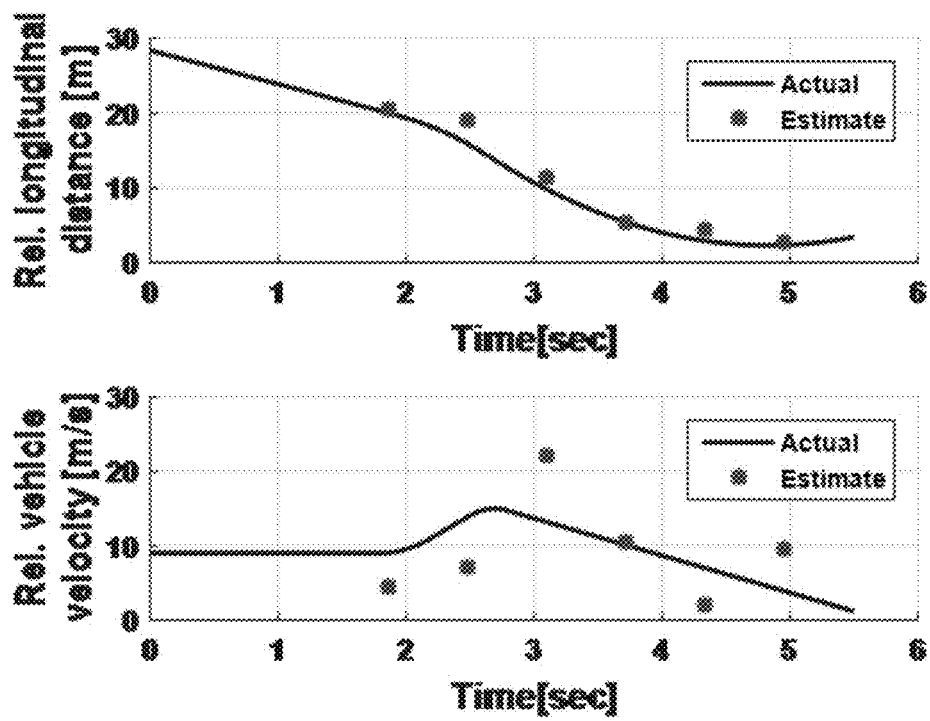
FIG. 16 includes two graphs displaying actual and estimated longitudinal distance and vehicle velocity simulation data using exemplary rear sensing apparatus tracking a rear-approaching car over time.
Figure 17:
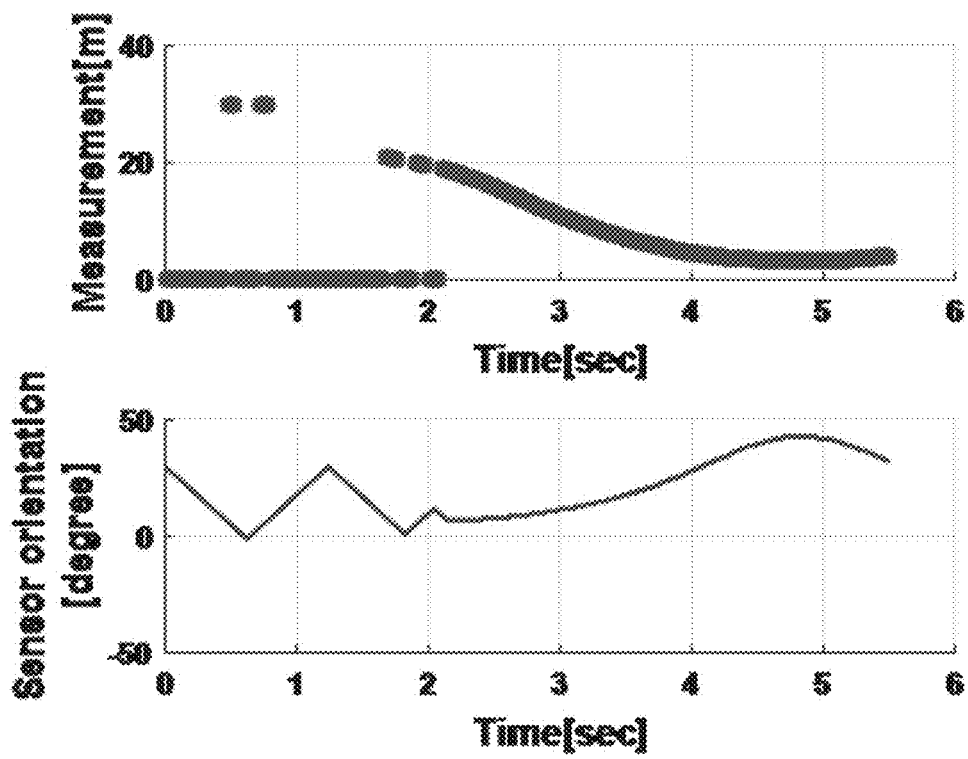
FIG. 17 includes two graphs displaying distance and sensor orientation simulation data using exemplary rear sensing apparatus using receding horizon optimization processes and tracking a rear-approaching car over time.
Figure 18:
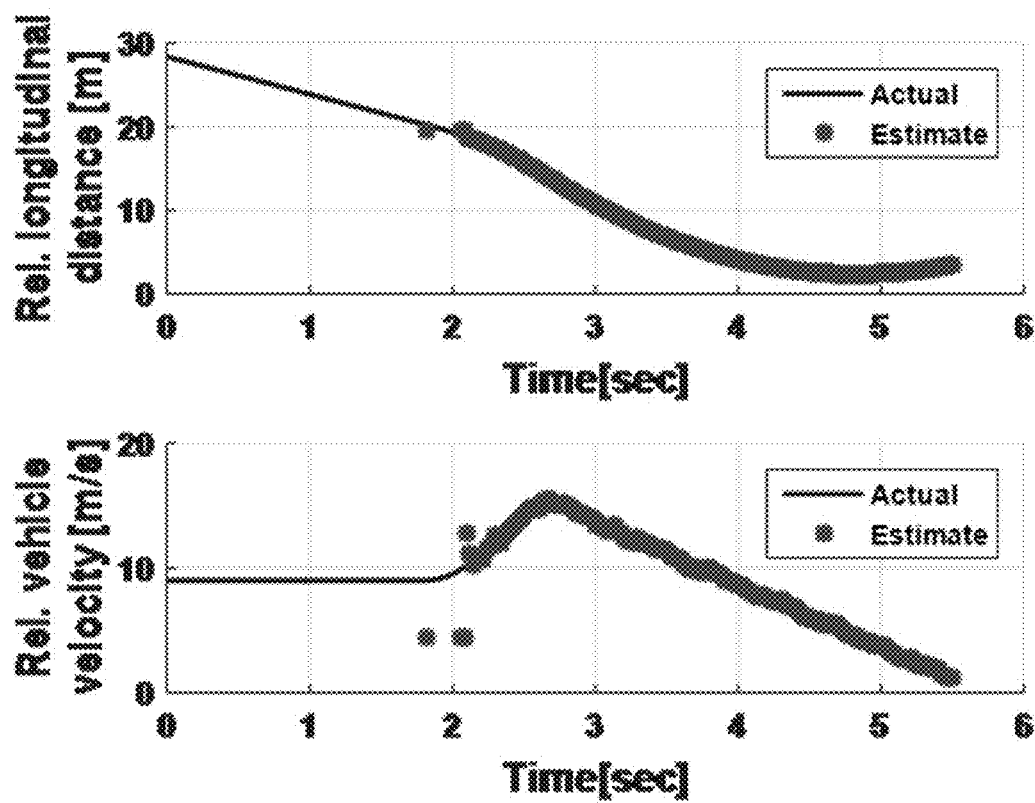
FIG. 18 includes two graphs displaying actual and estimated longitudinal distance and vehicle velocity simulation data using exemplary rear sensing apparatus using receding horizon optimization processes and tracking a rear-approaching car over time.

FIGS. 15-16 show the simulation results using a fixed scan range (30 degrees). As shown, the exemplary systems, apparatus, and methods can track the target position. The result of the laser motion control using the receding horizon optimization technique is shown in FIGS. 17-18. As shown, the tracking performance is better, the estimates are updated very fast, and the control input effort is much less using the receding horizon optimization technique shown in FIGS. 17-18 than compared to the results in FIGS. 15-16.

Figure 19:
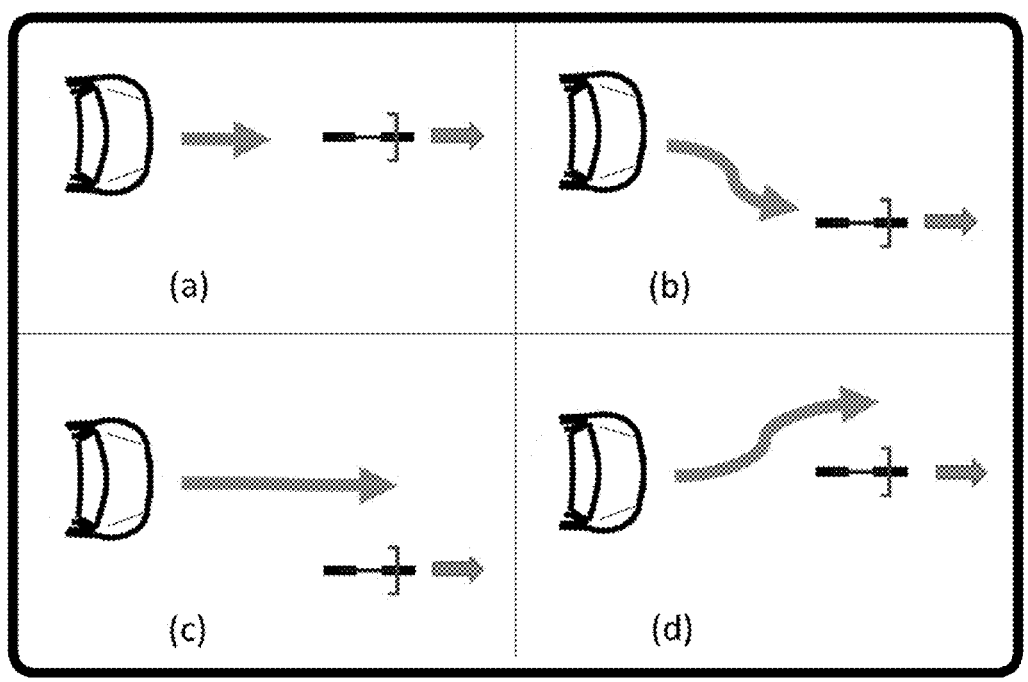
FIG. 19 depicts overhead views of four types of scenarios that are commonly encountered with respect to rear-approaching cars and bicycles.

Four types of scenarios that are commonly encountered with respect to rear-approaching cars and bicycles is depicted in FIG. 19: (a) car approaching directly behind the bicycle; (b) car changing lane to the right beside and behind the bicycle; (c) the passing by the bicycle; and (d) the car changing lane to the left beside and behind the bicycle.

Figure 20:
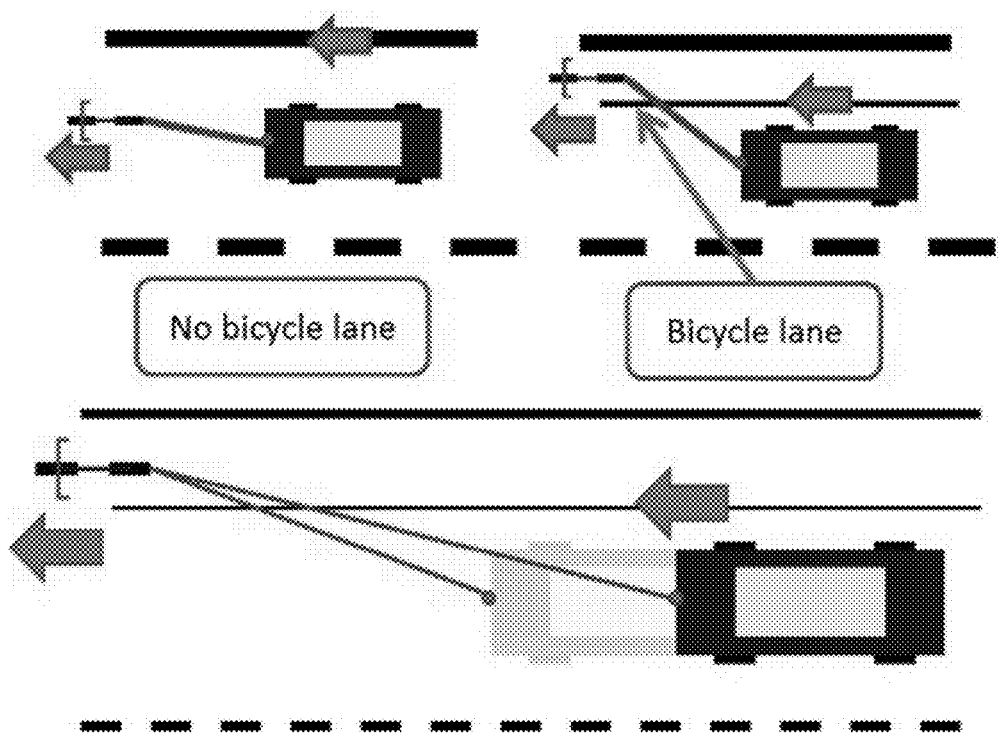
FIG. 20 depicts overhead diagrams showing exemplary rear sensing apparatus changing sensor orientation with respect to rear-approaching cars in various situations.

As previously described herein, the rear sensing apparatus 32 may include laser sensor 57 and a rotating platform 55 as shown in FIG. 12, which may be used track changing lateral and longitudinal positions of the rear vehicle. The rotating platform 55 may be used to vary the laser sensor orientation about axis 59 is required in real-time to track vehicle as shown in FIG. 20.

In at least one aspect, the exemplary systems, apparatus, and methods may be configured to track the right front corner of a car by measuring the front and side of the car, alternately, since such that the right front corner tracking may provide both lateral and longitudinal distance information. Also, a control rotational direction for the laser sensor may be determined at every sampling time instead of waiting for the end of an open-loop scan range. From this strategy, not only acquisition of both lateral and longitudinal information but also more robust tracking rather than using a small area scanning can be accomplished. In order to determine the location of the measurement (e.g., reflection position on the vehicle) using a laser sensor of the rear sensing apparatus 32, the geometric shape of the car may be approximated by a rectangular shape. Also, target detection, e.g., using the aforementioned clustering method, may also be conducted. After target detection, the laser sensor 57 of the exemplary rear sensing apparatus 32 may be rotationally controlled in its orientation with respect to the vehicle. The following discussion is based on the situation when the laser sensor 57 acquires the first measurement after initial target detection has already been completed.

In order to track the vehicle's corner position, the rear sensing apparatus 32 can be controlled in the clockwise (CW) or counter clockwise (CCW) direction based on whether the reflected beam is from the front or side of the car. However, it may be challenging to determine the location (front or side) of the reflection using only one measurement. Also, every reflection from side or front of the car may not always be detectable. For instance, when the target is far from the rear sensing apparatus 32, the rear sensing apparatus 32 may not obtain reflections from the side due to the geometry, e.g., the incidence angle may be too large to reflect enough intensity of the beam to the sensor of the rear sensing apparatus. Therefore, the initial guess of the location of the reflection may be assumed to be the front of the target.

With regard to the safety of bicyclists, there may be two most significant scenarios. The first scenario may be that of a car approaching right behind the bicycle and the second scenario may be that of a car initially going straight with a certain lateral distance gap and then changing lanes to the right, i.e., turning right behind the bicycle as illustrated in (a) and (b) of FIG. 19.

For these scenarios, a binary examination can be applied to determine direction of rotation. If a measurement can be obtained from the car, the rear sensing apparatus may be considered to be aimed at the front of a car. Then, a control in the CCW direction is needed. Otherwise, the sensor 57 can be considered as aiming at the side of the car and the sensor may then need to be controlled in the CW direction. In the first scenario, the laser sensor system can obtain measurements only from the front of the car. For the second scenario, the same decisions can be applied as first scenario. If a car is turning to the right, measurements from the front of the car only can be obtained since the sensor tracks only the right front corner of the car. On the other hand, the decisions cannot provide correct scan direction when the target gets closer to the sensor with significant lateral distance, or if it changes lane to left as shown in (c) and (d) of FIG. 19. Those maneuvers be tracked in order to prevent from a sideswipe collision and a false alarm.

Figure 21:
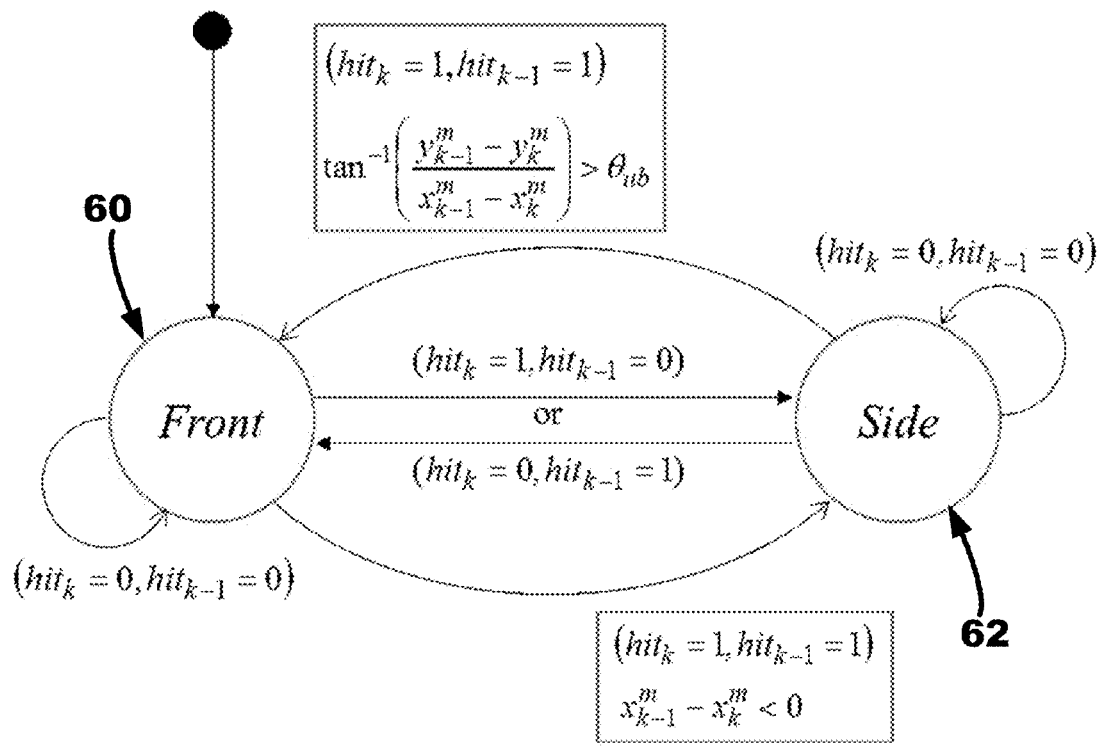
FIG. 21 is a state diagram for use with the exemplary rearing sensing apparatus.

When a car is passing by a bicycle or changing lanes to the left from behind the bicycle, the sensor 37 of the rear sensing apparatus 32 can measure the range not only from the front but also from the side of the car. Furthermore, the sensor 37 of the rear sensing apparatus 32 can obtain measurements only from the side of the car when a car is very close to the sensor with significant lateral distance. In order to account for these different situations, in one or more embodiments, a finite state machine may be utilized with two states: a front state 60 and a side state 62 as shown in FIG. 21. As before, the state being front or side may imply that control in the CCW direction and in the CW direction respectively are used. The transitions may occur based on the examination of current and previous range measurements $d_k$ and $d_{k-1}$. For notational simplicity, $hit_k$ as may be defined as an indicator on whether the measurement is from the target vehicle or not at time k in FIG. 21.

$$hit_k = \begin{cases} 1 & \text{If measurement is from the target vehicle} \\ 0 & \text{Otherwise} \end{cases} \quad (14)$$

As discussed before, the initial state starts from the front state 60. In case of not having any measurements from the target vehicle at both current and previous time, the state remains the same. When the measurement can be obtained at only one of either current or previous samples, a transition from the current state to the other state occurs. If the rear sensing apparatus 32 acquires two measurements in a row, the decision differs based on the value of the current state. A transition from the front state 60 to the side state 62 may occur when the subtraction between the projections of the range measurement to longitudinal axis $x_k^m$ at previous and current time is negative, e.g., $x_{k-1}^m - x_k^m < 0$.

Otherwise, the state machine may remain at the current state, front state 60. When the current state is the side state 62, it remains same if the slope from two measurements is coincidental with the orientation of the car. Otherwise, a transition from the side state 62 to the front state 60 occurs. Practically, the measurements may include, or contain, noise, and thus, the orientation of the car may be challenging to estimate accurately using the rearing sensing apparatus 32. Instead of using the strict rules above, an upper bound for the orientation of the car may be used in one or more embodiments, which covers passing and left turning maneuvers. The revised condition is the following:

$$\tan^{-1}\left(\frac{y_{k-1}^m - y_k^m}{x_{k-1}^m - x_k^m}\right) \leq \theta_{ub} \quad (15)$$

where $y_k^m$ is the projection of the range measurement to lateral axis at time k. The upper bound threshold $\theta_{ub}$ that accounts for passing and left turning car maneuvers may be obtained using data from simulations and experiments.

Figure 22:
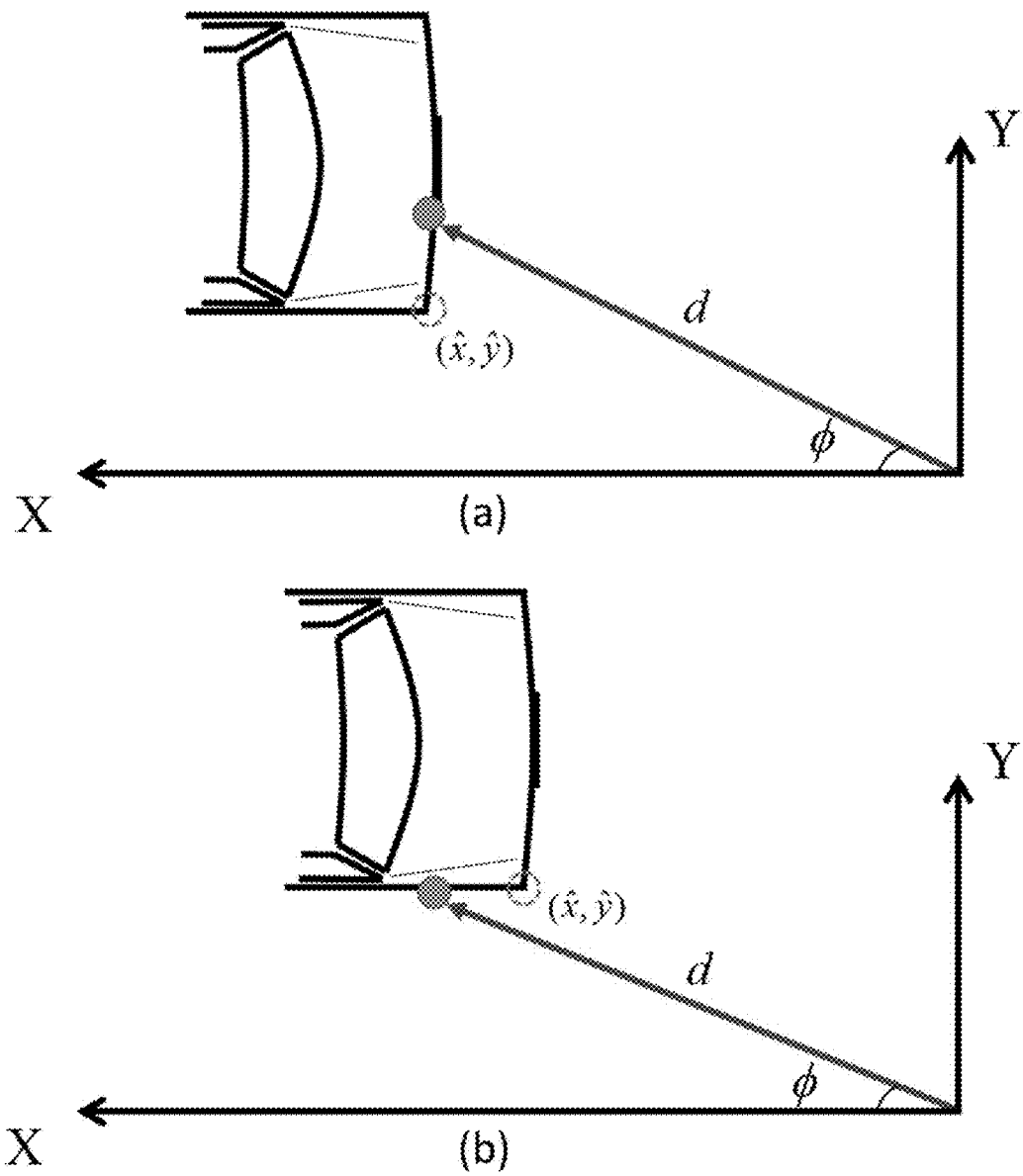
FIG. 22 depicts measurements from exemplary rear sensing apparatus to the front and side of a rear-approaching car.

As described herein, the measurements often contain only partial information about the corner position. Therefore, a validation step for the measurements may be used to utilize only information which corresponds to the corner position of the car. Two cases that constitute measurements from the front and side of the car, respectively, are depicted in FIG. 22. When the measurement is obtained from the front of the car, the projection of the measurement to X axis provides correct longitudinal distance between the corner position and the rearing sensing apparatus. However, the projection to Y axis may not provide correct lateral distance. In order to keep the correct lateral distance, prediction and projection may be compared and the minimum value may be taken as the correct lateral distance. Then, the measurement set can be represented as $$z = \begin{bmatrix} d\cos\phi \\ \min(\hat{y}, d\sin\phi) \end{bmatrix} \quad (16)$$

where d is the range measurement, $\phi$ is the sensor orientation and $\hat{y}$ is the prediction of the lateral distance using previous estimates. When the measurement is obtained from the side of the car, the projection of the measurement provides correct lateral distance but not longitudinal distance. Similarly, the measurement set can be expressed in this case as $$z = \begin{bmatrix} \min(\hat{x}, d\cos\phi) \\ d\sin\phi \end{bmatrix} \quad (17)$$

where $\hat{x}$ is the prediction of the longitudinal distance. This approach is based on the assumption that the true value is the minimum between the prediction and projection of the measurement. Once the prediction becomes smaller than true corner position and measurements can be obtained from only the front or side, the assumption may provide an incorrect result, and there may be no chance for this to be corrected.

Figure 23:
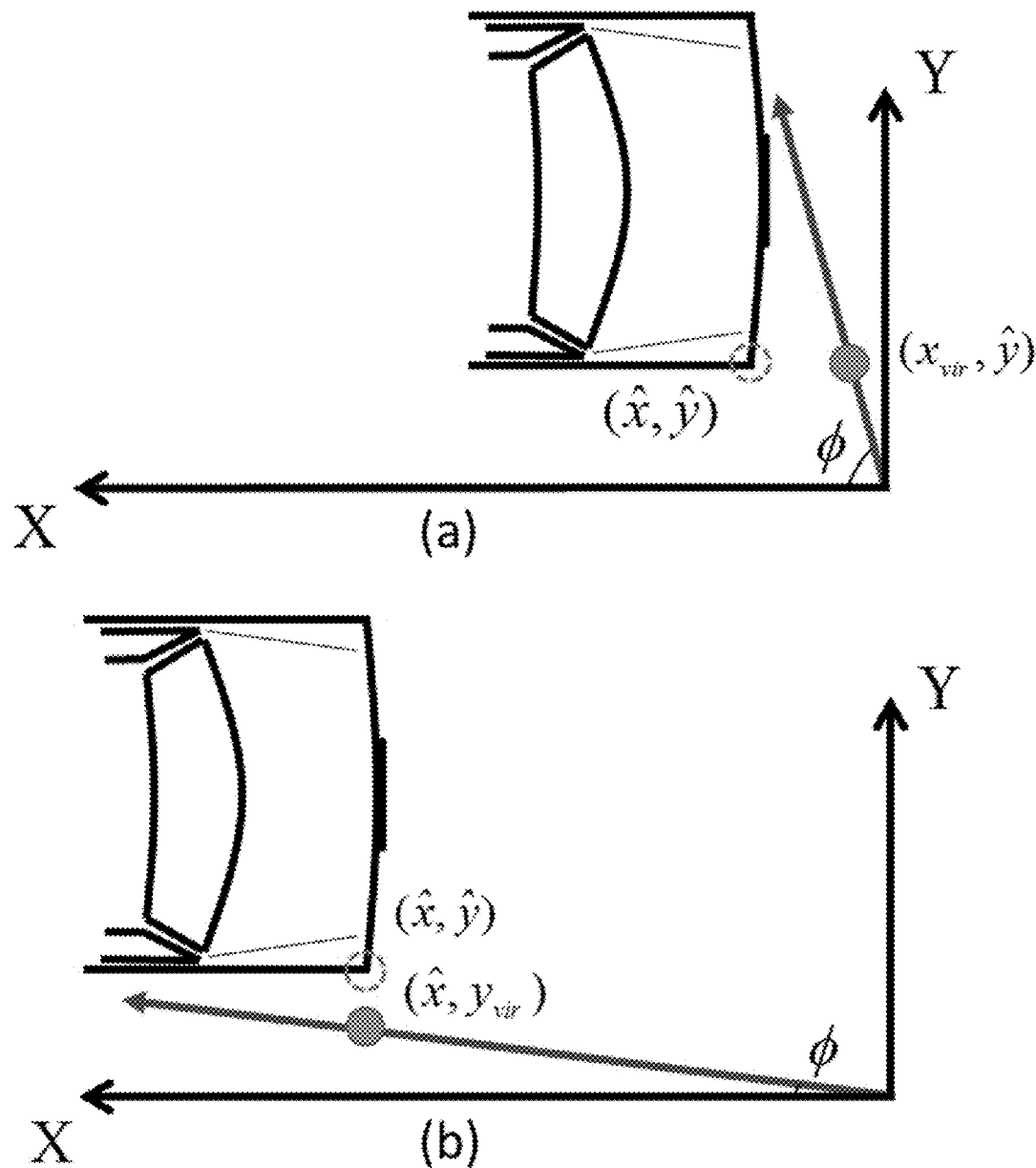
FIG. 23 depicts virtual measurements from exemplary rear sensing apparatus to the front and side of a rear-approaching car.

For example, when the car is changing lane to the left and the measurement is obtained only from the front of the car, the assumption is no longer valid and provides wrong information about the car being right behind the bicycle. In order to overcome this, virtual measurements $x_{vir}$ and $y_{vir}$ may be introduced as shown in FIG. 23. When measurements cannot be obtained, there is no car along the line of the sensor orientation. Meanwhile, the car is located near the line of the sensor orientation since the sensor scans near the corner position. The virtual measurement can be defined as $$\begin{cases} x_{vir} = \hat{y}/\tan\phi, & \text{if the state is Front} \\ y_{vir} = \hat{x}\tan\phi & \text{if the } stae \text{ is Side} \end{cases} \quad (18)$$

Using this information, the measurement validation step can be set based on the determination of the reflection location. If the reflection location is Front, the measurement set can be found as $$z = \begin{bmatrix} \max(x_{vir}, \hat{x}) \\ \hat{y} \end{bmatrix} \quad (19)$$

Similarly, if the reflection location is Side, the measurement set can be defined as $$z = \begin{bmatrix} \hat{x} \\ \max(y_{vir}, \hat{y}) \end{bmatrix} \quad (20)$$

Then, a measurement model with m×1 state vector and its noise covariance matrix are $$y_k = \left[\begin{bmatrix} 1 & 0 \\ 0 & 1 \end{bmatrix} \; 0_{2,(m-2)}\right] X_k + n_k \quad (21)$$

$$R_k = \begin{bmatrix} \sigma_x^2 & 0 \\ 0 & \sigma_y^2 \end{bmatrix} \quad (22)$$

This exemplary systems, apparatus, and methods may prevent estimates from getting stuck in wrong predictions, allow utilizing a simple linear measurement model, and enhance the estimation performance by capturing the car maneuver more quickly.

In order to estimate the kinematic states of the target vehicle, a Kalman filter and an Interacting Multiple Model (IMM) may be used in one or more embodiments. The state vector of the Kalman filter may be as follows:

$$X_{kf} = \{x \; y \; v_x \; v_y\}^T \quad (23)$$

where x is relative longitudinal distance, $v_x$ is relative longitudinal velocity, y is relative lateral distance and $v_y$ is relative lateral velocity between the right front corner of the car and the rear sensing apparatus of the sensor system. The Constant Velocity model with Cartesian velocity (CVC) may be used for the Kalman filter and may be given by $$X_{kf,k+1} = \begin{bmatrix} 1 & 0 & \Delta t & 0 \\ 0 & 1 & 0 & \Delta t \\ 0 & 0 & 1 & 0 \\ 0 & 0 & 0 & 1 \end{bmatrix} X_{kf,k} + w_{cvc,k} \quad (24)$$

where $\Delta t$ is a sampling period and $w_{cvc,k}$ is zero mean with covariance as $$Q_{cvc,k} = \begin{bmatrix} \sigma_v^2 & 0 & \Delta t^2\sigma_a^2/2 & 0 \\ 0 & \sigma_v^2 & 0 & \Delta t^2\sigma_a^2/2 \\ \Delta t^2\sigma_a^2/2 & 0 & \Delta t & 0 \\ 0 & \Delta t^2\sigma_a^2/2 & 0 & \Delta t \end{bmatrix} \quad (25)$$

The $\hat{x}$ and $\hat{y}$ in the previous section can be obtained from the time update in the Kalman filter.

The IMM operates multiple filters using different models in parallel, and computes state estimates using a suitable mixing of the estimate and covariance. The IMM may include three steps: mixing, mode-matched filtering, and combination steps. In the mixing step, the estimates $x_{k-1|k-1}^j$ and covariance $P_{k-1|k-1}^j$ from each of the filters (j=1, . . . , r) at the previous iteration are mixed to provide the inputs to each filter. r is the number of models utilized. The algorithm of the mixing step is the following:

$$\mu_{i|j,k-1|k-1} = \frac{p_{ij}\mu_{i,k-1}}{\sum_{i=1}^{r} p_{ij}\mu_{i,k-1}}, \; i, j = 1, \ldots, r \quad (26)$$

where $\mu_{i|j}$ is called mixing probabilities and $p_{ij}$ is mode transition probabilities which containing the probability of transitioning from mode i to mode j. Then initial inputs are as follows $$\hat{x}_{k-1|k-1}^{0j} = \sum_{i=1}^{r} \hat{x}_{k-1|k-1}^{i} \mu_{i|j,k-1|k-1}, \; j = 1, \ldots, r \quad (27)$$

$$P_{k-1|k-1}^{0j} = \sum_{i=1}^{r} \mu_{i|j,k-1|k-1} \{ P_{k-1|k-1}^{i} + [\hat{x}_{k-1|k-1}^{i} - \hat{x}_{k-1|k-1}^{0j}][\hat{x}_{k-1|k-1}^{i} - \hat{x}_{k-1|k-1}^{0j}]^T \}, \; j = 1, \ldots, r$$

Each of the filters with the inputs are executed in the mode-matched filtering step. Also, the likelihood and mode probability update are computed as $$\Lambda_{j,k} = N(z_k - \hat{z}_k^j, S_k^j) \quad (28)$$

$$\mu_{j,k} = \frac{\Lambda_{j,k} \sum_{i=1}^{r} p_{ij}\mu_{i,k-1}}{\sum_{i=1}^{r} \Lambda_{j,k} \sum_{i=1}^{r} p_{ij}\mu_{i,k-1}}, \; i, j = 1, \ldots, r$$

where $S_k^j$ is the measurement covariance from each filter. Lastly, the estimates from each filters are combined and finalized in the combination step. The procedure is the following:

$$\hat{x}_{k|k} = \sum_{j=1}^{r} \hat{x}_{k|k}^j \mu_{j,k}, \quad j = 1, \ldots, r \tag{29}$$

$$P_{k|k} = \sum_{j=1}^{r} \mu_{j,k} \{P_{k|k}^j + [\hat{x}_{k|k}^j - \hat{x}_{k|k}][\hat{x}_{k|k}^j - \hat{x}_{k|k}]^T\},$$

$$j = 1, \ldots, r$$

The Constant Velocity model with Polar velocity (CVP) and the nearly Coordinated Turn model with Polar velocity (CTP) may be used in the IMM framework. The state vector is $$X_{imm} = \{x\ y\ v\ \theta\ \omega\}^T \tag{30}$$

where v is the polar velocity, theta is orientation of the target vehicle and ω is angular velocity in the sensor body frame.

The discrete-time state space equation for the CVP model is given by $$X_{imm,k+1} = \begin{bmatrix} x + v\Delta t\cos(\theta) \\ y + v\Delta t\sin(\theta) \\ v \\ \theta \\ 0 \end{bmatrix}_k + w_{cvp,k} \tag{31}$$

where $w_{cvp,k}$ is zero mean with covariance as $$Q_{cvp,k} = \text{diag}\left(\begin{bmatrix} \sigma_v^2 & 0 \\ 0 & \sigma_v^2 \end{bmatrix}, \Delta t^2 \sigma_a^2, \begin{bmatrix} 0 & 0 \\ 0 & 0 \end{bmatrix}\right) \tag{32}$$

The discrete-time state space equation for the CTP model and its process noise covariance matrix are given by $$X_{imm,k+1} = \begin{bmatrix} x + \frac{2v}{\omega}\{\sin(\frac{\omega\Delta t}{2})\cos(\theta + \frac{\omega\Delta t}{2})\} \\ y + \frac{2v}{\omega}\{\sin(\frac{\omega\Delta t}{2})\sin(\theta + \frac{\omega\Delta t}{2})\} \\ v \\ \theta + \omega\Delta t \\ \omega \end{bmatrix}_k + w_{ctp,k} \tag{33}$$

$$Q_{ctp,k} = \text{diag}\left(\begin{bmatrix} \sigma_v^2 & 0 \\ 0 & \sigma_v^2 \end{bmatrix}, \Delta t^2 \sigma_a^2, \begin{bmatrix} \Delta t^3 \sigma_\omega^2/3 & \Delta t^2 \sigma_\omega^2/2 \\ \Delta t^2 \sigma_\omega^2/2 & \Delta t^2 \sigma_\omega^2 \end{bmatrix}\right) \tag{34}$$

Figure 24:
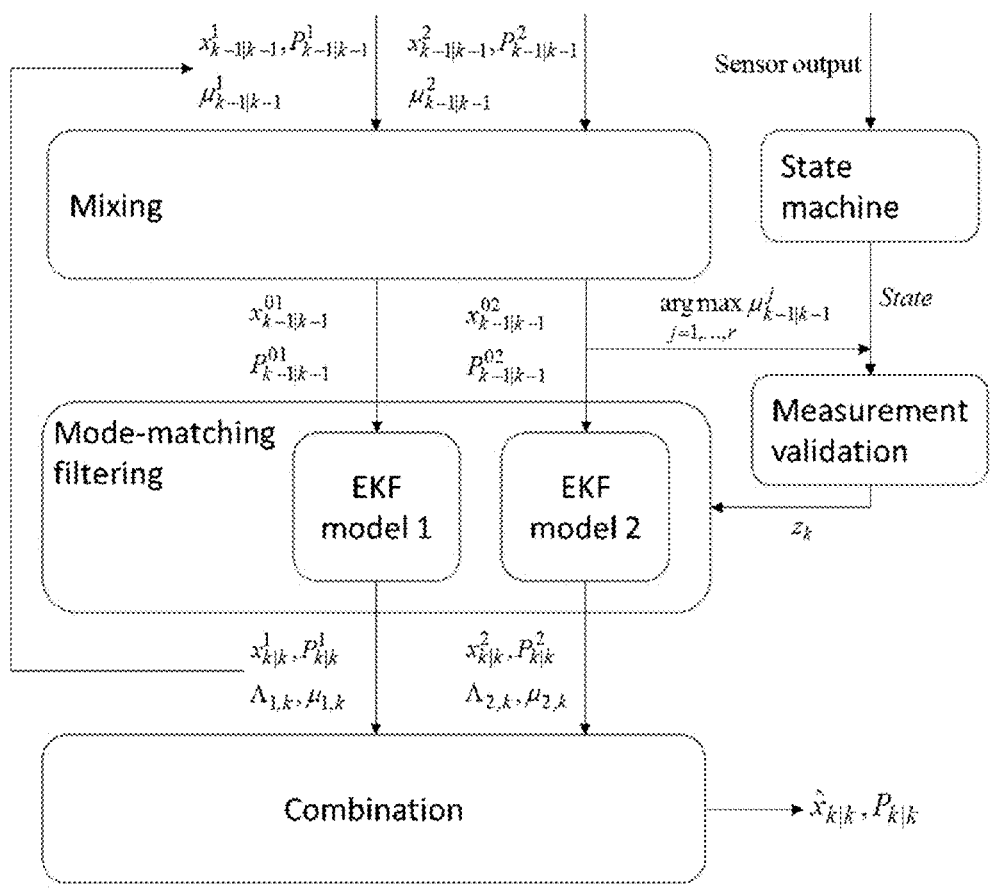
FIG. 24 is a flow diagram of exemplary processes including an active sensing algorithm using an interacting multiple model (IMM) framework.

Since the models are nonlinear, linearized models are used for the Extended Kalman filter combined with the IMM observer (IMM-EKF). FIG. 24 shows an exemplary entire procedure of the rear approaching vehicle tracking using the exemplary IMM-EKF framework.

Initially, the reflection location and following control direction are determined at each sampling time. The mixing step of the IMM may be conducted and each of the mixed inputs are computed. One of the inputs, which has higher probability from the mode probability, may be used to obtain the predictions using the model that corresponds with. Using the predictions, the measurement set can be defined and measurement update is conducted in the mode-match filtering step. Finally, the estimates may be calculated from the combination step. Using the Kalman filter approach follows exactly the same procedure except that the predictions are calculated directly from the time-update step.

The four scenarios of FIG. 19 are simulated using the exemplary active sensing algorithm described herein. The sensor rotational direction control may be conducted based on the state machine approach. Also, a simple system based on assumptions that all reflections occurred from the front surface of the vehicle is compared. Lastly, simulation results using both the KF and the IMM-EKF are presented.

Figure 25:
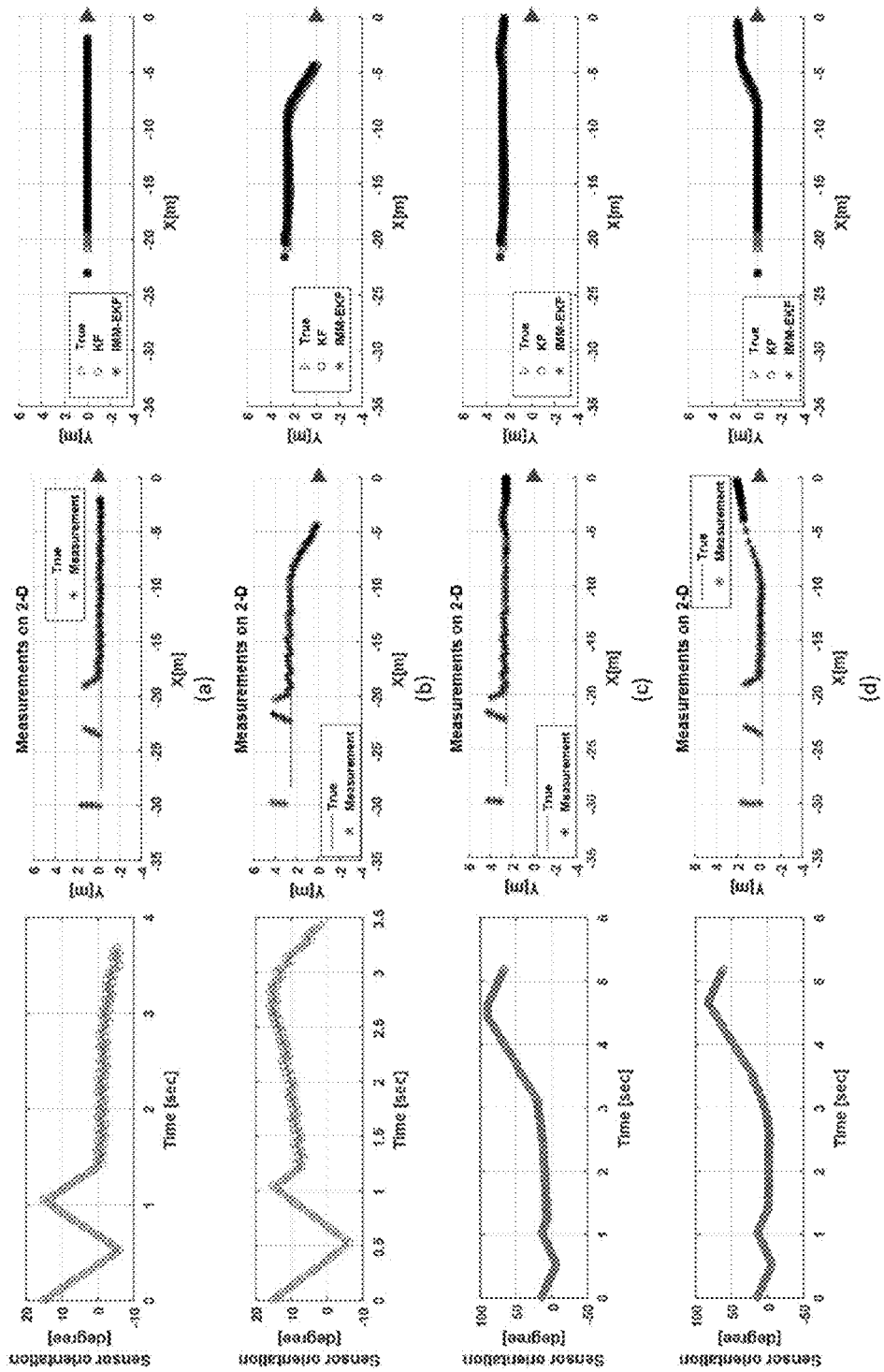
FIG. 25 includes multiple graphs displaying data from simulation results: (a) where a car is approaching right, or directly, behind the bicycle; (b) where a car is changing lanes to the right of the bicycle; (c) where a car is passing by; and (d) where a car is changing lanes to the left of the bicycle.

In the simulation (e.g., using MATLAB), the constant velocity motion model may be used to express the target vehicle and bicycle motions. The velocity of the bicycle and the target vehicle set were set as 4 m/s and 11.2 m/s, respectively. The detection was conducted when the target vehicle is within 25 meters from the simulated rear sensing apparatus 32. A pre-determined scan range for the detection was [−5, 15] in degrees. In the tracking stage, the sensor system was controlled by 1 degree in the CCW direction and 1.5 degree in the CW direction based on the determination of the reflection location on the target vehicle. When the target vehicle gets too close to the directly behind the bicycle and passes by the bicycle, the simulation stops. FIG. 25 shows the simulation results using the sensor direction control by the state machine approach. Each simulation results from (a), (b), (c) and (d) in FIG. 25 correspond with the scenarios of (a), (b), (c) and (d) in FIG. 19.

Figure 26:
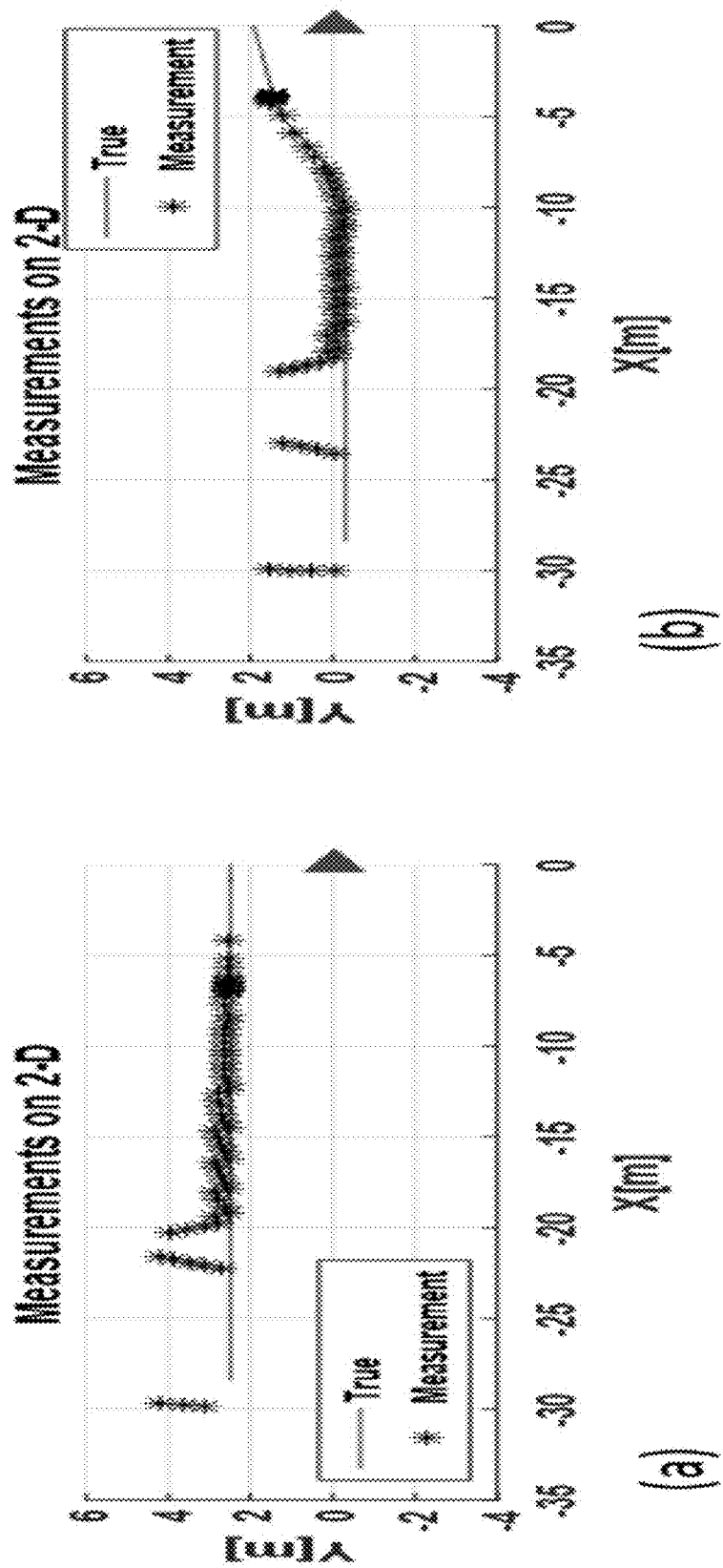
FIG. 26 includes two graphs displaying data from simulation results using the assumption that all reflections occurred from the front surface of the car: (a) where a car is passing by; and (b) where a car is changing lanes to the left of the bicycle.

The location of the rear sensing apparatus 32 is marked as triangle on the plots. The sensor orientation is defined based on the negative X axis as zero and CW direction as positive direction. As shown, the rear sensing apparatus 32 tracks and obtains measurements near the true position of the corner of the target vehicle. FIG. 26 shows the simulation results based on assumptions that all reflections occurred from the front surface of the vehicle. Simulation results were presented to show that the developed rotational control system performed significantly better than a simple system based on assumptions that all reflections occurred from the front surface of the vehicle. The comparisons between the KF and the IMM-EKF are further studied using the simulation. In the KF and the IMM-EKF, the parameters are used as given in Table 1.

TABLE 1

Observer parameters.

|  | $\sigma_v$ | $\sigma_\alpha$ | $\sigma_\omega$ | $\sigma_x$ | $\sigma_y$ |
|---|---|---|---|---|---|
| KF | 0.32 | 10 | . | 1 | 1 |
| IMM-EKF Model 1 | 0.1 | 0.1 | . | 1 | 1 |
| IMM-EKF Model 2 | 0.1 | 0.1 | 0.01 | 2 | 0.1 |

Also, we use the following mode transition matrix:

$$\begin{bmatrix} 0.99 & 0.01 \\ 0.01 & 0.99 \end{bmatrix} \tag{35}$$

Figure 27:
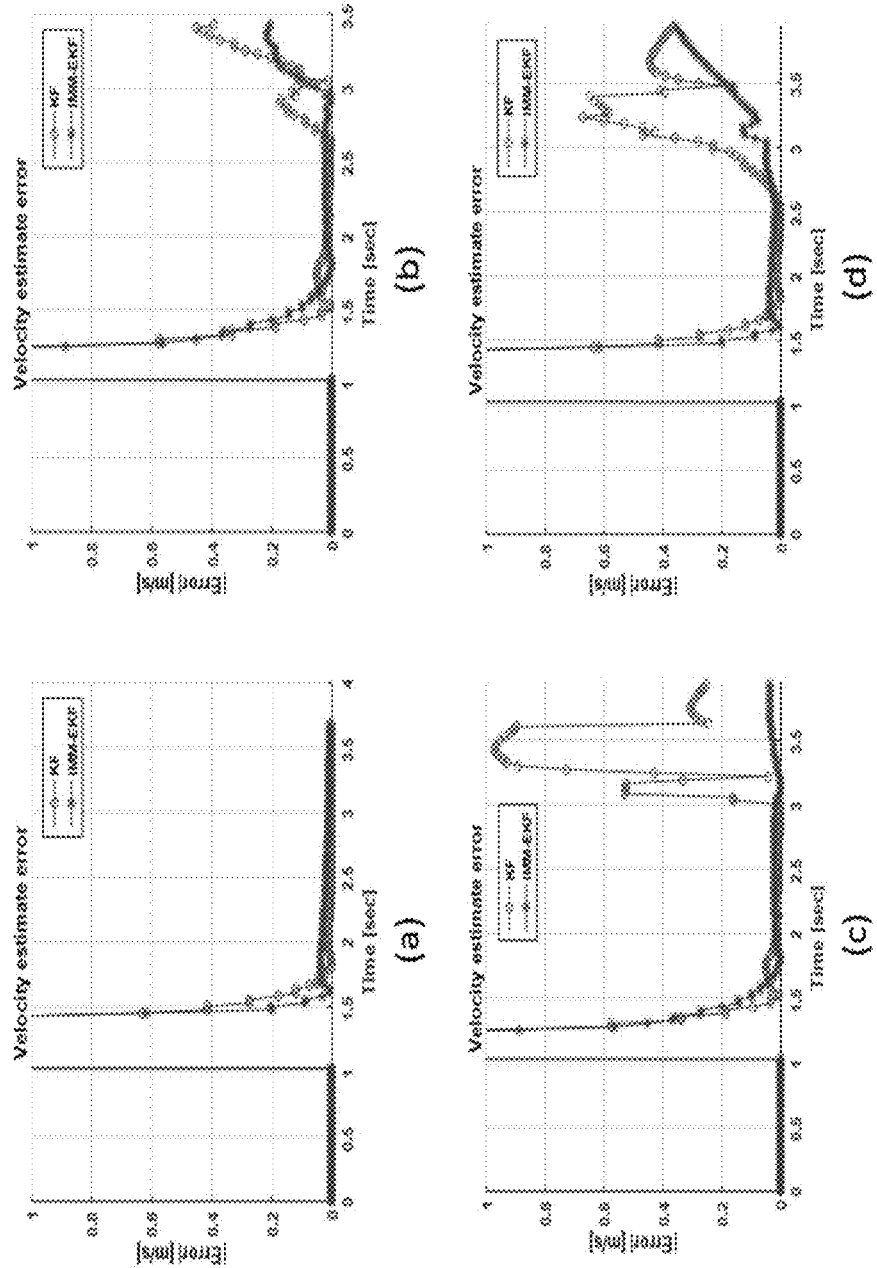
FIG. 27 includes multiple graphs displaying data from simulation results showing velocity error between the true values and estimates: (a) where a car is approaching right, or directly, behind the bicycle; (b) where a car is changing lanes to the right of the bicycle; (c) where a car is passing by; and (d) where a car is changing lanes to the left of the bicycle.
Figure 28:
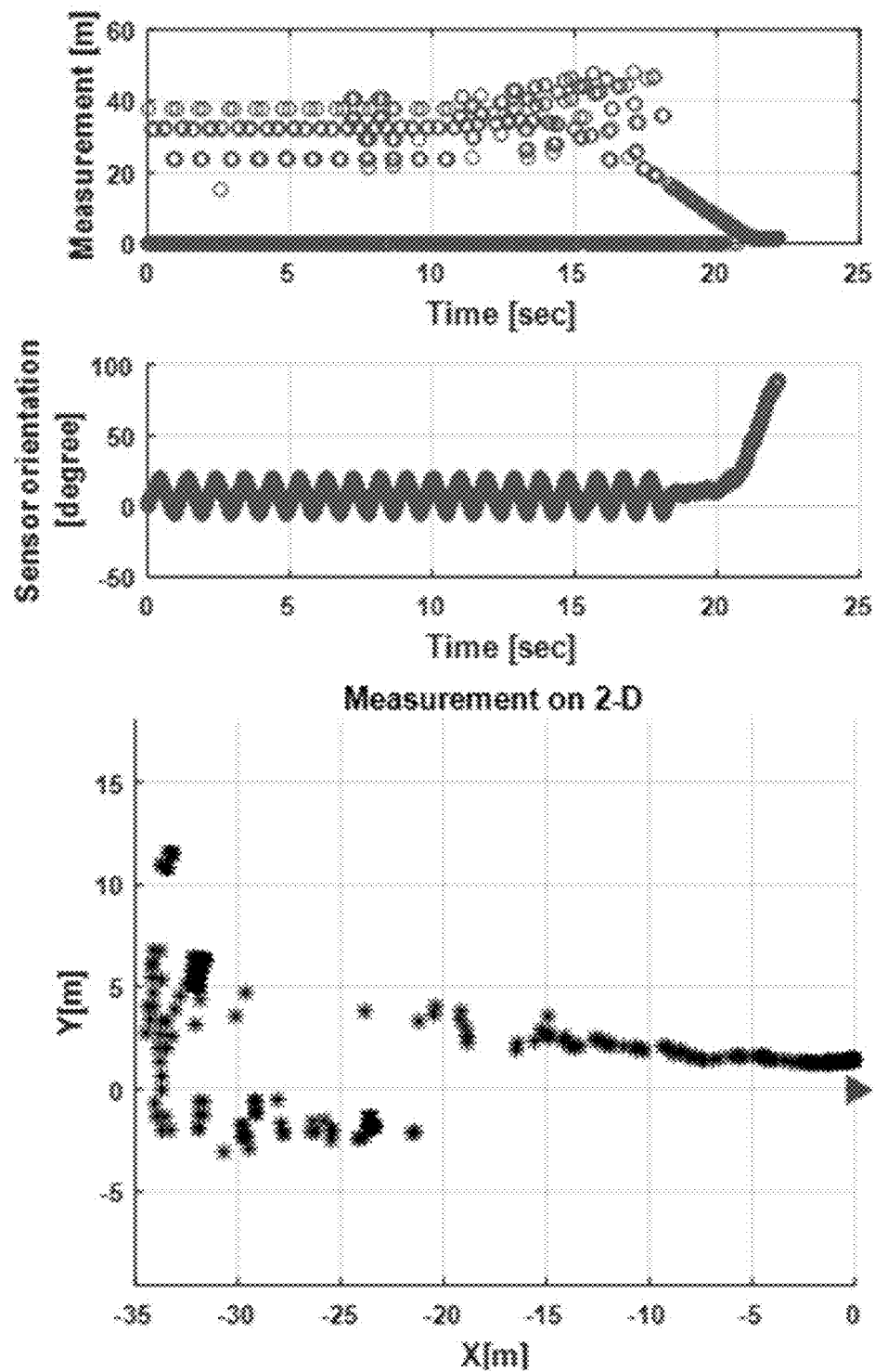
FIG. 28 includes three graphs displaying data from experimental results where a car is passing by the bicycle.
Figure 29:
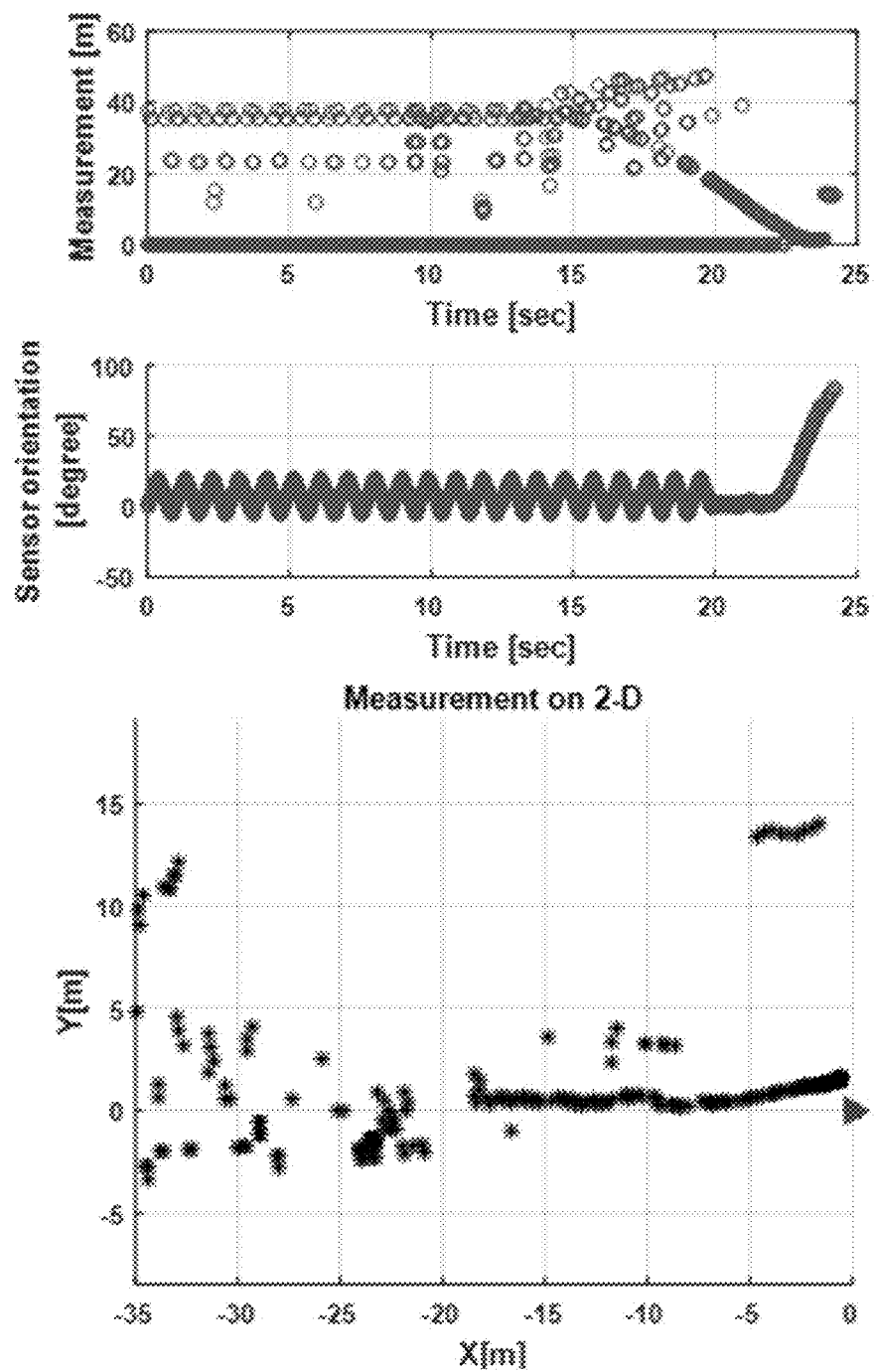
FIG. 29 includes three graphs displaying data from experimental results where a car is changing lanes to the left of the bicycle.

Both observers have a good performance on the longitudinal and lateral position estimates since, e.g., the laser sensor has small noise and the exemplary tracking method with measurement validation step may provide the position information that is close to the corner position as shown in FIG. 25. Additionally, the IMM-EKF may show better performance on the velocity estimate as shown in FIG. 27. The large initial error may be, e.g., due to zero initial condition. Also, the IMM-EKF provide better estimation performance than KF when the target vehicle passes by and turns rapidly.

Experiments were further conducted in order to verify the performance of the proposed active sensing algorithm in situations of the four scenarios of a car approaching right behind the bicycle, initially going straight with a certain lateral distance gap, and then changing lanes to the right, passing by a bicycle, and changing lanes to the left from behind the bicycle. From the experimental data, the proposed active sensing algorithm using the state machine approach was shown to provide good tracking performance. Also, the simulation results are well-matched with the experimental data by presenting not only the results from the state machine approach but also the results from simple approach based on the assumption that all reflections occurred from the front surface of the car.

Figure 30:
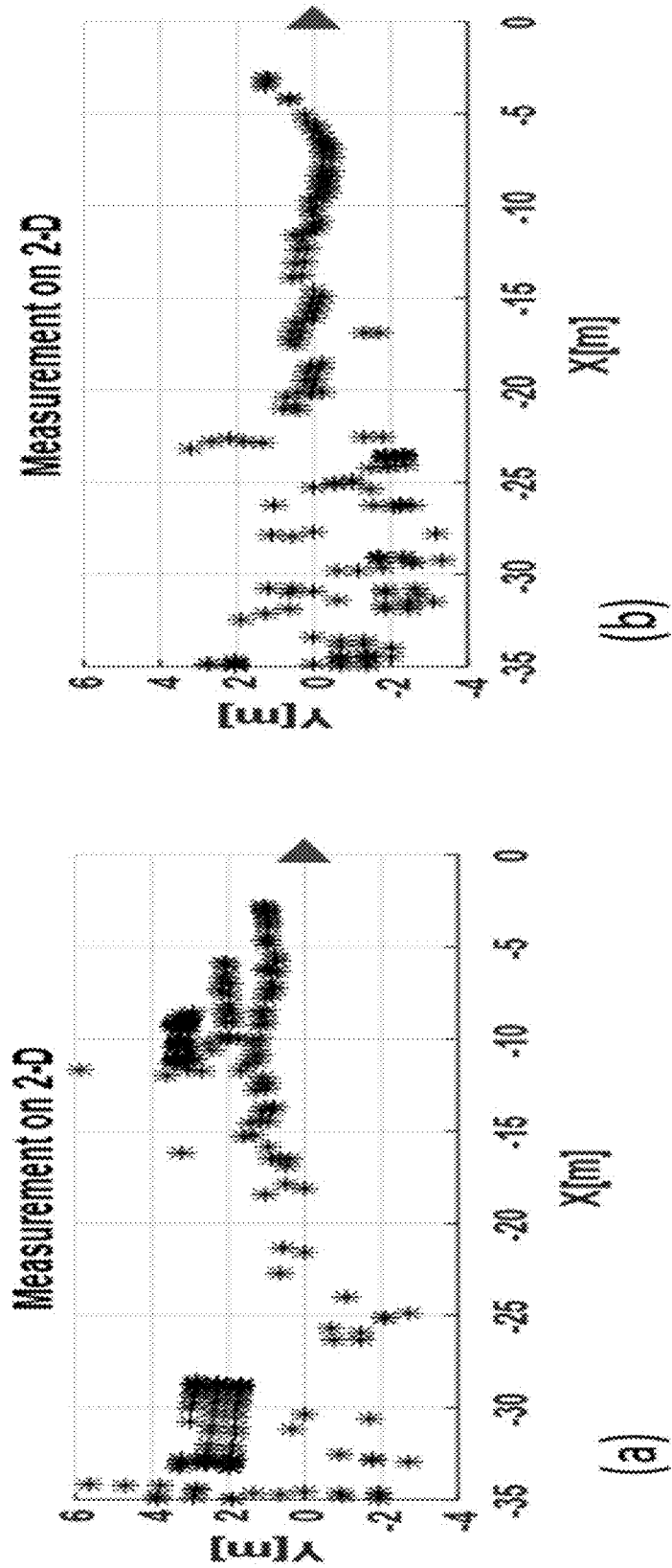
FIG. 30 includes two graphs displaying data from experimental results using the assumption that all reflections occurred from the front surface of the car: (a) where a car is passing by; and (b) where a car is changing lanes to the left of the bicycle.
Figure 31:
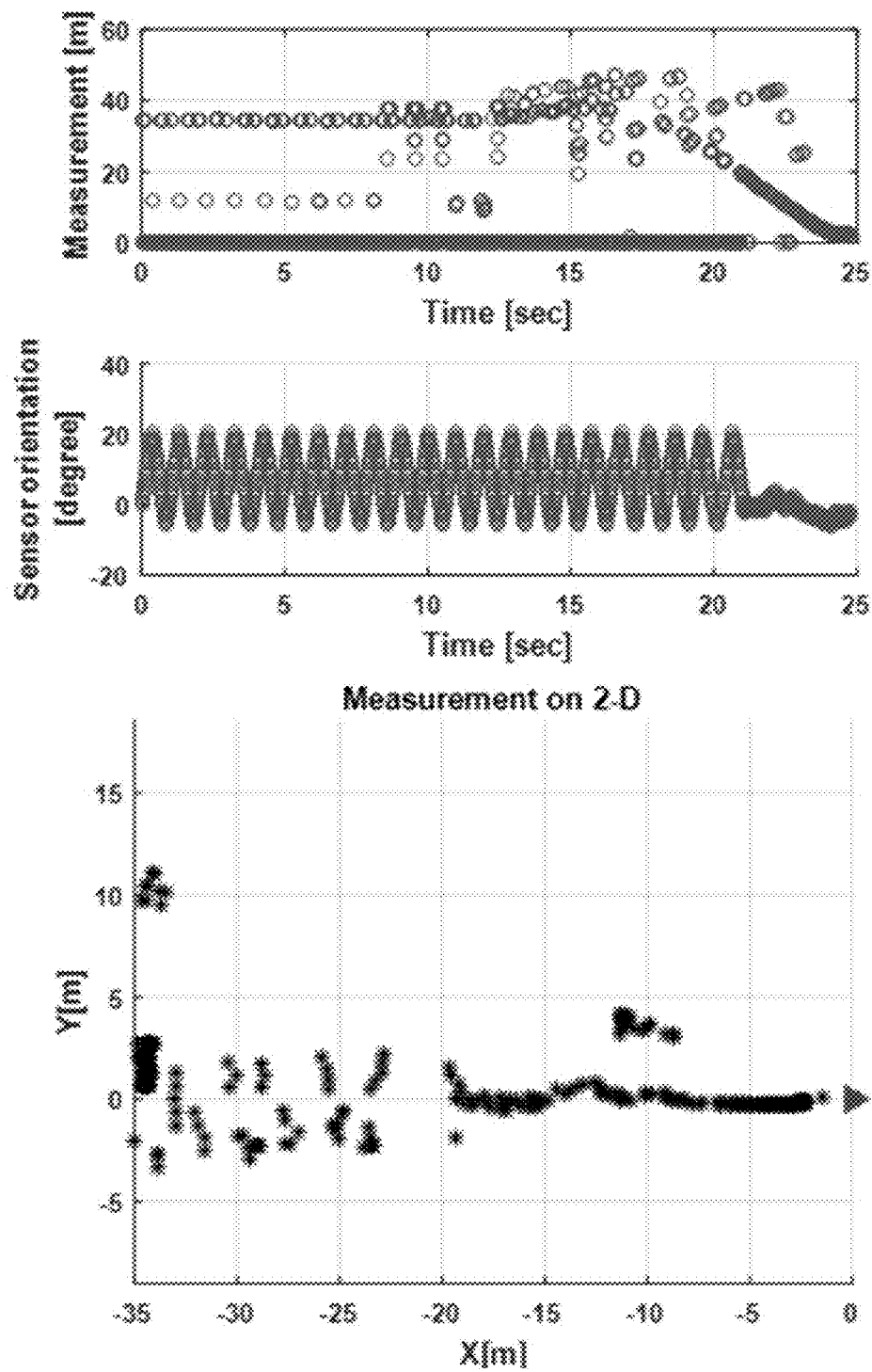
FIG. 31 includes three graphs displaying data from experimental results where a car is approaching right, or directly, behind the bicycle.
Figure 32:
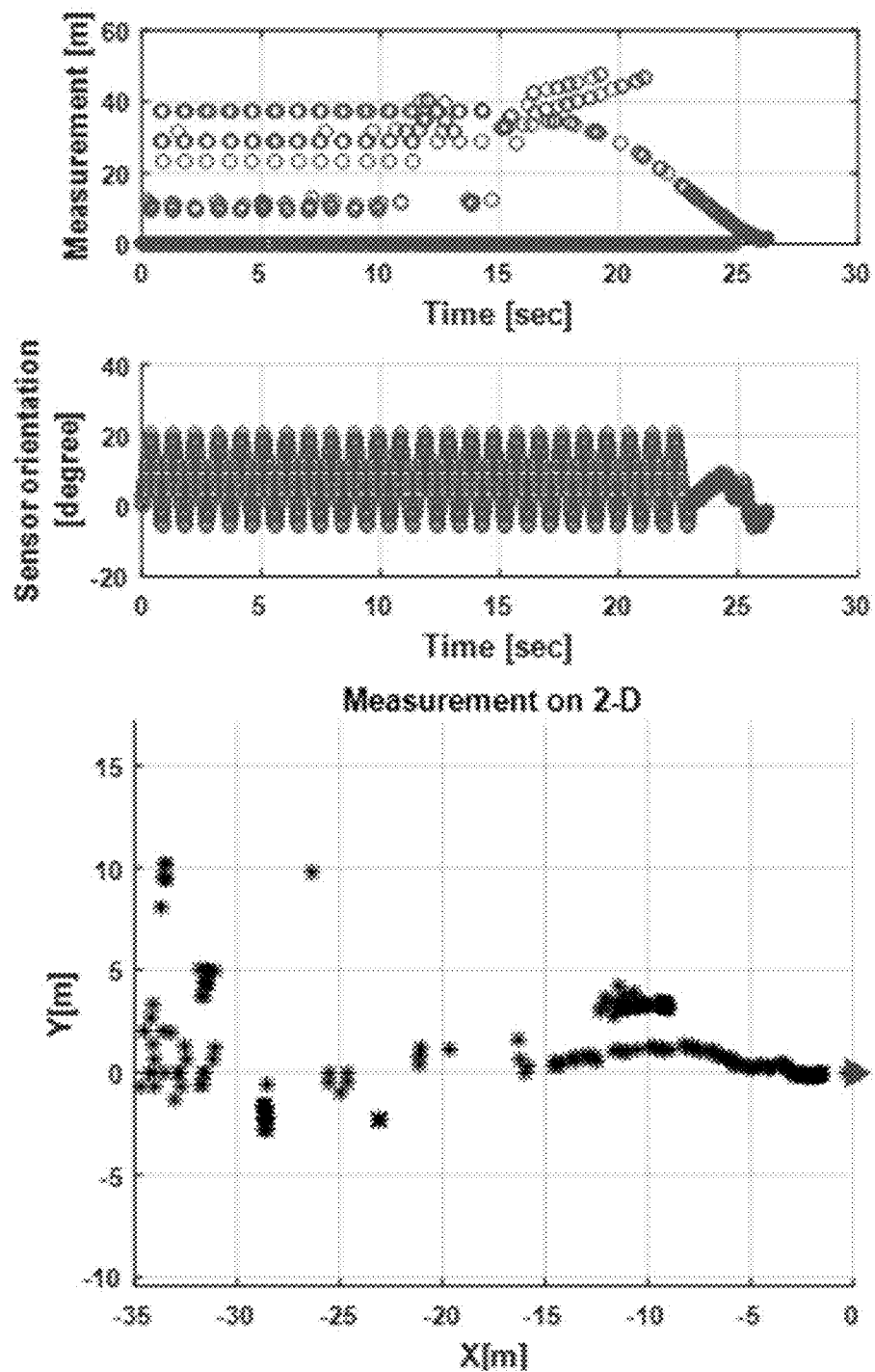
FIG. 32 includes three graphs displaying data from experimental results where a car is changing lanes to the right of the bicycle.

Parameters in Table 1 were used for both the KF and IMM-EKF. As similar to the simulation, the detection is conducted when the target vehicle is within 25 meters from the rear sensing apparatus 32. Directly behind the bicycle and left adjacent lane are only concerned as an interest area. A pre-determined scan range for the detection was set as [−5, 20] in degrees. In the tracking stage, the sensor system is controlled by 0.9 degree in the CCW direction and 1.6 degree in the CW direction based on the determination of the reflection location on the target vehicle. First, the simple control based on the assumption that all reflections occurred from the front surface of the car is implemented. In some situations, measurements may not be able to be obtained and the rear sensing apparatus 32 may fail to track the target vehicle when the target vehicle gets too close to the sensor system as shown in FIG. 30.

Figure 33:
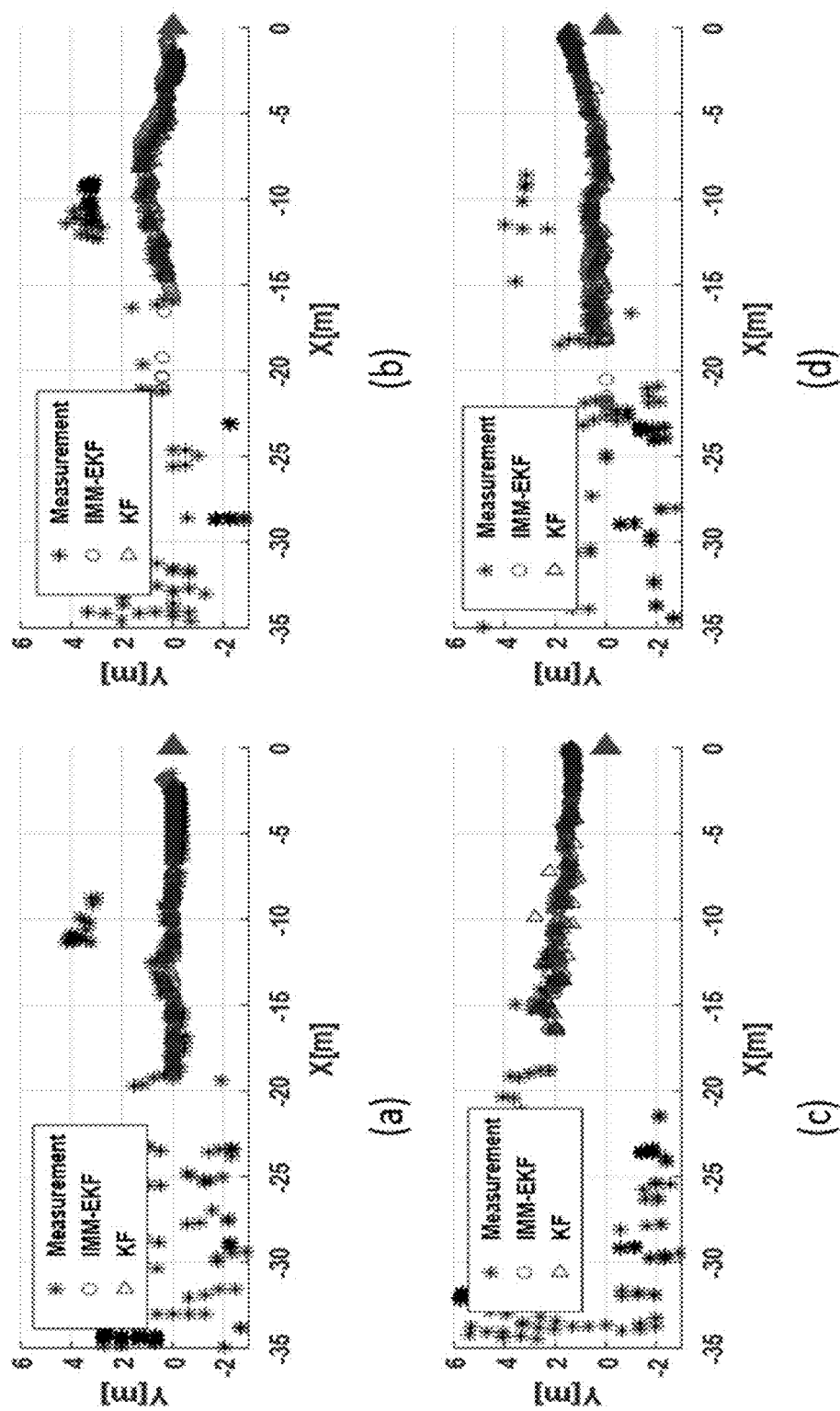
FIG. 33 includes four graphs displaying data from experimental results: (a) where a car is approaching right, or directly, behind the bicycle; (b) where a car is changing lanes to the right of the bicycle; (c) where a car is passing by; and (d) where a car is changing lanes to the left of the bicycle.

The results show mostly same behavior as the results from the simulation as shown in FIG. 26. Finally, FIGS. 28-29 and 31-32 shows the measurements for four scenarios using the state machine approach, which may be used verify that the sensor system can track the scenarios well. By compared with the results in FIGS. 29-30, it is clear that the sensor system can track the target vehicle almost until the car passes the bicycle. FIG. 33 shows the estimation results from the KF and IMM-EKF. As shown, the IMM-EKF may provide smoother trajectories of the car.

Figure 34:
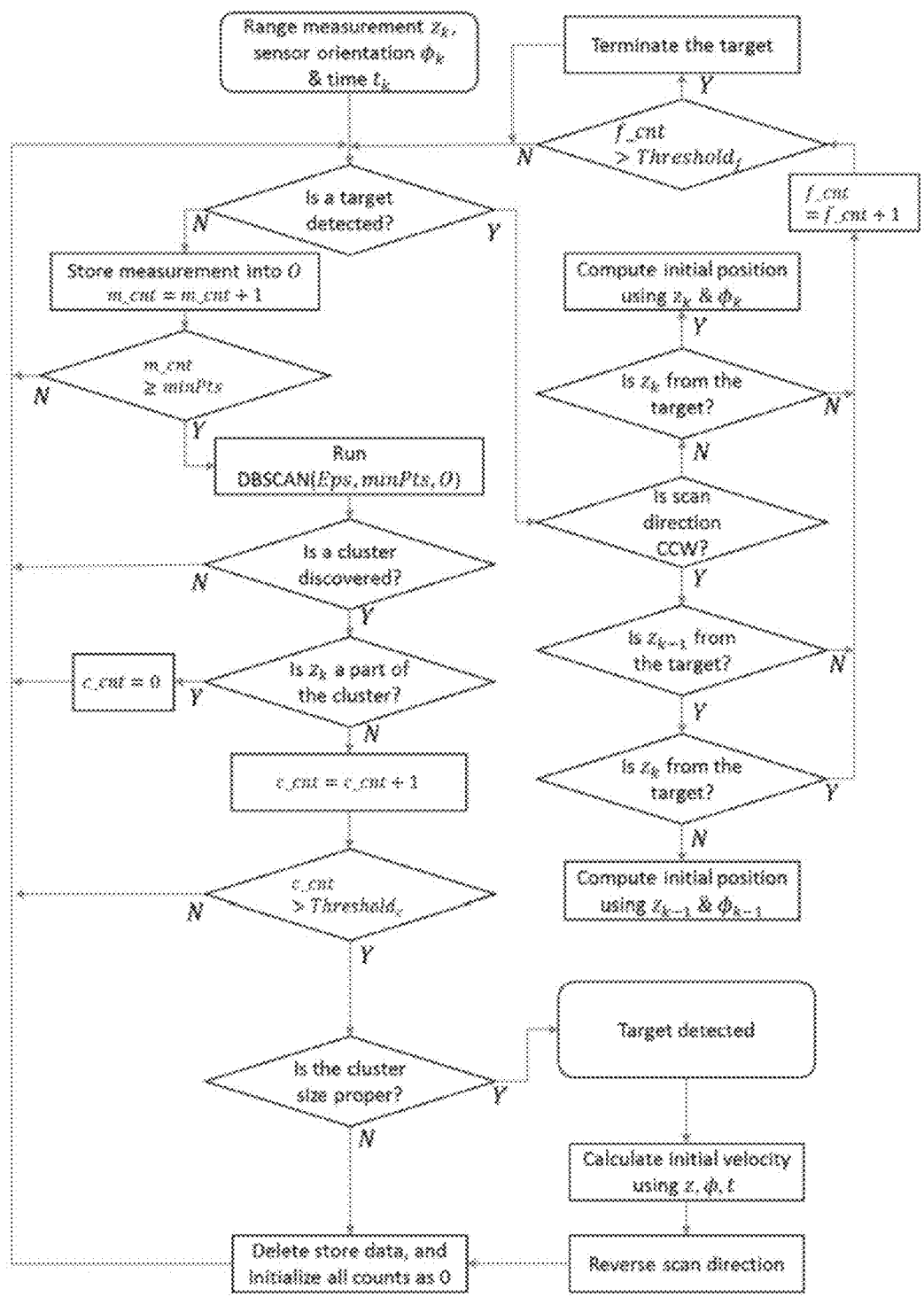
FIG. 34 depicts a flow diagram of exemplary target detection processes with computing initial conditions of target position and velocity.

A detection of a target as a rear-approaching vehicle from laser sensor measurements may be challenging since not only the target vehicle but also the ground and any objects in the area of interest can be detected by the rear sensing apparatus. A clustering-based target detection algorithm, which also computes the initial conditions of target position and velocity, may be used on one or more embodiments. An exemplary target detection method is depicted in FIG. 34. An exemplary Density Based Spatial Clustering of Application with Noise (DBSCAN) may be utilized in this algorithm and may be customized for the bicycle application. The DBSCAN uses two parameters: a minimum radius Eps and a minimum number of points within the radius minPts. Using the parameters, the DBSCAN can identify clusters by examining the local density of data in spatial data sets. The rear sensing apparatus 32 (e.g., laser sensor system) may initially keep scanning over a pre-determined range and stores measurements to an array. Once a number of stored measurement data exceeds minPts, the DBSCAN examines the data whether it constitutes a cluster or not. By setting proper Eps and minPts, measurements from small objects or outliers cannot contribute to the cluster. This procedure may be iterated until a cluster is discovered and then a certain number of iteration does not contribute to the cluster. After the isolated cluster is found, the cluster is examined by its lateral size. If the size is within thresholds, the cluster is confirmed as a target vehicle. Otherwise, stored data are deleted and this procedure is repeated FIG. 35(a) shows the raw experimental data for a rear passing vehicle. The rear sensing apparatus (e.g., laser sensor system) may be fixed on a tripod, and initially scans open-loop with a 30 degrees fixed range. A vehicle is approaching in a straight motion and passing by the rear sensing apparatus 32. The measurements are represented on a 2-D map (longitudinal versus lateral distance) using range and orientation of the sensor measurements. It may be challenging to distinguish between the measurements from a vehicle and other objects. FIG. 35(b) shows the result using the exemplary clustering method and processes, with different shades representing each scan. As shown when comparing the data from the FIG. 35(a) to FIG. 35(b), the outliers (small number of data in isolation) and ground detection points (sparse data) are eliminated.

After the cluster is confirmed as a target, initial conditions of the target kinematics are computed for better tracking performance. An initial relative velocity may be calculated using the stored data close to the center of the vehicle. For instance, most recent data are used when the system may detect a target with clockwise direction scan. To the next step, the scan direction may be reversed to find initial relative position (right front corner position) of the vehicle. If the reversed scan direction is counter-clockwise (CCW), the rear sensing apparatus 32 may scan over the target until the sensor misses the target. Then, the last measurement before the rear sensing apparatus 32 misses the target is used as initial relative position of the target. If the reversed scan direction is clockwise (CW), the rear sensing apparatus 32 may scan until the it obtains first measurement from the target and the measurement is used as the initial relative position of the target. Finally, the target detection may be completed, and target motion tracking and estimation start using the calculated initial conditions.

To begin with, the vehicle may be assumed to only have one-dimensional (1-D) motion. The vehicle could be in the same lane as the bicycle, or in the adjacent lane to the left, if the bicycle is driving in a bicycle lane or a shoulder as shown in (a) and (c) of FIG. 19. A complete scan over the full area of interest may take too much time for even 1-D vehicle motion tracking using the exemplary the rear sensing apparatus 32 due to its low sampling frequency. Thus, an efficient control algorithm may be used to focus the orientation of the rear sensing apparatus (e.g., laser sensor) in real-time. As used herein, the geometric shape of the vehicle may be estimated or approximated by a rectangular shape and all variables may be defined based on a two-dimensional (2-D) coordinate frame attached to the bicycle as illustrated in FIG. 22, where $\phi$ and d are the sensor orientation and range measurement, and x and y are relative longitudinal and lateral distances between the vehicle and bicycle.

In the case where the vehicle behind the bicycle is traveling straight without turns, once the target vehicle is detected, the exemplary systems, apparatus, and methods may focus on obtaining an estimation of longitudinal distance between the vehicle and the bicycle. Thus, the exemplary systems, apparatus, and methods may aim the rear sensing apparatus 32 at the front of the vehicle continuously to estimate the longitudinal distance. In one or more embodiments, the Model Predictive Control (MPC) approach may be used so as to control the rear sensing apparatus 32 (e.g., laser sensor) to track a reference point on the front of the target vehicle using limited rotational angle changes. The rear sensing apparatus 32 can be expressed as $$\phi_{k+1} = \phi_k + u_k \qquad (36)$$

where $u_k$ is sensor orientation control input at time k. It may be challenging to predict the motion of the target vehicle accurately over multiple time steps due to unknown desired acceleration actions, and therefore, one step prediction of the motion of the target vehicle may be used to examine sensor orientation control. During 1-D motion, the lateral distance between a point at the front of a target vehicle and bicycle does not change. Therefore, the reference point for sensor tracking may be calculated using a point at the front of the target vehicle and predicted longitudinal vehicle motion during each time sample. The following optimization problem can be considered:

$$\min_{u_k} \left\| \frac{y_{ref}}{\hat{x}_{k+1}} - \tan(\phi_k + u_k) \right\|^2 \qquad (37)$$

$$\text{subject to } \hat{x}_{k+1} = f_{1,k}(X_k), \hat{x}_{k+1} > 0$$

$$u_k \in U, \phi_{min} < \phi_k + u_k < \phi_{max}$$

where $y_{ref}$ can be obtained by calculating the center location of the cluster obtained at the time of the target vehicle detection, X is state vector for the target motion, $f_1(\bullet)$ is the target motion model which corresponds to x, and U is a finite set of feasible control inputs. The control input for the sensor orientation can be obtained by solving the above optimization problem. Practically, the sensor orientation will be less than 90 degrees and larger than −90 degrees in order to scan the area of interest. First, the optimal solution of the optimization problem without control input constraints is found where the derivative is zero. Then, the control input which is closest in value is selected from within the finite set of feasible control inputs.

A Kalman filter may be used to estimate the longitudinal vehicle motion. The state vector to be estimated is $$X = [x \ v_x \ a_x]^T \qquad (38)$$

where x, $v_x$, and $a_x$ are relative longitudinal distance, velocity and acceleration.

The longitudinal vehicle motion dynamics can be defined as $$X_{k+1} = \begin{bmatrix} 1 & T & T^2/2 \\ 0 & 1 & T \\ 0 & 0 & 1 \end{bmatrix} X_k + w_k \qquad (39)$$

where T is the sampling interval and w is process noise. Since the range and sensor orientation measurements from the laser sensor system have relatively small noise, we compute an equivalent measurement in Cartesian coordinates from the true laser sensor measurement in polar coordinates:

$$z_k = d_k \cos \phi_k \qquad (40)$$

This sensor measurement is examined by comparing recent longitudinal distance estimates of the target vehicle. If the measurement is verified to come from the target vehicle, the states are estimated using the Kalman filter with the measurement. Otherwise, the states are estimated by only time updates. After the estimation, the time update using Equation (39) without considering process noise is conducted to predict the longitudinal vehicle motion $\hat{x}_{k+1}$. The predicted longitudinal distance will be used in Equation (37) to obtain the control input.

An exemplary detection algorithm and a 1-D motion tracking algorithm were implement MATLAB for verification under various simulated vehicle velocities and accelerations. The simulation environment was constructed using the dimensions of a bicycle and a vehicle based on a 28-inch wheel bicycle and a midsize sedan. Then, the motion of the bicycle and the vehicle can be expressed by using a velocity motion model. It is worth mentioning that the simulation took into account the incidence angle of a laser beam of the rear sensing apparatus to the objects. 70 degrees maximum, which is obtained from experiments, may be used as a threshold for maximum incidence angle. Further, random measurement noise ~N(0,2²[cm]) was added to this simulation.

A typical situation may be simulated in which the bicycle is riding straight and the vehicle is going on the adjacent lane next to the bicycle lane as described in (c) of FIG. 19. In this simulation, the bicycle may move with a constant speed of 4.5 m/s. Further, the detection may be conducted when the target vehicle is within 25 meters from the rear sensing apparatus. Two parameters, Eps and minPts, of DBSCAN may be set as 0.5 m and 4, respectively. The finite set of control inputs is {−1, 0, 1} in degrees, and $\phi_{min}$ and $\phi_{max}$ are −5 and 90 degrees, respectively.

FIG. 36 shows the simulation results using an open-loop fixed scan range (using 30 degrees). The location of the simulated rear sensing apparatus 32 is marked with a triangle on the plot. It is clear that the measurements are not available most of the time and estimate updates are slow. Due to the sparse measurement data, the tracking performance may be described as being poor. The results of the laser sensor motion control using the receding horizon control method are shown in FIG. 37. As shown, the tracking performance is better and the estimates are updated very fast by obtaining measurements almost continuously using the receding horizon control method.

Figure 38:
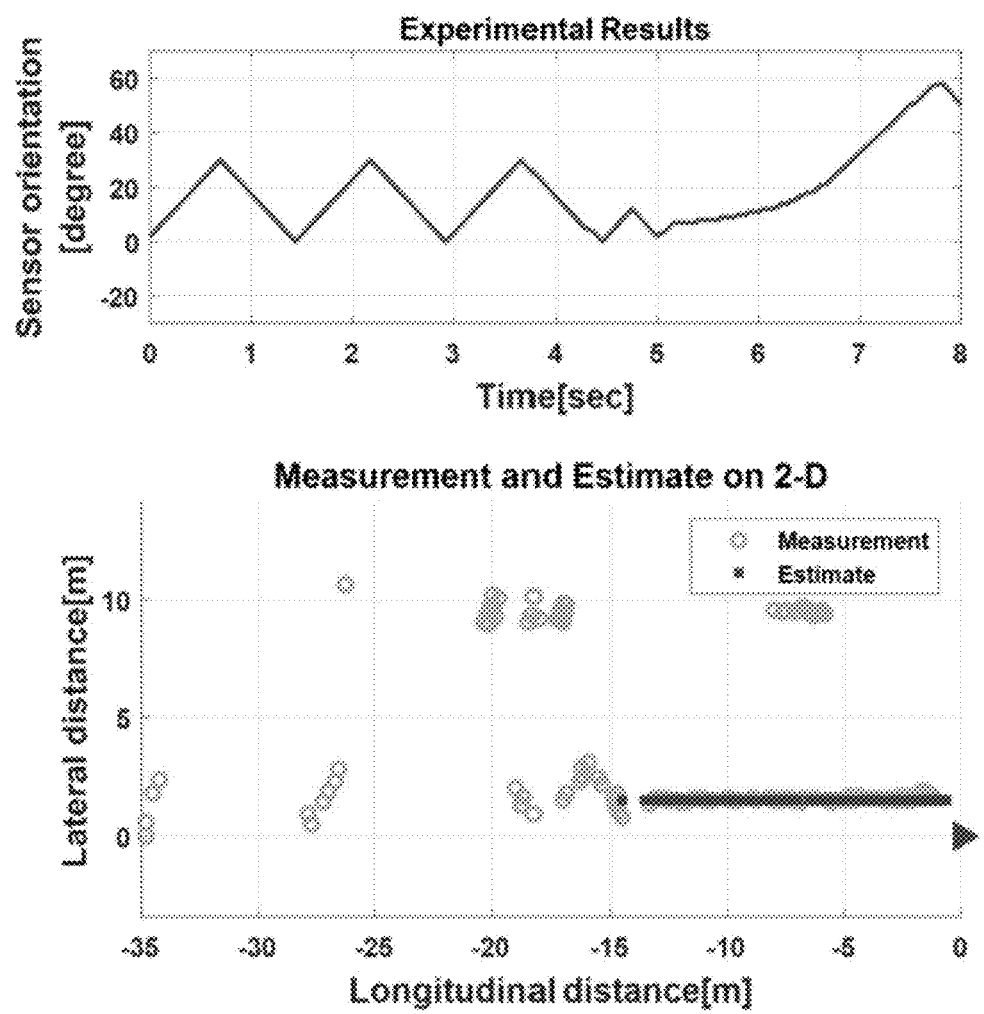
FIG. 38 includes two graphs displaying orientation and lateral distance data from simulation results using exemplary one-dimensional tracking including receding horizon optimization processes.

Further, experiments involving 1-D vehicle motion in which a vehicle is passing by a bicycle without turns were conducted. In order to verify the proposed control and estimation method, a tripod was used to station the laser sensor system on a rotating platform and the lateral distance between the sensor system and the passing vehicle is approximately 2 meters. The results were well-matched with simulation results and show that the sensor system can track the vehicle position very well as shown in FIG. 38, which depicts experimental results using the exemplary 1-3 motion tracking processes.

The exemplary systems, apparatus, and methods may also be configured to track both a rear-approaching vehicle that might be right behind the bicycle, or a rear-approaching vehicle in an adjacent lane next to a bicycle lane, and might be either traveling straight or turning in either direction. More specifically, the exemplary systems, apparatus, and methods may expand from tracking 1-D motion to tracking to 2-D motion tracking so as to track the right front corner of a target vehicle. Like 1-D motion tracking, a desired orientation for the rear sensing apparatus (e.g., laser sensor system) may be determined at every sampling time instead of waiting for the end of an open-loop scan range. From this data, despite using a single beam laser sensor with low sampling frequency, not only acquisition of both lateral and longitudinal information but also more robust tracking rather than using small area scanning can be accomplished. Further, a receding horizon controller with an interacting multiple model estimation framework may be used in conjunction with such systems.

For 2-D vehicle motion tracking, the exemplary systems, apparatus, and methods may be configured to track the right front corner of a target vehicle by measuring alternately distances to the front and side of the vehicle at point close to the right front corner, since the right front corner tracking provides both lateral and longitudinal distance information. Therefore, the reference point for orientation control needs to be changed depending on the corresponding selection of which information (longitudinal or lateral) is needed. The following optimization problem is therefore constructed for orientation control:

$$u_k^* = \begin{cases} \underset{u_k}{\operatorname{argmin}} \left\| \frac{\hat{y}_{k+1} + \delta_y}{\hat{x}_{k+1}} - \tan(\phi_k + u_k) \right\|^2, \\ \text{if longitudinal distance is desired} \\ \underset{u_k}{\operatorname{argmin}} \left\| \frac{\hat{y}_{k+1}}{\hat{x}_{k+1} + \delta_x} - \tan(\phi_k + u_k) \right\|^2, \\ \text{if lateral distance is desired} \end{cases} \quad (41)$$

subject to $\hat{x}_{k+1} = f_{1,k}(X_k)$, $\hat{y}_{k+1} = f_{2,k}(X_k)$, $\hat{x}_{k+1} > 0$ $u_k \in U$, $\phi_{min} < \phi_k + u_k < \phi_{max}$ where $f_2(\cdot)$ is the target motion model which corresponds to y, and $\delta_x$ and $\delta_y$ are certain distance margins which are used to construct reference points on the target vehicle. The margins may be small enough for fast measurement updates and be large enough for robustness to deal with vehicle maneuver changes. Once the vehicle is passing next to the bicycle (i.e., $\hat{x}$ k+1≤0), the system may focus on measuring the lateral distance since, e.g., it may not possible and not useful to obtain the longitudinal distance.

In one or more embodiments, the longitudinal distance and lateral distance may be obtained alternately to deal with vehicle maneuver changes. Further, as soon as obtained information is verified (e.g., determination of whether the reflected beam is from the front or side of the vehicle), the reference point may be switched to seek the other information. However, it may be challenging to determine the location (e.g., front or side) of the reflection using only one measurement. Also, every reflection from the side or front of the vehicle may not always detectable. For instance, when the target vehicle is far from the sensor, the sensor cannot obtain reflections from the side due to the geometry, i.e., the incidence angle is too large to reflect enough intensity of the beam to the sensor. Similarly, when the target vehicle is very close to the sensor with significant lateral distance (passing vehicle), the sensor cannot obtain reflections from the front. Additionally, the exemplary systems, apparatus, and methods described herein may additionally utilize the state diagram of FIG. 21 and processes associated there with.

The 2-D motion of a vehicle may be challenging to be described by only one model since it has basically two distinct maneuvers: straight motion and turning motion. Hence, the motion of the vehicle may be presented, or modeled, using two models such as, e.g., a straight motion model and a turning motion model, rather than using a single model. Further, practical algorithms to estimate target kinematics using this multiple model approach such as generalized pseudo-Bayesian approaches and an interacting multiple model estimation algorithm may be utilized. In this example, the Interacting Multiple Model (IMM) algorithm may be utilized because the IMM algorithm may be described as and considered to be the best compromise between complexity and performance.

The IMM system may operate multiple filters using the different models in parallel, and may compute state estimates using suitable mixing of the estimates and covariance from the two models. The IMM may include three steps: mixing, mode-matched filtering, and combination. In the mixing step, the estimates $X_{k-1|k-1}^j$ and covariance $P_{k-1|k-1}^j$ from each of the filters (j=1, . . . , r) at the previous iteration may be mixed to provide the inputs to each filter. r is the number of models utilized. The algorithm of the mixing step is the following:

$$\mu_{i|j,k-1|k-1} = \frac{p_{ij}\mu_{i,k-1}}{\sum_{i=1}^{r} p_{ij}\mu_{i,k-1}}, \, i, j = 1, \ldots, r \quad (42)$$

where $\mu_{i|j}$ is called mixing probabilities and $p_{ij}$ is mode transition probabilities which containing the probability of transitioning from mode i to j. Then initial inputs are $$\hat{X}_{k-1|k-1}^{0j} = \sum_{i=1}^{r} \hat{X}_{k-1|k-1}^{i} \mu_{i|j,k-1|k-1}, \, j = 1, \ldots, r \quad (43)$$

$$P_{k-1|k-1}^{0j} = \sum_{i=1}^{r} \mu_{i|j,k-1|k-1}$$
$$\left\{ P_{k-1|k-1}^{i} + \left[ \hat{X}_{k-1|k-1}^{i} - \hat{X}_{k-1|k-1}^{0j} \right] \left[ \hat{X}_{k-1|k-1}^{i} - \hat{X}_{k-1|k-1}^{0j} \right]^T \right\},$$
$$j = 1, \ldots, r$$

Each of the filters with the inputs are executed in the mode matched filtering step. Also, the likelihood and mode probability update are computed as $$\Lambda_{j,k} = N(z_k - \hat{z}_k^j, S_k^j), \, j = 1, \ldots, r \quad (44)$$

$$\mu_{j,k} = \frac{\Lambda_{j,k} \sum_{i=1}^{r} p_{ij}\mu_{i,k-1}}{\sum_{i=1}^{r} \Lambda_{j,k} \sum_{i=1}^{r} p_{ij}\mu_{i,k-1}}, \, j = 1, \ldots, r$$

where $S_k^j$ is the measurement covariance from each filter. Lastly, the estimates from each filters are combined and finalized in the combination step. The procedure is the following:

$$\hat{X}_{k|k} = \sum_{j=1}^{r} \hat{X}_{k|k}^j \mu_{j,k} \quad (45)$$

$$P_{k|k} = \sum_{j=1}^{r} \mu_{j,k} \left\{ P_{k|k}^j + \left[ \hat{X}_{k|k}^j - \hat{X}_{k|k} \right] \left[ \hat{X}_{k|k}^j - \hat{X}_{k|k} \right]^T \right\}$$

Further, future vehicle motion can be predicted and computed in the IMM framework. After the estimates are obtained, the mixing step may be conducted to calculate the mixed initial conditions for the next iteration using Equations (44) and (45). Then, predictions for each modes are computed using its models as $$\hat{X}_{k+1|k}^j = f(\hat{X}_{k|k}^{0j}), j=1, \ldots, r \quad (46)$$

The predictions of vehicle motion in (41) can be obtained from $$\hat{X}_{k+1|k} = \sum_{j=1}^{r} \hat{X}_{k+1|k}^j \mu_{j,k} \quad (47)$$

The Constant Velocity model with Polar velocity (CVP) and the nearly Coordinated Turn model with Polar velocity (CTP) may be used in the IMM framework. The state vector is $$X = [x\ y\ v\ \theta\ \omega]^T \quad (48)$$

where $v$ is the polar velocity and $\omega$ is the angular velocity in the sensor body frame. The discrete-time state space equation for the CVP model may be given by $$X_{k+1} = \begin{bmatrix} x + vT\cos(\theta) \\ y + vT\sin(\theta) \\ v \\ \theta \\ 0 \end{bmatrix}_k + w_{v,k} \quad (49)$$

where $w_{v,k}$ is zero mean with covariance as $$Q_{v,k} = \text{diag}\left[\begin{bmatrix} \sigma_{vx}^2 & 0 \\ 0 & \sigma_{vy}^2 \end{bmatrix}, T^2\sigma_a^2, \begin{bmatrix} 0 & 0 \\ 0 & 0 \end{bmatrix}\right] \quad (50)$$

The discrete-time state space equation for the CTP model and its process noise covariance matrix are given by $$X_{k+1} = \begin{bmatrix} x + \frac{2v}{\omega}\left\{\sin\left(\frac{\omega T}{2}\right)\cos\left(\theta + \frac{\omega T}{2}\right)\right\} \\ y + \frac{2v}{\omega}\left\{\sin\left(\frac{\omega T}{2}\right)\cos\left(\theta + \frac{\omega T}{2}\right)\right\} \\ v \\ \theta + \omega T \\ \omega \end{bmatrix}_k + w_{t,k} \quad (51)$$

$$Q_{t,k} = \text{diag}\left[\begin{bmatrix} \sigma_{vx}^2 & 0 \\ 0 & \sigma_{vy}^2 \end{bmatrix}, T^2\sigma_a^2, \begin{bmatrix} T^3\sigma_\omega^2/3 & T^2\sigma_\omega^2/2 \\ T^2\sigma_\omega^2/2 & T^2\sigma_\omega^2 \end{bmatrix}\right] \quad (52)$$

Since the state space models above are nonlinear, linearized models may be used for the Extended Kalman filter combined with the IMM (IMM-EKF).

As discussed earlier, the measurement often contains only partial information about the corner position. Therefore, a validation step for the measurement may be used to utilize only information which corresponds to the corner position of the vehicle. When the measurement is obtained from the front of the vehicle, the projection of the measurement to X axis provides correct longitudinal distance. However, the projection to Y axis may not provide correct lateral distance. In order to keep the correct lateral distance, prediction and modified projection may be compared and the minimum value may be taken as the correct lateral distance. Then the measurement set can be represented as $$z_k = \begin{bmatrix} d_k\cos\phi_k \\ \min(\hat{y}_{k+1|k}, d_k\sin(\phi_k - u_k)) \end{bmatrix} \quad (53)$$

When the measurement is obtained from the side of the vehicle, the projections of the measurement provide correct lateral distance but not longitudinal distance. Similarly, the measurement set can be expressed in this case as $$z_k = \begin{bmatrix} \min(\hat{x}_{k+1|k}, d_k\cos\phi_k) \\ d_k\sin\phi_k \end{bmatrix} \quad (54)$$

This approach may be described as being based on the assumption that the true value is the minimum between the projection and prediction of the measurement. Further, it is possible that this assumption may provide an incorrect result. For example, when the target vehicle is changing lane to the left and the measurement is obtained only from the front of the vehicle, the assumption may no longer be valid and may provide a wrong vehicle maneuver. In order to overcome this problem, virtual measurements $x_{vir}$ and $y_{vir}$ are introduced as $$\begin{cases} x_{vir,k} = \hat{y}_{k+1|k}/\tan\phi_k, & \text{if the state is Front} \\ x_{vir,k} = \hat{x}_{k+1|k}/\tan(\phi_k + u_k), & \text{if the state is Side} \end{cases} \quad (55)$$

When measurements cannot be obtained, we know that there is no target vehicle along the line of the sensor orientation. Meanwhile, the target vehicle may be located near the line of the sensor orientation since the sensor scans near the corner position. Using this information, measurement validation can be conducted based on the determination of the reflection location using the finite state machine as shown in FIG. 21. If the reflection location is the front state, the measurement set can be determined as $$z_k = \begin{bmatrix} \max(x_{vir,k}, \hat{x}_{k+1|k}) \\ \hat{y}_{k+1|k} \end{bmatrix} \quad (56)$$

Similarly, if the reflection location is the side state, the measurement set can be defined as $$z_k = \begin{bmatrix} \hat{x}_{k+1|k} \\ \max(y_{vir,k}, \hat{y}_{k+1|k}) \end{bmatrix} \quad (57)$$

Then, a measurement model and its noise covariance matrix are $$Y_k = \begin{bmatrix} 1 & 0 & 0 & 0 & 0 \\ 0 & 1 & 0 & 0 & 0 \end{bmatrix} X_k + n_k \quad (58)$$

-continued $$R = \begin{bmatrix} \sigma_x^2 & 0 \\ 0 & \sigma_y^2 \end{bmatrix} \quad (59)$$

This exemplary method may be described as preventing estimates from getting stuck at wrong predictions, utilizing a simple linear measurement model, and enhancing the estimation performance by capturing the vehicle maneuver more quickly.

Further, results from simulations using the exemplary active sensing algorithm are presented herein. The simulation environment was built using MATLAB.

The four scenarios as shown in FIG. 19 are simulated using the exemplary active sensing algorithm and process. The initial velocity of the bicycle and the target vehicle set as 4 m/s and 11.2 m/s, respectively. The detection is conducted when the target vehicle is within 30 meters from the rear sensing apparatus. A pre-determined scan range for the detection is from −6 to 15 in degrees. Two parameters Eps and minPts of DBSCAN may be set as 0.5 m and 3. In the tracking stage, the finite set of control inputs is {±1, ±1.5, ±2} in degrees based on the reference points at the front or side of the target vehicle. $\delta_y$ and $\delta_x$ were set as ±0.1 meters. The $\phi_{min}$ and $\phi_{max}$ are −5 and 90 in degrees, respectively. For estimation using IMM, the following mode transition matrix may be used:

$$\begin{bmatrix} 0.99 & 0.01 \\ 0.01 & 0.99 \end{bmatrix} \quad (60)$$

Figure 39:
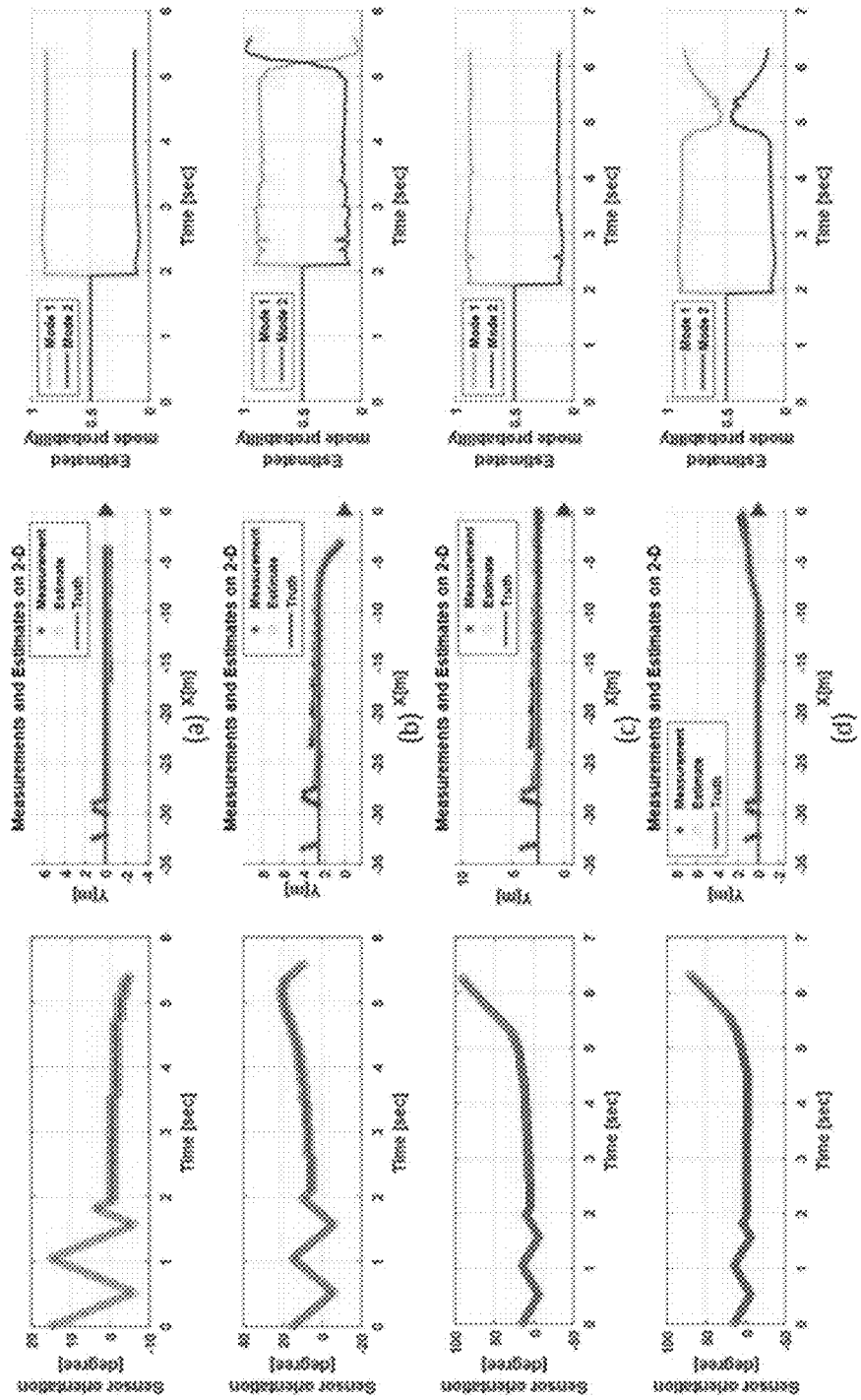
FIG. 39 includes multiple graphs displaying data from simulation results showing sensor orientation, true trajectories, and estimated mode probabilities: (a) where a car is approaching right, or directly, behind the bicycle; (b) where a car is changing lanes to the right of the bicycle; (c) where a car is passing by; and (d) where a car is changing lanes to the left of the bicycle.
Figure 41:
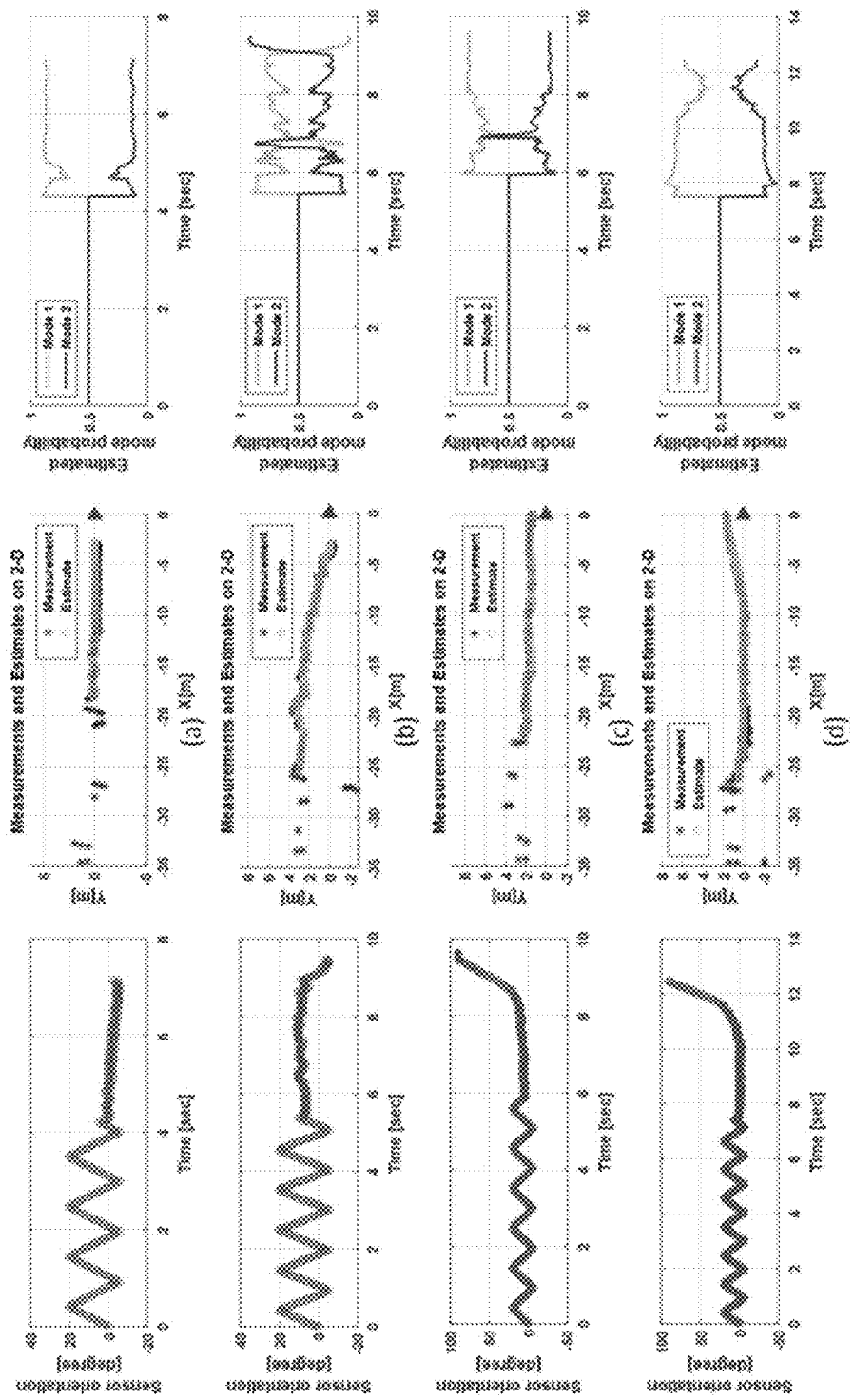
FIG. 41 includes multiple graphs displaying data from experimental results showing sensor orientation, true trajectories, and estimated mode probabilities: (a) where a car is approaching right, or directly, behind the bicycle; (b) where a car is changing lanes to the right of the bicycle; (c) where a car is passing by; and (d) where a car is changing lanes to the left of the bicycle.
Figure 42:
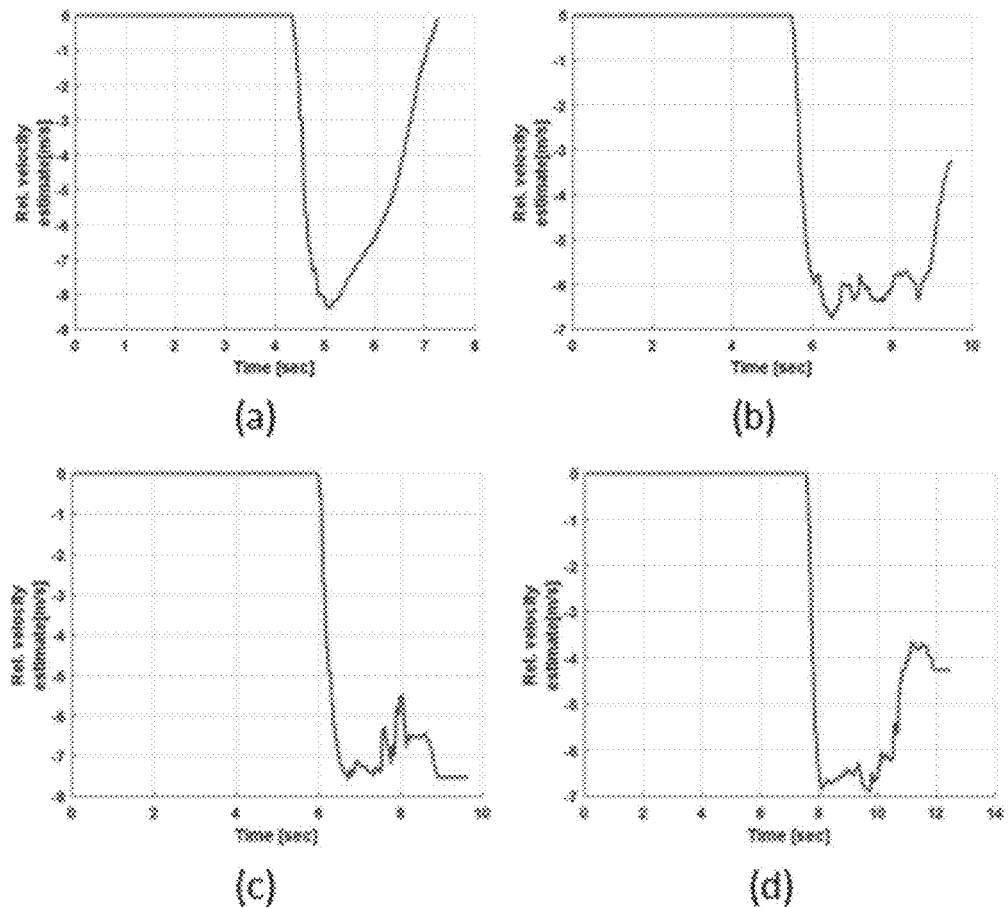
FIG. 42 includes four graphs displaying data from experimental results including relative velocity over time: (a) where a car is approaching right, or directly, behind the bicycle; (b) where a car is changing lanes to the right of the bicycle; (c) where a car is passing by; and (d) where a car is changing lanes to the left of the bicycle.

FIGS. 39-40 show the simulation results using proposed active sensing algorithm. Each simulation results from (a), (b), (c) and (d) in FIGS. 39-40 correspond with the scenarios of (a), (b), (c) and (d) in FIG. 19. The location of the rear sensing apparatus is marked with a triangle on the plots. As shown, the system may track and obtain measurements near the true position of the corner of the target vehicle. Also, results show that the IMM-EKF provides good estimation performance for all the four scenarios.

Further, experiments were conducted in order to verify the performance of the exemplary active sensing algorithm in situations corresponding to all the four scenarios of FIG. 19 of (a) a vehicle approaching right behind a bicycle, (b) a rear vehicle with a lateral offset initially going straight and then changing lanes to the right, (c) a rear vehicle with a lateral offset passing by a bicycle, and (d) a vehicle right behind a bicycle which then changes lanes to the left from behind the bicycle.

In the experiments for scenario (a), the vehicle stops quickly before a collision occurs as shown in (a) of FIG. 40. The exemplary algorithm and process were implemented using the exemplary sensor system described herein, and the same parameters and optimization constraints used in the simulation were used in the experiments.

From the experimental data depicted in FIGS. 39-49, the exemplary active sensing algorithm and processes associated therewith may be described as providing good tracking performance in all four scenarios of FIG. 19. As the vehicle is approaching right behind the bicycle, the sensor orientation may be controlled to zero degree to track the target vehicle in both simulation and experimental results, as shown in (a) and (b) of FIG. 36 and (a) and (b) of FIG. 39. Similarly, the sensor orientation is eventually controlled to 90 degrees to track the passing vehicles in both simulation and experimental results, as shown in (c) and (d) of FIG. 36 and (c) and (d) of FIG. 39.

The overall abilities and limitations of our system were analyzed. Detailed analysis of our experimental results reveals that false detection of non-vehicle objects as vehicles may occurs primarily for downstream (forward) vehicles. In the case of rear vehicles, the only non-vehicle object that the rear sensing apparatus (e.g., laser sensor) must contend with is the road. The road may be described as a large object, and can be easily rejected based on both its size and shape. Thus, the DBSCAN algorithm was largely successful for accurate detection of rear vehicles. Further, it will be more difficult to make the DBSCAN algorithm work successfully for forward (downstream) vehicles where a lot more non-vehicle objects such as buildings, walls and roadside signs are in the field of view.

All patents, patent documents, and references cited herein are incorporated in their entirety as if each were incorporated separately. This disclosure has been provided with reference to illustrative embodiments and is not meant to be construed in a limiting sense. As described previously, one skilled in the art will recognize that other various illustrative applications may use the techniques as described herein to take advantage of the beneficial characteristics of the apparatus and methods described herein. Various modifications of the illustrative embodiments, as well as additional embodiments of the disclosure, will be apparent upon reference to this description.

What is claimed:

1. A system for use with a bicycle comprising:
    a rear sensing apparatus couplable to the bicycle and comprising one or more rear sensors to detect a distance from the bicycle to vehicles located behind the bicycle and an angle of a direction of the distance from the bicycle to the vehicles located behind the bicycle relative to a direction of motion of the bicycle to provide rear vehicular data;
    an alert apparatus comprising a speaker to output sound to alert at least drivers of vehicles of potential collision situations; and
    a computing apparatus comprising one or more processors operably coupled to the rear sensing apparatus and the alert apparatus, wherein the computing apparatus is configured to:
        determine position data and velocity data of vehicles located behind the bicycle based on the rear vehicular data from the rear sensing apparatus,
        detect a front corner of a vehicle located behind the bicycle using the one or more rear sensors so as to compute both a lateral and longitudinal distance of the vehicle,
        determine a potential collision situation based on at least one of the position data and the velocity data of the vehicle located behind the bicycle, and
        issue an alert using the alert apparatus in response to determining a potential collision situation, wherein the alert comprises one or more sounds outputted by the speaker to alert at least the driver of the vehicle.

2. The system of claim 1, wherein computing apparatus is further configured to:
    determine orientation data of vehicles located behind the bicycle based on the rear vehicular data from the rear sensing apparatus, and
    determine a potential collision situation based on at least the orientation data of a vehicle located behind the bicycle.

3. The system of claim 1, wherein the distance from the bicycle to vehicles located behind the bicycle comprises:
the longitudinal distance from the bicycle to the vehicles parallel to the direction of motion of the bicycle; and
the lateral distance from the bicycle to the vehicles projected direction of travel perpendicular to the direction of motion of the bicycle, and wherein determining a potential collision situation based on at least one of the position data and the velocity data of a vehicle located behind the bicycle comprises:
comparing the longitudinal distance or relative longitudinal velocity to a first threshold;
comparing the lateral distance or relative lateral velocity to a second threshold; and
determining a potential collision situation if the longitudinal distance or relative longitudinal velocity is less than or equal to the first threshold or the lateral distance or relative lateral velocity is less than or equal to the second threshold.

4. The system of claim 1, wherein the one or more rear sensors comprises a laser sensor to provide rear vehicular data.

5. The system of claim 1, wherein the rear sensing apparatus comprises a rotating member coupled to the one or more rear sensors to rotate the one or more rear sensors about an axis, wherein the computing apparatus further is configured to control the rotating member to rotate about the axis to continuously track a moving vehicle using the one or more rear sensors.

6. The system of claim 1, wherein the computing apparatus is further configured to determine whether laser reflections sensed by the one or more rear sensors are from a front surface or a side surface of the vehicle so as to compute the lateral or longitudinal distance of the vehicle.

7. The system of claim 1 further comprising a side sensing apparatus couplable to the bicycle and comprising one or more side sensors to detect the distance from the bicycle to vehicles located beside the bicycle and the angle of the direction of motion of the vehicles located beside the bicycle relative to the direction of motion of the bicycle to provide side vehicular data, wherein the computing apparatus is further operably coupled to the side sensing apparatus and is further configured to:
determine position data and velocity data of vehicles located beside the bicycle based on the side vehicular data from the side sensing apparatus; and
determine a potential collision situation based on at least one of the position data and the velocity data of a vehicle located beside the bicycle.

8. The system of claim 7, wherein the side sensing apparatus comprises a sonar system, wherein the one or more side sensors comprises:
a sonar transmitter to transmit energy in the sonar frequency range; and
two or more sonar receivers to receive reflected energy in the sonar frequency range to provide side vehicular data.

9. The system of claim 1, wherein the alert apparatus further comprises visual output apparatus to emit light or transmit visual messages to alert at least drivers of vehicles of potential collision situations, wherein the alert comprises light or visual messages outputted by the visual output apparatus.

10. The system of claim 1, wherein the system further comprises front sensing apparatus couplable to the bicycle and comprising one or more front sensors to detect the distance from the bicycle to a vehicle located in front of the bicycle and the angle of a direction of the distance from the bicycle to the vehicle located in front of the bicycle relative to the direction of motion of the bicycle to provide front vehicular data, wherein the computing apparatus is further configured to:
determine position data and velocity data of vehicles located in front of the bicycle based on front vehicular data from the front sensing apparatus, and
determine a potential collision situation based on at least one of the position data and the velocity data of a vehicle located in front of the bicycle.

11. The system of claim 1, wherein issuing an alert using the alert apparatus in response to determining a potential collision situation comprises:
issuing a preliminary collision alert using the alert apparatus in response to determining a potential collision situation; and
issuing an imminent collision alert using the alert apparatus in response to determining that the potential collision situation has not ceased, wherein the imminent collision alert is issued closer to the potential collision situation than the preliminary collision alert, wherein the imminent collision alert is configured to be more intrusive/noticeable to the driver of the vehicle of the potential collision situation than the preliminary collision alert.

12. The system of claim 1, wherein the computing apparatus is further configured to:
determine that the potential collision situation has ceased based on at least one of the position data and the velocity data of the vehicle located behind the bicycle after determining the potential collision situation; and
issue a clear alert using the alert apparatus in response to determining that the potential collision situation has ceased, wherein the clear alert comprises one or more sounds outputted by the speaker.

13. A system for use with a bicycle comprising:
a front sensing apparatus couplable to the bicycle and comprising one or more front sensors to detect a distance from the bicycle to vehicles located in front the bicycle and an angle of a direction of the distance from the bicycle to the vehicles located in front the bicycle relative to a direction of motion of the bicycle to provide front vehicular data;
an alert apparatus comprising a speaker to output sound to alert at least drivers of vehicles of potential collision situations; and
a computing apparatus comprising one or more processors operably coupled to the front sensing apparatus and the alert apparatus, wherein the computing apparatus is configured to:
determine position data and velocity data of vehicles located in front of the bicycle based on the front vehicular data from the front sensing apparatus,
determine a potential collision situation based on at least one of the position data and the velocity data of a vehicle located in front of the bicycle,
determine an intersection,
predict trajectories of vehicles in the intersection using at least the road geometry of the intersection,
determine a potential collision situation based at least on the predicted trajectories of vehicles in or entering the intersection, and
issue an alert using the alert apparatus in response to determining a potential collision situation, wherein the alert comprises one or more sounds outputted by the speaker to alert at least the driver of the vehicle.

14. The system of claim 13, wherein the front sensing apparatus comprises a rotating member coupled to the one or more sensors to rotate the one or more sensors about an axis, wherein the computing apparatus further is configured to rotate the one or more sensors about the axis to scan an area in front of the bicycle to actively detect one of the corners of the vehicle located in front of the bicycle.

15. The system of claim 13, wherein the computing apparatus is further configured to detect a front corner of the vehicle located in front of the bicycle using the one or more front sensors so as to compute both the lateral and longitudinal distance of the vehicle.

16. The system of claim 13, wherein the upcoming intersection is determined using one or more of the front sensing apparatus, global positioning systems, and map databases.

17. The system of claim 13, wherein the computing apparatus is further configured to:
determine whether the upcoming intersection is free of a potential collision situation based on data from the front sensing apparatus; and
issue an intersection clear alert using the alert apparatus in response to determining that the upcoming intersection is free of a potential collision situation, wherein the intersection clear alert comprises one or more sounds outputted by the speaker.

18. The system of claim 13, wherein the computing apparatus is further configured to analyze traffic at the intersection to at least detect one or more of a left turning vehicle and a vehicle stopped and waiting to turn left to determine a potential collision situation.

19. The system of claim 13, wherein the computing apparatus is further configured to analyze traffic at the intersection travelling in a direction approximately perpendicular to the bicycle's direction of motion to determine a potential collision situation.

20. A system for use with a bicycle comprising:
a side sensing apparatus couplable to the bicycle and comprising one or more side sensors to detect a distance from the bicycle to vehicles located beside the bicycle and an angle of a direction of motion of the vehicles located beside the bicycle relative to a direction of motion of the bicycle to provide side vehicular data; and
a computing apparatus comprising one or more processors operably coupled to the side sensing apparatus, wherein the computing apparatus is configured to:
determine position data and velocity data of vehicles located beside the bicycle based on the side vehicular data from the side sensing apparatus, wherein the velocity data of vehicles located beside the bicycle comprises:
a relative lateral velocity of the vehicles, and
a relative angular velocity of the vehicles; and
determine a potential collision situation based on at least one of the position data and the velocity data of a vehicle located beside the bicycle, wherein determining a potential collision situation based on at least one of the position data and the velocity data of a vehicle located beside the bicycle comprises:
comparing the relative lateral velocity of the vehicle to a first threshold;
comparing the relative angular velocity of the vehicle to a second threshold;
determining a potential collision situation if the relative lateral velocity of the vehicle meets or exceeds the first threshold and the relative angular velocity of the vehicle meets or exceeds the second threshold;
comparing the distance from the bicycle to vehicles located beside the bicycle to a third threshold; and
determining a potential collision situation if the distance is less than or equal to the third threshold.

21. The system of claim 20, wherein the side sensing apparatus comprises a sonar system, wherein the one or more side sensors comprises:
a sonar transmitter to transmit energy in the sonar frequency range; and
two or more sonar receivers to receive reflected energy in the sonar frequency range to provide side vehicular data.

22. The system of claim 20 further comprising an alert apparatus comprising a speaker to output sound to alert at least drivers of vehicles of potential collision situations, wherein the computing apparatus is further operably coupled to the alert apparatus and is further configured to issue an alert using the alert apparatus in response to determining a potential collision situation, wherein the alert comprises one or more sounds outputted by the speaker to alert at least the driver of the vehicle.

23. A system for use with a bicycle comprising:
a rear sensing apparatus couplable to the bicycle and comprising one or more rear sensors to detect a distance from the bicycle to vehicles located behind the bicycle and an angle of a direction of the distance from the bicycle to the vehicles located behind the bicycle relative to a direction of motion of the bicycle to provide rear vehicular data;
an alert apparatus comprising a speaker to output sound to alert at least drivers of vehicles of potential collision situations; and
a computing apparatus comprising one or more processors operably coupled to the rear sensing apparatus and the alert apparatus, wherein the computing apparatus is configured to:
determine position data and velocity data of vehicles located behind the bicycle based on the rear vehicular data from the rear sensing apparatus,
determine whether laser reflections sensed by the one or more rear sensors are from a front surface or a side surface of a vehicle so as to compute a lateral or longitudinal distance of the vehicle,
determine a potential collision situation based on at least one of the position data and the velocity data of the vehicle located behind the bicycle, and
issue an alert using the alert apparatus in response to determining a potential collision situation, wherein the alert comprises one or more sounds outputted by the speaker to alert at least the driver of the vehicle.

24. The system of claim 23, wherein the distance from the bicycle to vehicles located behind the bicycle comprises:
the longitudinal distance from the bicycle to the vehicles parallel to the direction of motion of the bicycle; and
the lateral distance from the bicycle to the vehicles projected direction of travel perpendicular to the direction of motion of the bicycle, and wherein determining a potential collision situation based on at least one of the position data and the velocity data of a vehicle located behind the bicycle comprises:
comparing the longitudinal distance or relative longitudinal velocity to a first threshold;
comparing the lateral distance or relative lateral velocity to a second threshold; and determining a potential collision situation if the longitudinal distance or relative longitudinal velocity is less than or equal to the first threshold or the lateral distance or relative lateral velocity is less than or equal to the second threshold.

25. The system of claim 23, wherein the one or more rear sensors comprises a laser sensor to provide rear vehicular data.

26. The system of claim 23, wherein the rear sensing apparatus comprises a rotating member coupled to the one or more rear sensors to rotate the one or more rear sensors about an axis, wherein the computing apparatus further is configured to control the rotating member to rotate about the axis to continuously track a moving vehicle using the one or more rear sensors.

27. A system for use with a bicycle comprising:
a rear sensing apparatus couplable to the bicycle and comprising one or more rear sensors to detect a distance from the bicycle to vehicles located behind the bicycle and an angle of a direction of the distance from the bicycle to the vehicles located behind the bicycle relative to a direction of motion of the bicycle to provide rear vehicular data;
an alert apparatus comprising a speaker to output sound to alert at least drivers of vehicles of potential collision situations; and
a computing apparatus comprising one or more processors operably coupled to the rear sensing apparatus and the alert apparatus, wherein the computing apparatus is configured to:
determine position data and velocity data of vehicles located behind the bicycle based on the rear vehicular data from the rear sensing apparatus,
determine a potential collision situation based on at least one of the position data and the velocity data of a vehicle located behind the bicycle, and
issue an alert using the alert apparatus in response to determining a potential collision situation, wherein the alert comprises one or more sounds outputted by the speaker to alert at least the driver of the vehicle, wherein issuing an alert using the alert apparatus in response to determining a potential collision situation comprises:
issuing a preliminary collision alert using the alert apparatus in response to determining a potential collision situation, and
issuing an imminent collision alert using the alert apparatus in response to determining that the potential collision situation has not ceased, wherein the imminent collision alert is issued closer to the potential collision situation than the preliminary collision alert, wherein the imminent collision alert is configured to be more intrusive/noticeable to the driver of the vehicle of the potential collision situation than the preliminary collision alert.

28. A system for use with a bicycle comprising:
a front sensing apparatus couplable to the bicycle and comprising one or more front sensors to detect a distance from the bicycle to vehicles located in front the bicycle and an angle of a direction of the distance from the bicycle to the vehicles located in front the bicycle relative to a direction of motion of the bicycle to provide front vehicular data;
an alert apparatus comprising a speaker to output sound to alert at least drivers of vehicles of potential collision situations; and
a computing apparatus comprising one or more processors operably coupled to the front sensing apparatus and the alert apparatus, wherein the computing apparatus is configured to:
determine position data and velocity data of vehicles located in front of the bicycle based on the front vehicular data from the front sensing apparatus,
determine a potential collision situation based on at least one of the position data and the velocity data of a vehicle located in front of the bicycle,
analyze traffic at an intersection to at least detect one or more of a left turning vehicle and a vehicle stopped and waiting to turn left to determine a potential collision situation, and
issue an alert using the alert apparatus in response to determining a potential collision situation, wherein the alert comprises one or more sounds outputted by the speaker to alert at least the driver of the vehicle.

29. The system of claim 28, wherein the front sensing apparatus comprises a rotating member coupled to the one or more sensors to rotate the one or more sensors about an axis, wherein the computing apparatus further is configured to rotate the one or more sensors about the axis to scan an area in front of the bicycle to actively detect one of the corners of the vehicle located in front of the bicycle.

30. The system of claim 28, wherein the computing apparatus is further configured to detect a front corner of the vehicle located in front of the bicycle using the one or more front sensors so as to compute both the lateral and longitudinal distance of the vehicle.

31. A system for use with a bicycle comprising:
a front sensing apparatus couplable to the bicycle and comprising one or more front sensors to detect a distance from the bicycle to vehicles located in front the bicycle and an angle of a direction of the distance from the bicycle to the vehicles located in front the bicycle relative to a direction of motion of the bicycle to provide front vehicular data;
an alert apparatus comprising a speaker to output sound to alert at least drivers of vehicles of potential collision situations; and
a computing apparatus comprising one or more processors operably coupled to the front sensing apparatus and the alert apparatus, wherein the computing apparatus is configured to:
determine position data and velocity data of vehicles located in front of the bicycle based on the front vehicular data from the front sensing apparatus,
determine a potential collision situation based on at least one of the position data and the velocity data of a vehicle located in front of the bicycle,
analyze traffic at a traffic intersection travelling in a direction approximately perpendicular to the bicycle's direction of motion to determine a potential collision situation, and
issue an alert using the alert apparatus in response to determining a potential collision situation, wherein the alert comprises one or more sounds outputted by the speaker to alert at least the driver of the vehicle.

32. The system of claim 31, wherein the computing apparatus is further configured to:
determine whether an upcoming intersection is free of a potential collision situation based on data from the front sensing apparatus; and
issue an intersection clear alert using the alert apparatus in response to determining that the upcoming intersection is free of a potential collision situation, wherein the intersection clear alert comprises one or more sounds outputted by the speaker.

* * * * *